(12) United States Patent
Ishizaki et al.

(10) Patent No.: US 7,622,166 B2
(45) Date of Patent: Nov. 24, 2009

(54) OPTICAL ELEMENT, PROCESS FOR PRODUCING THE SAME, SUBSTRATE FOR LIQUID CRYSTAL ALIGNMENT, LIQUID CRYSTAL DISPLAY DEVICE, AND BIREFRINGENT MATERIAL

(75) Inventors: Koji Ishizaki, Tokyo-To (JP); Kanami Ikegami, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 337 days.

(21) Appl. No.: 10/997,064

(22) Filed: Nov. 24, 2004

(65) Prior Publication Data

US 2005/0195479 A1    Sep. 8, 2005

(30) Foreign Application Priority Data

| Nov. 28, 2003 | (JP) | ............................. 2003-436101 |
| Nov. 28, 2003 | (JP) | ............................. 2003-436102 |
| Nov. 28, 2003 | (JP) | ............................. 2003-436103 |
| Dec. 1, 2003 | (JP) | ............................. 2003-402300 |
| Dec. 2, 2003 | (JP) | ............................. 2003-403633 |

(51) Int. Cl.
   G02F 1/1337    (2006.01)
   G02F 1/13363    (2006.01)

(52) U.S. Cl. .................. 428/1.23; 428/1.1; 428/1.3; 349/131; 252/299.4

(58) Field of Classification Search .................. 428/1.3, 428/1.31, 1.23–1.28, 1.32, 1.52; 349/130–131, 349/106, 117; 252/299.4
See application file for complete search history.

(56) References Cited

U.S. PATENT DOCUMENTS

| 3,981,816 | A | * | 9/1976 | Moriyama et al. | 349/130 |
| 4,357,374 | A | * | 11/1982 | Ogawa | 428/1.32 |
| 5,073,294 | A | * | 12/1991 | Shannon et al. | 252/299.01 |
| 5,250,214 | A | * | 10/1993 | Kanemoto et al. | 252/299.01 |
| 5,766,673 | A | * | 6/1998 | Nogami et al. | 427/58 |
| 6,338,808 | B1 | * | 1/2002 | Kawata et al. | 252/299.4 |
| 6,369,869 | B2 | * | 4/2002 | Schadt et al. | 349/129 |
| 6,423,772 | B1 | * | 7/2002 | Zhang et al. | 524/588 |
| 6,444,280 | B1 | * | 9/2002 | Matsuoka et al. | 428/1.3 |
| 6,456,347 | B1 | * | 9/2002 | Motomura et al. | 349/117 |
| 2003/0003246 | A1 | * | 1/2003 | Negoro et al. | 428/1.2 |
| 2003/0087045 | A1 | * | 5/2003 | Nakata et al. | 428/1.27 |
| 2003/0211342 | A1 | * | 11/2003 | Nomura et al. | 428/447 |

* cited by examiner

*Primary Examiner*—David R Sample
*Assistant Examiner*—Sophie Hon
(74) *Attorney, Agent, or Firm*—Burr & Brown

(57) ABSTRACT

An optical element and a process for producing the optical element are provided. The optical element includes a light transparent substrate and a first birefringence layer provided on the substrate. The first birefringence layer includes a polymerizable liquid crystal having rodlike molecules and a coupling agent and/or a surfactant that homeotropically align the polymerizable liquid crystal to form a crosslinked polymer in a state of homeotropic alignment. The crosslinked polymer has a three-dimensionally crosslinked structure wherein the polymerizable liquid crystal having rodlike molecules holds homeotropic alignment.

25 Claims, 27 Drawing Sheets

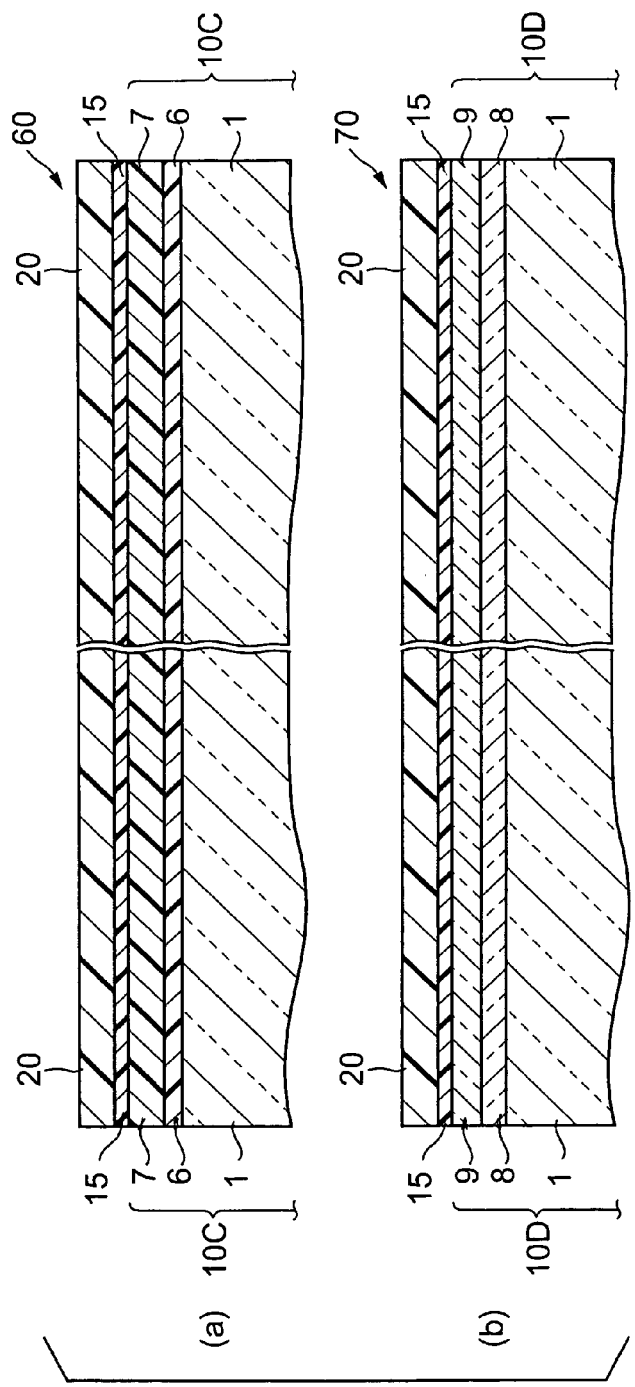
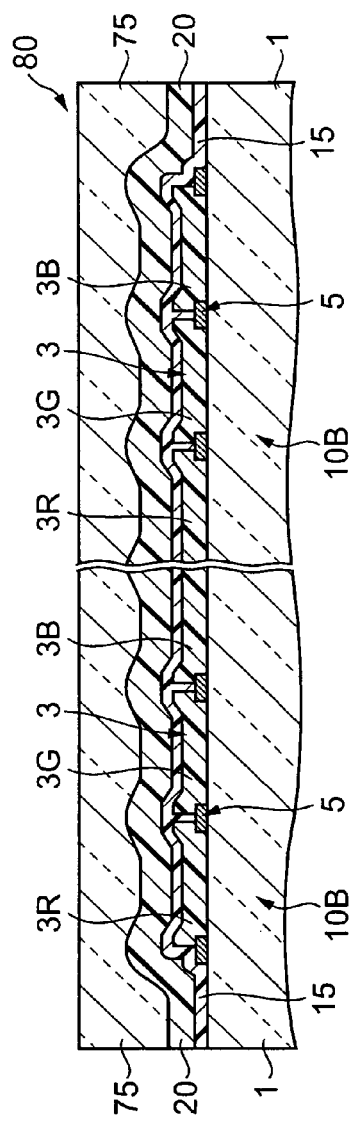
FIG. 17
FIG. 18

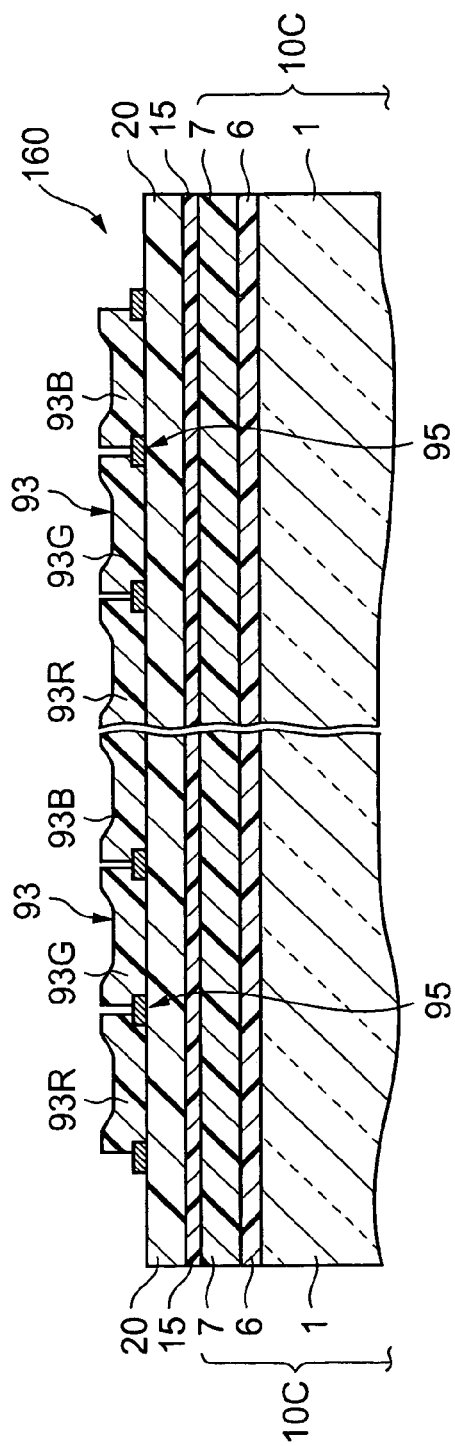
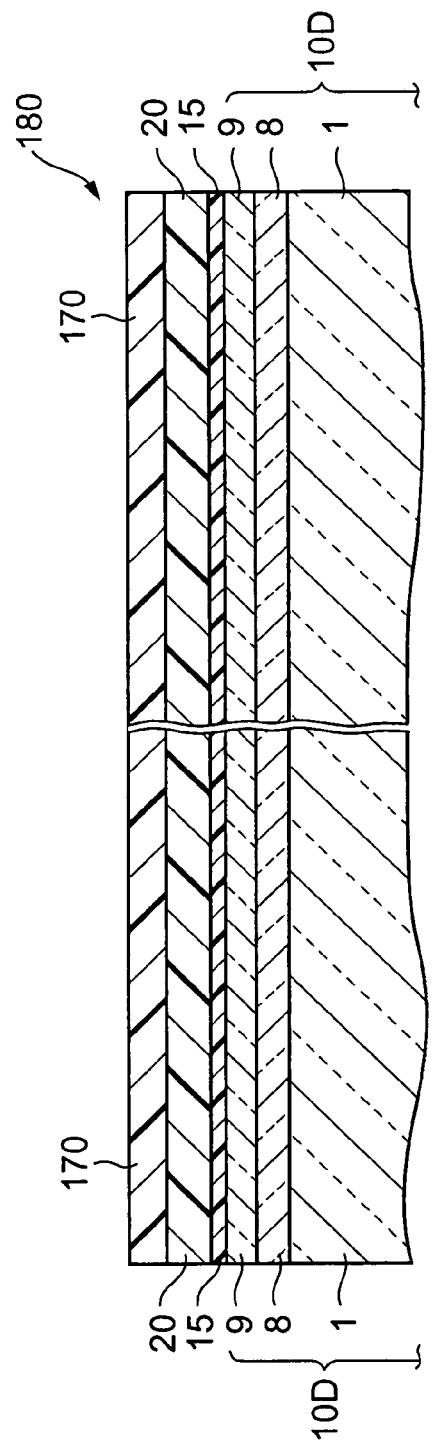
FIG. 20
FIG. 21

OPTICAL ELEMENT, PROCESS FOR PRODUCING THE SAME, SUBSTRATE FOR LIQUID CRYSTAL ALIGNMENT, LIQUID CRYSTAL DISPLAY DEVICE, AND BIREFRINGENT MATERIAL

CROSS REFERENCE TO RELATED APPLICATION

This application claims the benefit of Japanese Applications 2003-436101, filed Nov. 28, 2003, 2003-436102 filed Nov. 28, 2003, 2003-436103 filed Nov. 28, 2003, 2003-402300 filed Dec. 1, 2003, and 2003-403633 filed Dec. 2, 2003, the entireties of which are incorporated herein by reference.

BACKGROUND OF THE INVENTION

1. Field of the Invention

The present invention relates to an optical element comprising a birefringence layer and a process for producing the same, a substrate for liquid crystal alignment having a birefringence layer, and a liquid crystal display device comprising the substrate for liquid crystal alignment. The present invention also relates to a birefringent material.

2. Background Art

Liquid crystal display devices have advantages including that a reduction in thickness and a reduction in weight can be easily realized, the power consumption is low, and the occurrence of flicker can easily be prevented. By virtue of these advantages, liquid crystal display devices have drawn attention as flat panel displays, and the market of liquid crystal display devices for use as display devices of personal computers or television receivers have been rapidly expanded. Further, an increase in size of the liquid crystal display device is also being forwarded.

For these liquid crystal display devices, various display modes have been developed. Since liquid crystals have birefringent properties, any display mode of liquid crystal display devices basically has visual angle dependency. In large-size liquid crystal display devices, the practical visual angle is larger than that in small-size liquid crystal display devices. Therefore, an increase in size of liquid crystal display devices leads to an increasing demand for an improvement in visual angle dependency. To meet this demand, the development of liquid crystal display devices have led to the development of various techniques for improving the visual angle characteristics.

Conventional liquid crystal display devices having a visual angle increased by controlling liquid crystal alignment include, for example, liquid crystal display devices of a multi-domain system in which the liquid crystal within pixel is divided into a plurality of regions different from each other in alignment direction at the time of at least display of intermediate tones, and liquid crystal display devices of an IPS (in-plane switching) system in which liquid crystal alignment is controlled by forming transverse electric field (electric field parallel to substrate surface) within the liquid crystal cell.

Further, in order that the visual angle is increased by optically compensating light incident on a liquid crystal cell or light emitted from the liquid crystal cell, various optical elements having birefringent properties have been developed. Liquid crystal cells for optical compensation or optical compensation films comprising an optically monoaxially or biaxially stretched resin film have hitherto been used as the optical element. In recent years, an optical element having a birefringence layer formed of a liquid crystal material or a process for producing the same have also been developed.

For example, Japanese Patent Laid-Open No. 142531/1993 discloses a visual angle compensation film comprising nematic liquid crystal polymer having a positive inherent refractive index value in which molecular chains have been aligned in a direction normal to the film face.

Japanese Patent Laid-Open No. 174724/2002 discloses that a vertically aligning film using a long-chain alkyl-type dendrimer derivative is formed and a polymerizable liquid crystal compound is coated onto the vertically aligning film to form a homeotropically aligned liquid crystal layer and, thus, to prepare an assembly which is then used as an optical film.

Japanese Patent Laid-Open No. 174725/2002 discloses a production process of an optical film. This production process comprises coating, on a substrate not provided with any vertically aligning film, a side chain-type liquid crystal polymer comprising monomer units containing a liquid crystalline fragment side chain and monomer units containing a non-liquid-crystalline fragment side chain, then homeotropically aligning this liquid crystal polymer in a liquid crystal state, and then fixing the molecular arrangement while holding the alignment to prepare an optical film.

Japanese Patent Laid-Open No. 121852/2003 discloses a production process of an optical film. This production process comprises providing a binder layer and an anchor coat layer in that order on a substrate, then coating a specific side chain-type liquid crystal polymer on the anchor coat layer, homeotropically aligning the liquid crystal, and then fixing the molecular arrangement while holding the alignment to prepare an optical film.

However, in order to provide the visual angle compensation film described in Japanese Patent Laid-Open No. 142531/1993, a method should be used in which two substrates each having a vertically aligning film are used to prepare an empty cell, the empty cell is filled with a nematic liquid crystal monomer, the liquid crystal monomer is homeotropically aligned and then photopolymerized, and the nematic liquid crystal polymer (visual angle compensation film) should be taken out from within the cell. Therefore, the visual angle compensation film described in this literature is disadvantageous in that the production process is complicated and the production cost is high.

In order to provide a homeotropic alignment-type liquid crystal layer by the process disclosed in Japanese Patent Laid-Open No. 174724/2002, the use of the vertically aligning film is indispensable and a special and unobtainable material, i.e., a long-chain alkyl-type dendrimer derivative, should be used for vertically aligning film formation. For this reason, the production process disclosed in this literature is disadvantageous in that the production cost is sometimes high.

The homeotropic alignment-type liquid crystal film produced by the process described in Japanese Patent Laid-Open No. 174725/2002 comprises a side chain-type liquid crystal polymer. Therefore, the birefringence characteristics are susceptible to heat, and, thus, the temperature range in which desired birefringence characteristics can be maintained is relatively narrow. This makes it difficult to use the homeotropic alignment-type liquid crystal film, for example, in an on-vehicle liquid crystal display device where relatively high heat resistance is required. Further, the homeotropic alignment-type liquid crystal film produced by the process described in this literature is disadvantageous in that liquid crystal display devices using the homeotropic alignment-type liquid crystal film can be used only in limited applications.

Further, in the side chain-type liquid crystal polymer, even when the molecules are fixed in a homeotropically aligned state, the fluidity is increased with increasing the temperature. This results in lowered adhesion to the substrate layer or a significant lowering in birefringence characteristics due to residual stress. Therefore, when the homeotropic alignment-type liquid crystal film is used in liquid crystal display devices, in order to avoid exposure of the once formed liquid crystal film to a high-temperature environment, a liquid crystal film should be provided on the outer side of the liquid crystal cell after the production of the liquid crystal cell. Thus, the homeotropic alignment-type liquid crystal film produced by the process described in Japanese Patent Laid-Open No. 174725/2002 is disadvantageous in that the degree of freedom of selection of the member which can form this liquid crystal film is low.

The homeotropic alignment-type liquid crystal film produced by the process described in Japanese Patent Laid-Open No. 121852/2003 comprises a side chain-type liquid crystal polymer and thus suffers from the same problem as described above. Further, in order to provide the homeotropic alignment-type liquid crystal film by the process described in this literature, a binder layer and an anchor layer should be provided in that order on the substrate, and, thus, the production cost is disadvantageously increased.

SUMMARY OF THE INVENTION

The present invention has been made with a view to solving the above problems, and a first object of the present invention is to provide an optical element which can be produced at low cost and has birefringent characteristics with low susceptibility to heat, and a process for producing the same.

A second object of the present invention is to provide a substrate for liquid crystal alignment which can realize the production of a liquid crystal display device having excellent visual angle characteristics, high light efficiency for light utilization and relatively high heat resistance at low cost.

A third object of the present invention is to provide a birefringent material which can be produced at low cost and has birefringence characteristics with low susceptibility to heat.

The above objects can be attained by an optical element comprising: a light transparent substrate; and a first birefringence layer provided on the substrate, wherein said first birefringence layer comprises a crosslinked polymer comprising a coupling agent and/or a surfactant which can homeotropically align a polymerizable liquid crystal comprising rodlike molecules; and said crosslinked polymer has a three-dimensionally crosslinked structure in such a state that said polymerizable liquid crystal comprising rodlike molecules holds homeotropic alignment.

According to another aspect of the present invention, there is provided an optical element comprising: a light transparent substrate; a vertically aligning film provided on the substrate; and a first birefringence layer provided on the vertically aligning film, wherein said vertically aligning film is formed of a surfactant containing a long-chain alkyl group, and said first birefringence layer has such a structure that a polymerizable liquid crystal comprising rodlike molecules has been three-dimensionally crosslinked while maintaining homeotropic alignment.

In the optical element according to the present invention, the first birefringence layer contains a coupling agent and/or a surfactant. Therefore, the first birefringence layer can be formed, without the need to use a vertically aligning film for homeotropic alignment of a polymerizable liquid crystal comprising rodlike molecules, by a relatively simple method in which coating of a coating composition, alignment treatment, and crosslinking treatment are successively carried out. The vertically aligning film can be formed by a simple method in which a coating composition is coated and the coating is then dried.

Japanese Patent Laid-Open No. 142531/1993 describes a visual angle compensation film in which a nematic liquid crystal monomer is filled into an empty cell having a vertically aligning film to homeotropically align the nematic liquid crystal monomer. On the other hand, in the optical element according to the present invention, since any empty cell is not used in homeotropic alignment of the polymerizable liquid crystal, the optical element can be easily produced. Further, since the first birefringence layer has a three-dimensionally crosslinked structure, the birefringence characteristics are less likely to be influenced by heat. Therefore, in the optical element according to the present invention, an optical element produceable at low cost and having birefringence characteristics which are less susceptible to heat can be realized.

According to another aspect of the present invention, there is provided a process for producing the optical element, said process comprising:

a provision step of providing a light transparent substrate;

an alignment step of coating a coating composition comprising a polymerizable liquid crystal comprising rodlike molecules and a coupling agent and/or a surfactant, which can homeotropically align the polymerizable liquid crystal, onto said substrate to form a coating, and homeotropically aligning the polymerizable liquid crystal in the coating; and a crosslinking step of three-dimensionally crosslinking said polymerizable liquid crystal in the coating in such a state that the homeotropic alignment is held.

According to the production process of an optical element according to the present invention, a desired birefringence layer can be formed, without the need to use a vertically aligning film for homeotropic alignment of a polymerizable liquid crystal, by a relatively simple method in which coating of a coating composition, alignment treatment, and crosslinking treatment are successively carried out. Therefore, according to the production process of an optical element according to the present invention, an optical element produceable at low cost and having birefringence characteristics which are less susceptible to heat can be produced.

The production process of an optical element in another aspect of the present invention comprises:

a provision step of providing a member comprising a light transparent substrate and, provided on the light transparent substrate, a homeotroic aligning film formed of a long-chain alkyl-containing surfactant;

an alignment step of coating a coating composition comprising a polymerizable liquid crystal comprising rodlike molecules on said vertically aligning film to form a coating and homeotropically aligning the polymerizable liquid crystal in the coating; and a crosslinking step of three-dimensionally crosslinking said polymerizable liquid crystal in the coating in such a state that the homeotropic alignment is held.

According to the production process of an optical element according to the present invention, a desired birefringence layer can be formed by a relatively simple method in which coating of a coating composition, alignment treatment, and crosslinking treatment are successively carried out. Therefore, according to the production process of an optical element according to the present invention, an optical element produceable at low cost and having birefringence characteristics which are less susceptible to heat can be produced.

The production process of an optical element according to still another aspect of the present invention is a process for producing an optical element comprising a substrate and a first birefringence layer provided on the substrate, said process comprising:

a coating step of coating a coating composition comprising at least a polymerizable liquid crystal comprising rodlike molecules each having two or more polymerizable functional groups to form a coating on the substrate;

an alignment step of homeotropically aligning the polymerizable liquid crystal in the coating; and a crosslinking step of three-dimensionally crosslinking said polymerizable liquid crystal in the coating in such a state that the homeotropic alignment is held, thereby forming the first birefringence layer.

In the production process of an optical element according to the present invention, a desired birefringence layer can be formed by a relatively simple method in which coating of a coating composition, alignment treatment, and crosslinking treatment are successively carried out.

The liquid crystal aligning substrate in a further aspect of the present invention is a liquid crystal aligning substrate comprising at least a light transparent substrate and an aligning film provided on one side of the substrate, said first birefringence layer being provided between said substrate and said aligning film, or on the substrate in its surface remote from said aligning film.

The liquid crystal aligning substrate in a still further aspect of the present invention is a liquid crystal aligning substrate comprising at least a light transparent substrate and an aligning film provided on one side of the substrate, wherein said vertically aligning film and said first birefringence layer are stacked in that order between said substrate and said aligning film, or on said substrate in its surface remote from said aligning film.

In the liquid crystal aligning substrate according to the present invention, the first birefringence layer can be utilized as a layer for controlling a light polarization state such as an optical compensation layer and a phase difference layer. Therefore, a liquid crystal display device having excellent visual angle characteristics and high light utilization efficiency and relatively high heat resistance can be produced at low cost.

The liquid crystal display device in another aspect of the present invention is a liquid crystal display device comprising a liquid crystal panel for display comprising: a first substrate for liquid crystal alignment located on its display surface side; and a second substrate for liquid crystal alignment located on its backside, wherein said first substrate for liquid crystal alignment and/or said second substrate for liquid crystal alignment are the above substrate for liquid crystal alignment.

The birefringent material in still another aspect of the present invention is a birefringent material comprising a crosslinked polymer comprising a coupling agent and/or a surfactant which can homeotropically align a polymerizable liquid crystal comprising rodlike molecules, wherein said crosslinked polymer has a three-dimensionally crosslinked structure in such a state that said polymerizable liquid crystal comprising rodlike molecules holds homeotropic alignment.

The birefringent material of the present invention can be produced at low cost and has birefringence characteristics which are less susceptible to heat.

BRIEF DESCRIPTION OF THE DRAWINGS

FIG. 17 is a schematic view showing the sectional structure of still another embodiment of the optical element in the second aspect of the present invention;

FIG. 18 is a schematic view showing the sectional structure of a further embodiment of the optical element in the second aspect of the present invention;

FIG. 20 is a schematic view showing the sectional structure of another embodiment of the optical element in the second aspect of the present invention;

FIG. 21 is a schematic view showing the sectional structure of still another embodiment of the optical element in the second aspect of the present invention;

DETAILED DESCRIPTION OF THE INVENTION

Embodiments of each of the optical element, production process of the optical element, substrate for liquid crystal alignment, liquid crystal display device, and birefringent material according to the present invention will be described, if necessary, with reference to the accompanying drawings.

Optical Element and Birefringent Material

Figure 1:
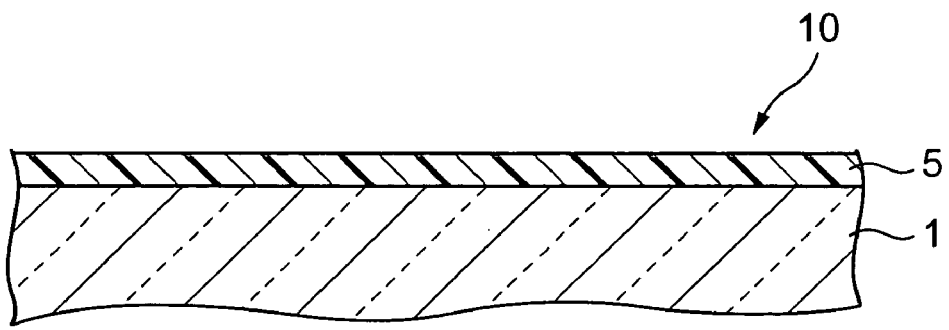
FIG. 1 is a diagram showing an example of a basic sectional structure of an optical element in a first embodiment of the present invention.

1. Optical Element in First Aspect of Invention
  (a) First Embodiment of Optical Element FIG. 1 is a schematic diagram showing an example of the basic sectional structure of the optical element according to the present invention. An optical element 10 shown in the drawing comprises a light transparent substrate 1 and a first birefringence layer 5 provided on the substrate 1.

The substrate 1 may have a single-layer structure or a multilayer structure depending upon applications and the like of the optical element 10. In the case of a single-layer structure, the substrate 1 may be formed of an inorganic material such as glass or an organic material such as resin, preferably glass or silicon oxide. When the substrate 1 has a multilayer structure, the structure may be properly selected depending, e.g., upon applications of the optical element. Also in the multilayer structure, a layer underlying the first birefringence layer 5 is preferably formed of glass or silicon oxide. The substrate 1 is preferably optically isotropic. If necessary, a light shielding region or the like may be locally provided. The light transmittance of the substrate 1 may be properly selected depending, e.g., upon applications of the optical element 10.

The first birefringence layer 5 is formed of a crosslinked polymer containing a coupling agent and/or a surfactant (not shown) which can homeotropically align a polymerizable liquid crystal comprising rodlike molecules. This crosslinked polymer functions as a birefringent material according to the present invention.

Figure 2:
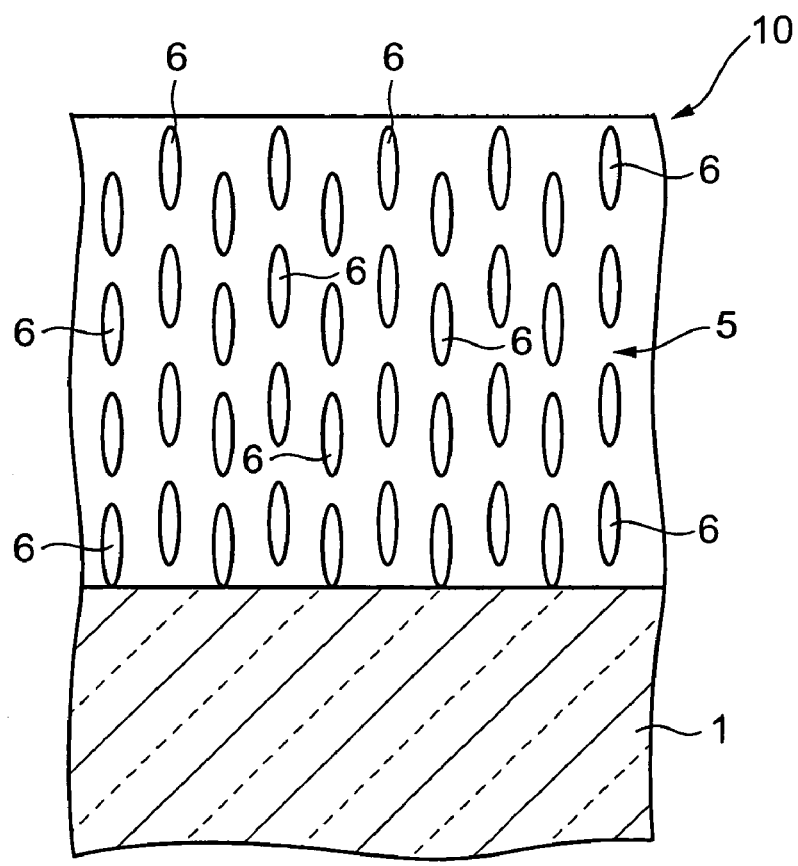
FIG. 2 is a typical cross-sectional view showing the structure of a birefringence layer constituting the optical element shown in FIG. 1.

FIG. 2 is a typical cross-sectional view showing the structure of the first birefringence layer 5. As shown in the drawing, the crosslinked polymer constituting the first birefringence layer 5 comprises rodlike polymerizable liquid crystal molecules 6 as structural units. The crosslinked polymer has a three-dimensionally crosslinked structure in such a state that the polymerizable liquid crystal comprising rodlike molecules holds homeotropic alignment. In FIG. 2, for convenience, a bonding hand in the polymerizable liquid crystal molecules 6 is not shown.

The tilt angle of the polymerizable liquid crystal molecules 6 as the structural unit in the first birefringence layer 5 is preferably substantially even in the thickness-wise direction of the first birefringence layer 5. The "tilt angle of the polymerizable liquid crystal molecules as the structural unit is substantially even in the thickness-wise direction of the first birefringence layer" as used herein means that the retardation in the thickness-wise direction of the first birefringence layer 5 is not more than about 10 nm.

The polymerizable liquid crystal in the first birefringence layer 5 is in a three-dimensionally crosslinked state while holding the homeotropic alignment. Therefore, xyz orthogonal coordinate is assumed with the thickness-wise direction of the first birefringence layer 5 being z axis, the refractive index $n_x$ in x axis direction is substantially equal to the refractive index $n_y$ in y axis direction, and the refractive index in z axis direction is larger than the refractive indexes $n_x$, $n_y$. Specifically, the first birefringence layer 5 is a uniaxial birefringence layer in which the thickness-wise direction (z axis direction) is an optical axis. The first birefringence layer 5 functions as the so-called "+C plate."

Retardation occurs in light incident on the first birefringence layer 5 at an incident angle of more than 0 degree. The retardation is an optical path difference between normal light and abnormal light in the first birefringence layer. The retardation of the optical element can be controlled by properly selecting the thickness of the first birefringence layer, the birefringence Δn (difference between refractive index $n_o$ of normal light and refractive index $n_e$ of abnormal light) of the polymerizable liquid crystal molecules, and the orientational order of the polymerizable liquid crystal molecules.

In order to provide the above optical element, in the present invention, the first birefringence layer 5 is preferably formed of a polymerizable liquid crystal comprising rodlike molecules each containing two or more functional groups (this polymerizable liquid crystal being hereinafter referred to as "polyfunctional polymerizable liquid crystal"). The birefringence Δn of the polymerizable liquid crystal molecules is preferably about 0.03 to 0.30, more preferably about 0.05 to 0.20. Specific examples of the polyfunctional polymerizable liquid crystal include polymerizable liquid crystals represented by formulae (I) to (V). In formulae (I) to (V), n is a numeric value of 2 to 6.

rodlike molecules each having only one functional group (this polymerizable liquid crystal being hereinafter referred to as "monofunctional polymerizable liquid crystal") may be used. In this case, the amount of the monofunctional polymerizable liquid crystal used is preferably in the range of about 1 to 50% by mole, more preferably in the range of about 5 to 20% by mole, based on the total amount of the polymerizable liquid crystal. The combined use of the polyfunctional polymerizable liquid crystal and the monofunctional polymerizable liquid crystal can improve or lower the alignment of the whole polymerizable liquid crystal. Therefore, the alignment of the whole polymerizable liquid crystal can be easily controlled. Specific examples of the monofunctional polymerizable liquid crystal include polymerizable liquid crystals represented

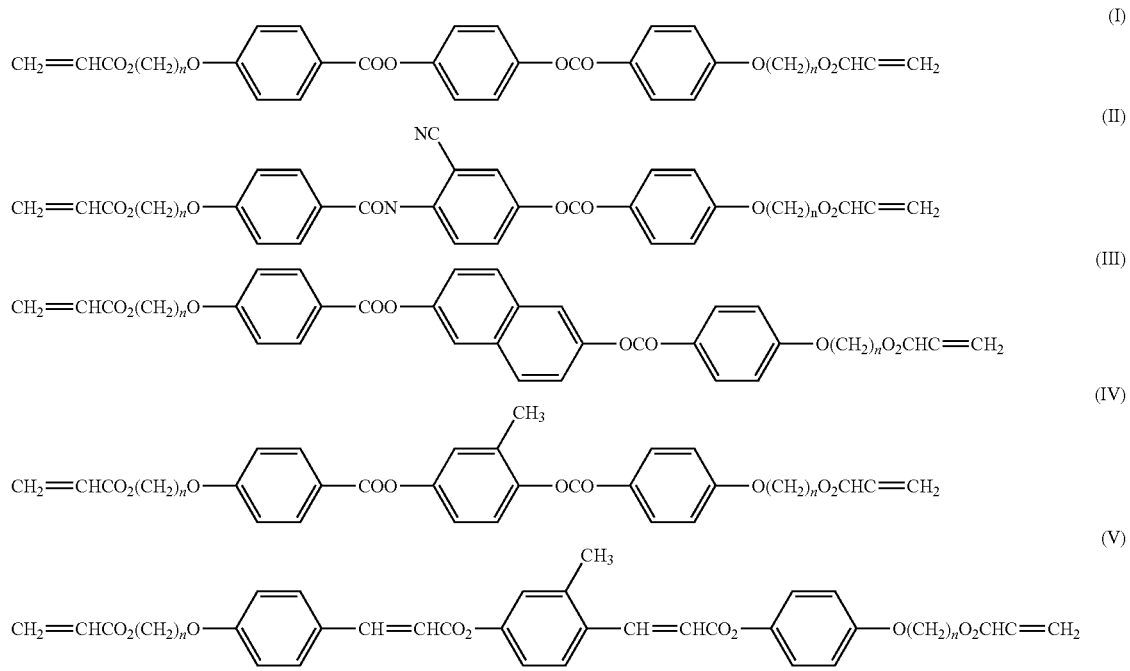

If necessary, in addition to the polyfunctional polymerizable liquid crystal, a polymerizable liquid crystal comprising by formulae (VI) to (IX). In formulae (VI) to (IX), n is a numeric value of 2 to 6.

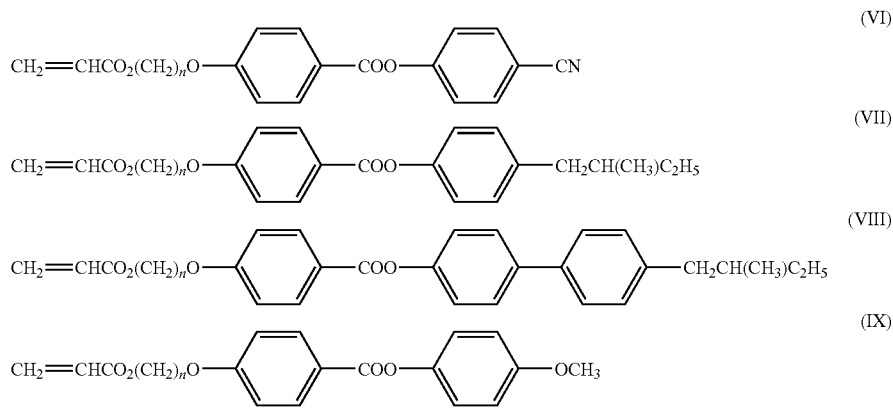

The first birefringence layer 5 is formed by providing a coating composition comprising the above polymerizable liquid crystal and a coupling agent and/or a surfactant which can homeotropically align a polymerizable liquid crystal comprising rodlike molecules, coating the coating composition to form a coating, allowing the polymerizable liquid crystal in the coating to be homeotropically aligned, and then conducting three dimensional crosslinking while maintaining the homeotropic alignment.

If necessary, the coating composition may contain a photopolymerization initiator, a sensitizer, a polyfunctional monomer and the like. The incorporation of the polyfunctional monomer can improve the crosslinkability of the first birefringence layer 5.

Only one coupling agent may be contained in the first birefringence layer 5 so far as the coupling agent can homeotropically align a polymerizable liquid crystal comprising rodlinke molecules. Alternatively, two or more coupling agents may be used. In the homeotropic alignment of the polymerizable liquid crystal, the polymerizable liquid crystal should be once heated to a liquid crystal phase (nematic phase). Therefore, the coupling agent should have heat resistance on such as level that does not cause decomposition upon heating. Further, the coupling agent is added to the polymerizable liquid crystal and thus is preferably soluble in organic solvents.

Specific examples of coupling agents include those produced by hydrolysis of silane compounds such as n-octyltrimethoxysilane, n-octyltriethoxysilane, decyltrimethoxysilane, decyltrimethoxysilane, n-dodecyltrimethoxysilane, n-dodecyltriethoxysilane, octadecyltrimethoxysilane, and octadecyltriethoxysilane.

When the thickness of the first birefringence layer 5 is increased, preferably, the coupling agent has a high level of action through which the polymerizable liquid crystal comprising rodlike molecules can be aligned in a homeotropic form (this action being hereinafter referred to as "alignment regulating force").

Specific examples of such coupling agents include fluorosilane coupling agents (alkyl fluoride group-containing silane coupling agents) produced by hydrolysis of fluorosilane compounds such as perfluoroalkylsilane, pentafluorophenyltrimethoxysilane, pentafluorophenyltriethoxysilane, pentafluorophenylpropyl-trimethoxysilane, pentafluorophenylpropyltriethoxysilane, trifluoropropyltrimethoxysilane, trifluoropropyltriethoxysilane, 1H,1H,2H,2H-perfluorodecyltrimethoxysilane, 1H,1H,2H,2H-perfluorodecyltriethoxysilane, 1H,1H,2H,2H-perfluorooctyltrimethoxy-silane, 1H,1H,2H,2H-perfluorooctyltriethoxysilane, 3-(heptafluoroisopropoxy)propyltrimethoxysilane, and 3-(heptafluoroisopropoxy)propyltriethoxysilane.

The use of a coupling agent having high alignment regulating force facilitates homeotropic alignment of a polymerizable liquid crystal in the formation of the first birefringence layer. Even when the thickness of the first birefringence layer is increased, the polymerizable liquid crystal can be aligned in a homeotropic form. This can enhance the degree of freedom of selection regarding the thickness of the first birefringence layer and facilitate the control of retardation of the optical element.

It is considered that the alignment regulating force occurs as a result of a lowering in wettabiity of the surface of the substrate 1 caused by the coupling agent which is bonded to the surface of the substrate. Therefore, the type of the coupling agent is properly selected deepening upon the material of the substrate 1. Further, it is considered that there is a distribution in the concentration of the coupling agent in the first birefringence layer.

The content of the coupling agent in the first birefringence layer varies depending upon the material of the substrate (material of a layer underlying the first birefringence layer 5), the thickness of the first birefringence layer, the alignment regulating force of the coupling agent and the like. Preferably, however, the content of the coupling agent is about 0.001 to 5% by weight, more preferably about 0.01 to 1% by weight, based on the total amount of the polymerizable liquid crystal. When the content of the coupling agent is high, the polymerizable liquid crystal undergoes phase separation into a region in a non-homeotropic alignment state and a region in a homeotropic alignment state.

The surfactant contained in the first birefringence layer may be a nonionic, cationic, anionic, or any other surfactant so far as the surfactant can align, in a homeotropic form, the polymerizable liquid crystal comprising rodlike molecules. Only one surfactant may be used. Alternatively, a plurality of surfactants may be used in combination. In the homeotropic alignment of the polymerizable liquid crystal, the polymerizable liquid crystal should be once heated to a liquid crystal phase (nematic phase). Therefore, the surfactant should have a certain level of heat resistance. Further, the surfactant is added to the polymerizable liquid crystal and thus is preferably soluble in organic solvents.

Further, when the thickness of the first birefringence layer 5 is increased, preferably, the surfactant has a high level of water repellency or oil repellency. Such surfactants include (a) those having an alkyl chain or a long-chain alkyl side chain, (b) those having an alkyl chain or a long-chain alkyl side chain in which at least a part of the alkyl chain or at least a part of the long-chain alkyl side chain has been substituted by fluorine, or (c) those having a side chain in which side chain contains a fluorine atom.

From the viewpoint of enhancing the degree of freedom of the selection of the thickness of the first birefringence layer, the use of a surfactant having a high level of water repellency or oil repellency, such as a surfactant having a long-chain alkyl group, or a surfactant having a side chain in which the side chain contains a fluorine atom, is preferred. The use of a surfactant having a high level of water repellency or oil repellency can facilitate homeotropic alignment of a polymerizable liquid crystal in the formation of the first birefringence layer. Further, even when the thickness of the first birefringence layer is increased, the polymerizable liquid crystal can be aligned in a homeotropic form. This can enhance the degree of freedom of the selection of the thickness of the first birefringence layer 5 and facilitates the control of retardation of the optical element.

Specific examples of surfactants having a high level of water repellency or oil repellency include (i) lecithin, (ii) octadecyidimethyl (3-trimethoxysilylpropyl)ammonium chloride, (iii) hexadecylamine, (iv) Adeka Mine 4DAC-85 (tradename; a surfactant manufactured by Asahi Denka Kogyo Ltd.), (v) DRYPON 600E (tradename; a surfactant manufactured by Nicca Chemical Co., Ltd.), (vi) DRYPON Z-7 (tradename; a surfactant manufactured by Nicca Chemical Co., Ltd.), and (vii) NK GUARD NDN-7E (tradename; a surfactant manufactured by Nicca Chemical Co., Ltd.).

The content of the surfactant in the first birefringence layer varies depending upon the material of the substrate (material of a layer underlying the first birefringence layer), the thickness of the first birefringence layer, the alignment regulating force of the coupling agent, HLB value of the surfactant and the like. The content of the surfactant, however, can be properly selected in a range of approximately 1/100 to 1/1 in terms of mass ratio on a solid basis of the coupling agent and is preferably about 0.001 to 10% by weight, more preferably about 0.01 to 5% by weight, based on the total amount of the polymerizable liquid crystal.

The coupling agent mainly functions to cause homeotropic alignment of the polymerizable liquid crystal in the interface of the first birefringence layer and the substrate. The surfactant mainly functions to cause homeotropic alignment of the polymerizable liquid crystal on the outer surface side of the first birefringence layer.

The degree of crosslinking in the first birefringence layer is preferably not less than about 80 degrees, more preferably not less than about 90 degrees. The thickness of the first birefringence layer is such that the polymerizable liquid crystal can be aligned in a homeotropic form. Specifically, preferably, the thickness of the first birefringence layer is properly selected so that the retardation in the thickness-wise direction (retardation as the optical element) is not more than about 10 nm. More preferably, the thickness of the first birefringence layer is properly selected so that the retardation is not more than about 5 nm.

In the optical element 10, the first birefringence layer 5 can be formed by a relatively simple method in which coating of a coating composition, alignment treatment, and crosslinking treatment are successively carried out. Therefore, the optical element 10 can be produced at low cost. Further, since the first birefringence layer 5 has a three-dimensionally crosslinked structure, the birefringence characteristics are less susceptible to heat.

This optical element 10 can be used as elements for controlling the polarization state of light, for example, phase difference elements and optical compensation elements. Further, the optical element 10 has relatively high heat resistance and thus can also be used in optical equipment used under an environment in which the temperature is likely to become relatively high, such as car interior. Furthermore, since the optical element 10 has relatively high heat resistance, it can be provided in a liquid crystal panel for displays.

(b) Second Embodiment of Optical Element

Figure 3:
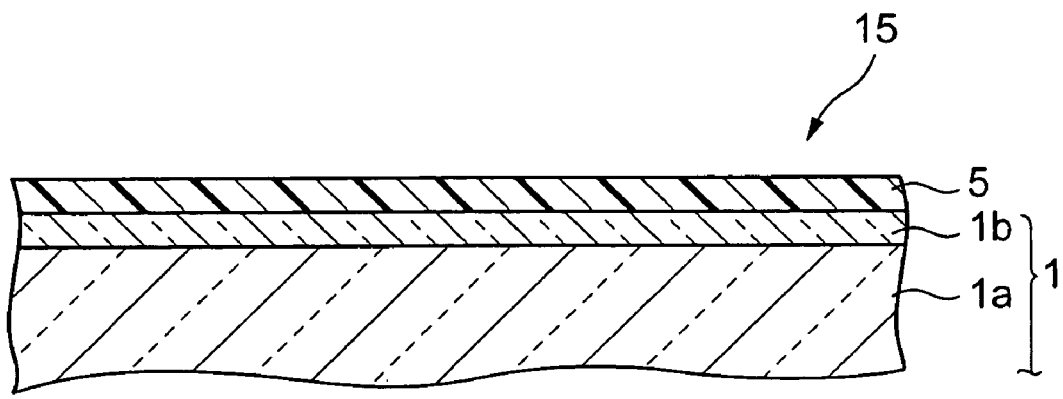
FIG. 3 is a schematic view showing the sectional structure of another embodiment of the optical element according to the present invention.

FIG. 3 is a schematic diagram showing another embodiment of the basic sectional structure of the optical element according to the present invention. A light transparent substrate 1 comprises a light transparent substrate 1*a* and a silicon oxide film 1*b* provided on one side of the light transparent substrate 1*a*. A first birefringence layer 5 is provided on the silicon oxide film 1*b*.

The light transparent substrate 1*a* may be formed of either an inorganic material or an organic material. The silicon oxide film 1*b*, however, is particularly preferably provided when the light transparent substrate 1*a* is formed of neither glass nor silicon oxide. The silicon oxide film 1*b* may be formed, for example, by physical vapor deposition or chemical vapor deposition. For example, even when the substrate 1 is formed of an organic material, a desired first birefringence layer 5 can easily be formed by using the silicon oxide film 1*b* as the substrate layer of the first birefringence layer 5.

Figure 4:
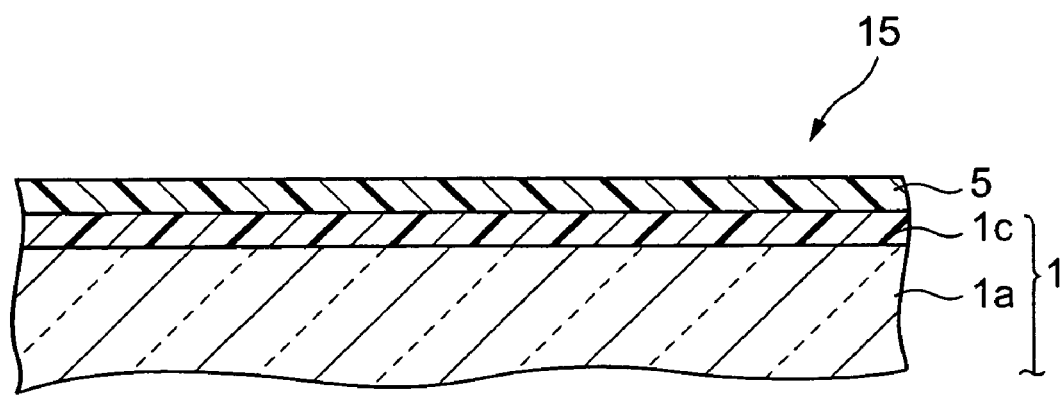
FIG. 4 is a schematic view showing the sectional structure of still another embodiment of the optical element according to the present invention.

When the surfactant is used, as shown in FIG. 4, a vertically aligning film 1*c* may be provided instead of the silicon oxide film 1*b*.

The vertically aligning film 1*c* is provided for homeotropic alignment of the polymerizable liquid crystal in the formation of the first birefringence layer 5. Basically, the vertically aligning film 1*c* may be any film so far as the film can align, in a homeotropic form, the polymerizable liquid crystal comprising rodlike molecules. The vertically aligning film 1*c*, however, suitably has a surface free energy of not more than about 50 mN/m.

In the vertically aligning film 1*c*, for example, a conventional polyimide material may be used as a vertically aligning film material for homeotropic alignment of the liquid crystal. For example, the vertically aligning film 1*c* may be formed by coating a material such as SE-7511 and SE-1211 manufactured by Nicca Chemical Co., Ltd. or JALS-2021-R2 manufactured by JSR Corporation by flexo printing, spin coating or the like and then curing the coating. A film formed of a material having oil repellency can also be used as the vertically aligning film 1*c*. Further, the vertically aligning film may be formed by dissolving the above-described surfactant in an organic solvent such as isopropyl alcohol to prepare a coating liquid to form a coating and curing the coating.

When the thickness of the vertically aligning film is excessively small, the homeotropic alignment of the polymerizable liquid crystal is difficult. On the other hand, when the thickness of the vertically aligning film is excessively large, the homeotroic aligning film is colored, resulting in significantly lowered light transmittance of the optical element. The thickness of the homeotroic aligning film is preferably about 0.01 to 1 μm.

In the optical element in this embodiment, since the vertically aligning film 1*c* is provided, the homeotropic alignment of the polymerizable liquid crystal in the formation of the first birefringence layer 5 is further easier than that in the optical element in the first embodiment. Further, as compared with the optical element in the first embodiment, even when the thickness of the first birefringence layer 5 is further increased, the polymerizable liquid crystal can be easily aligned in a homeotropic form. Therefore, the degree of freedom of the thickness of the first birefringence layer 5 can be further enhanced. This further facilitates the control of retardation of the optical element. The vertically aligning film 1*c* may also be provided in optical elements in respective embodiments which will be described later.

(c) Third Embodiment of Optical Element

Figure 5:
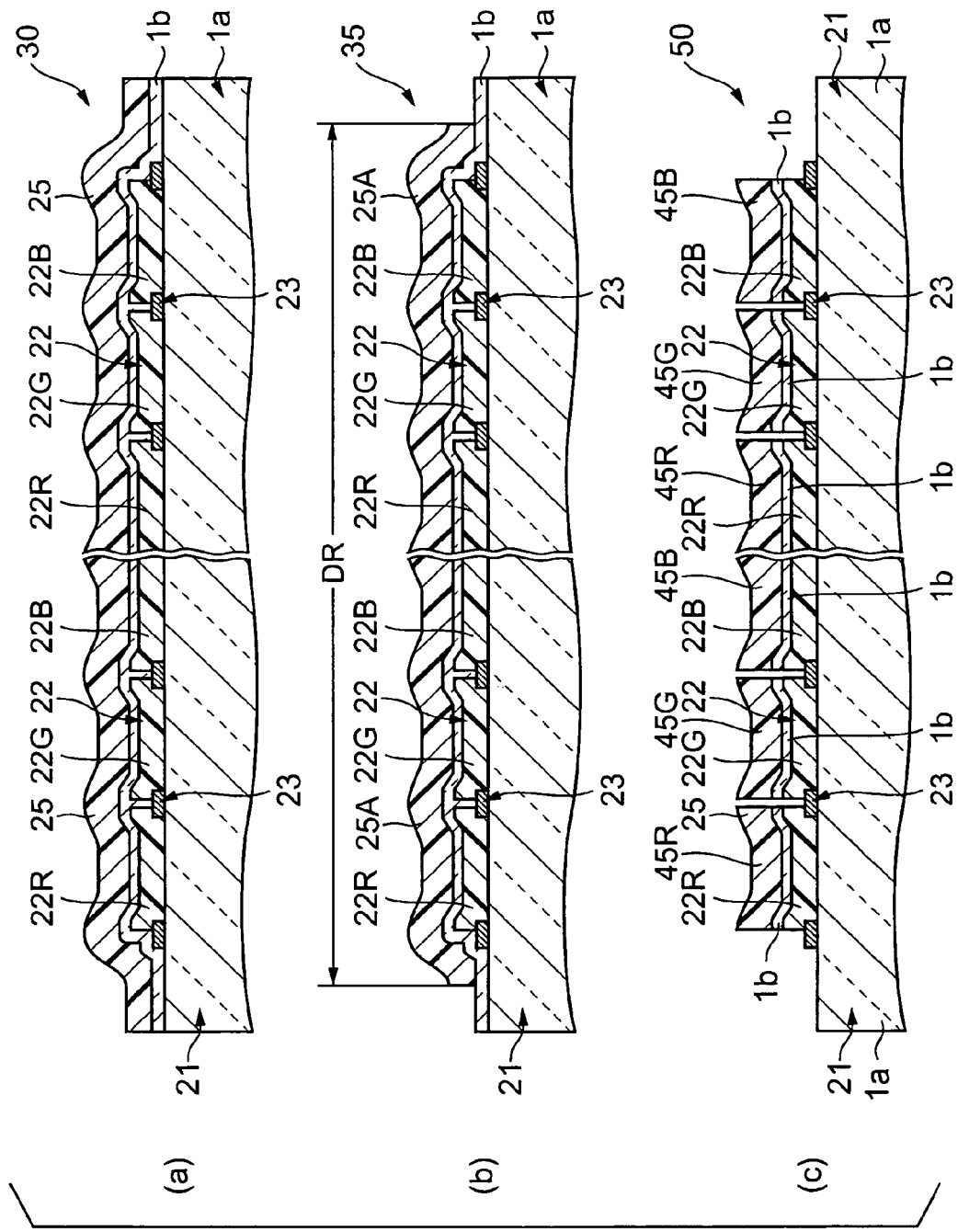
FIG. 5 is a schematic view showing the sectional structure of a further embodiment of the optical element according to the present invention.

FIG. 5(*a*) is a schematic view showing the basic sectional structure of a further embodiment of the optical element according to the present invention. An optical element 30 can be used, for example, as a member for constituting a liquid crystal aligning substrate and has a structure comprising a first birefringence layer 25 provided on a light transparent substrate 21.

Figure 6:
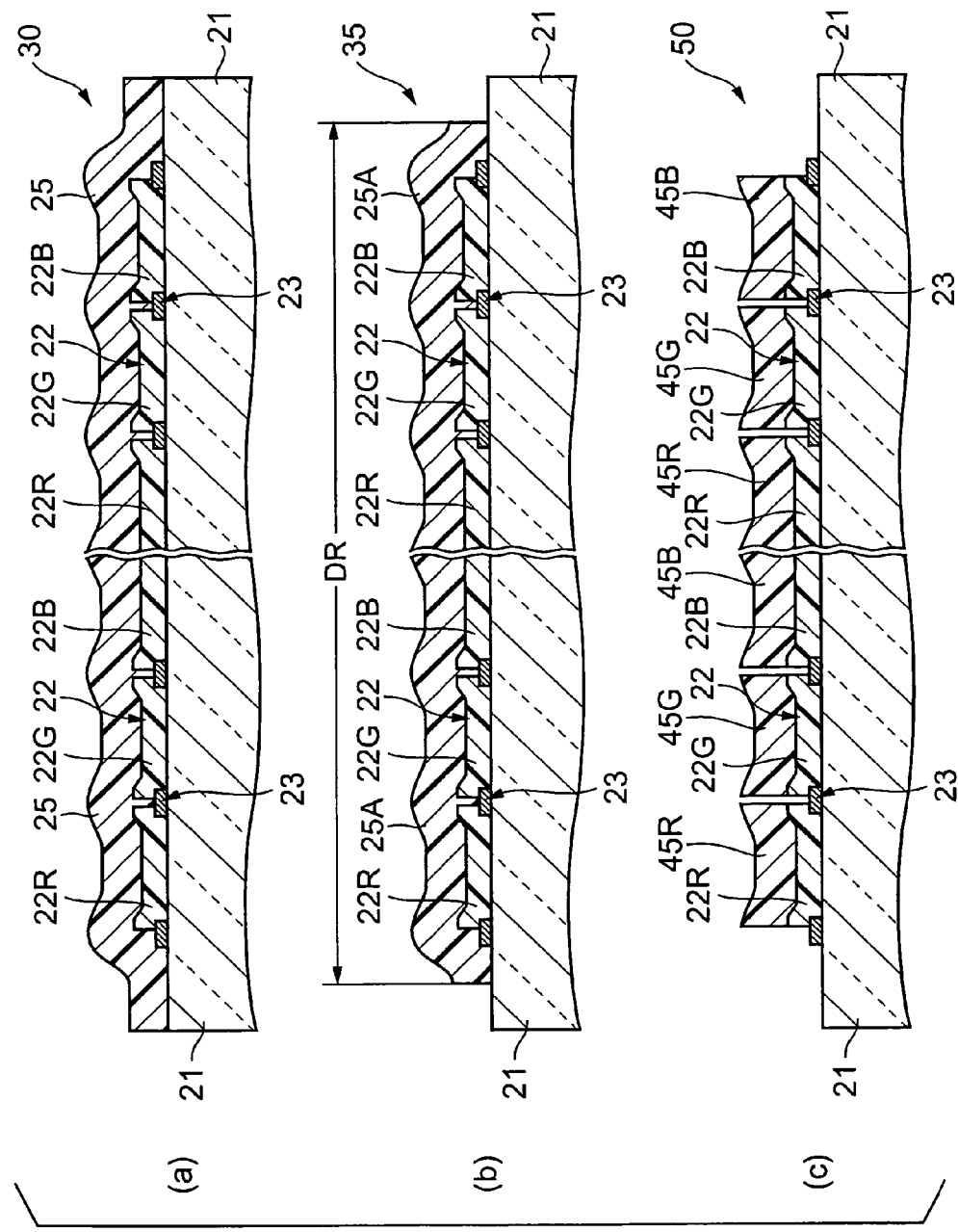
FIG. 6 is a schematic view showing the sectional structure of a still further embodiment of the optical element according to the present invention.

The substrate 21 includes a light transparent substrate 1*a*. A light absorption-type filter 22 (hereinafter referred to simply as "color filter 22") and a light shielding layer (a black matrix) 23 are provided on one side of the light transparent substrate 1*a*. A silicon oxide film 1*b* is provided so as to cover the color filter 22 and the light shielding layer 25. A first birefringence layer 25 is provided on the silicon oxide film 1*b*. As shown in FIG. 6(*a*), the first birefringence layer 25 may be provided on the substrate 21 so as to cover the color filter 22 and the light shielding layer 23.

The color filter 22 is a primary color filter in which a red micro-color filter 22R, a green micro-color filter 22G, and a blue micro-color filter 22B are arranged in a predetermined pattern. Various types of color filters called stripe, mosaic, triangle or other color filters depending upon the form of arrangement of the red micro-color filter 22R, the green micro-color filter 22G, and the blue micro-color filter 22B are known. A complementary color filter may be used instead of the primary color filter.

The color filter 22 may be formed, for example, by patterning a coating of a color resin as the material, for each of the red micro-color filter 22R, the green micro-color filter 22G, and the blue micro-color filter 22B, for example, by photolithography in a predetermined form, or, for example, by coating, for each of the red micro-color filter 22R, the green micro-color filter 22G, and the blue micro-color filter 22B, an ink for the color filter as the material in a predetermined form.

If necessary, the surface of the color filter 22 (each of the micro-color filter 22R, 22G, 22B) can be previously fluorinated. The fluorination treatment can be carried out, for example, by placing the substrate 21 provided with the color filter 22 in a chamber, replacing the atmosphere of the chamber by a mixed atmosphere composed of helium (He) gas and tetrafluoromethylene ($CF_4$) gas, and conducting discharge while applying high frequency electric field to activate $CF_4$ gas. In this case, for example, conditions may be He gas flow rate 10 liters/min, $CF_4$ gas flow rate 100 ccm, frequency of high frequency electric field 13.56 MHz, and discharge electric power 300 W. Previous fluorination of the surface of the color filter 22 can impart a function as a vertically aligning film to the color filter 22.

The light shielding layer 23 is provided, for example, for preventing leakage of light (light leakage) from between pixels in a liquid crystal panel for display, and for preventing light deterioration of an active element in an active matrix drive-type liquid crystal panel for display, and define, on plane vision, individual pixels in the liquid crystal panel for display. The red micro-color filter 22R, the green micro-color filter 22G, and the blue micro-color filter 22B are arranged, on plane vision, so as to cover predetermined pixels defined by the light shielding layer 23.

The light shielding layer 23 may be formed, for example, by patterning a metallic thin film having light shielding or light absorbing properties, such as a metallic chromium thin film or a tungsten thin film, in a predetermined form. Alternatively, the light shielding layer 23 may be formed by printing an organic material such as a black resin in a predetermined form. A monochromatic color filter may also be used as the color filter 22. In this case, the provision of the light shielding layer 23 can be omitted.

The first birefringence layer 25 has a size and a shape which overlap with the substrate 21 on plane vision. Therefore, the region of the first birefringence layer 25 is larger than the display region in the liquid crystal panel for display. When the optical element 30 having the above construction is applied to a member for constituting the substrate for liquid crystal alignment, by virtue of relatively high heat resistance of the first birefringence layer 25, a liquid crystal panel for display comprising the first birefringence layer 25 in a liquid crystal cell can be provided. Therefore, the first birefringence layer is less likely to be damaged during the production process of the liquid crystal display device. The first birefringence layer can be utilized as the so-called "+C plate."

(d) Fourth-Embodiment of Optical Element

FIG. 5(b) and FIG. 6(b) are schematic diagrams showing further embodiment of the basic sectional structure of the optical element according to the present invention. An optical element 35 is different from the optical element in the third embodiment (see FIG. 5(a) and FIG. 6(a)) in that the first birefringence layer is provided only in region DR corresponding to the display region in the liquid crystal panel for display.

When the optical element 35 is used as a member for constituting the substrate for liquid crystal alignment, as with the case where the optical element in the third embodiment is used as the member for constituting the substrate for liquid crystal alignment, a liquid crystal panel for display, in which a first birefringence layer 25A is disposed within a liquid crystal cell, can be provided. Therefore, the first birefringence layer is less likely to be damaged during the production process of the liquid crystal display device. The first birefringence layer 25A can be utilized as the so-called "+C plate."

(e) Fifth Embodiment of Optical Element

FIG. 5(c) is a schematic diagram showing another embodiment of the basic sectional structure of the optical element according to the present invention. An optical element 50 is different from the optical element in the third embodiment in that the first birefringence layers 45R, 45G, and 45B having a predetermined thickness are provided through a silicon oxide film 1b on the respective micro-color filter 22R, 22G, 22B. The first birefringence layer 45R is provided through the silicon oxide film 1b on the micro-color filter 22R, the first birefringence layer 45G is provided through the silicon oxide film 1b on the micro-color filter 22G, and the first birefringence layer 45B is provided through the silicon oxide film 1b on the micro-color filter 22B. Further, as shown in FIG. 6(c), first birefringence layers 45R, 45G, and 45B having a predetermined thickness may be provided on respective micro-color filter 22R, 22G, and 22B.

Even when light is incident on the same medium, the refractive index of light varies depending upon wavelength. Therefore, for example, the birefringence Δn of the first birefringence layer 5 shown in FIG. 1 also varies depending upon the wavelength of incident light. Retardation of red light, retardation of green light, and retardation of blue light can be controlled separately from each other by providing first birefringence layers 45R, 45G, and 45B having a predetermined thickness respectively on the red micro-color filter 22R, the green micro-color filter 22G, and the blue micro-color filter 22B. Therefore, according to the optical element 50 in this embodiment, as compared with the optical element 30 in the third embodiment and the optical element 35 in the fourth embodiment, the polarization state of light can be controlled more accurately. The first birefringence layers 45R, 45G, and 45B can be formed at respective predetermined sites, for example, by photolithography.

When the optical element 50 is used as a member for constituting the substrate for liquid crystal alignment, as with the case where the optical element in the third embodiment is used for the formation of the substrate for liquid crystal alignment, a liquid crystal panel for display, in which first birefringence layers 45R, 45G, 45B are disposed within a liquid crystal cell, can be provided. Therefore, the first birefringence layers 45R, 45G, 45B are less likely to be damaged during the production process of the liquid crystal display device. The first birefringence layers 45R, 45G, 45B can be utilized as the so-called "+C plate."

(f) Sixth to Eighth Embodiments of Optical Element

Figure 7:
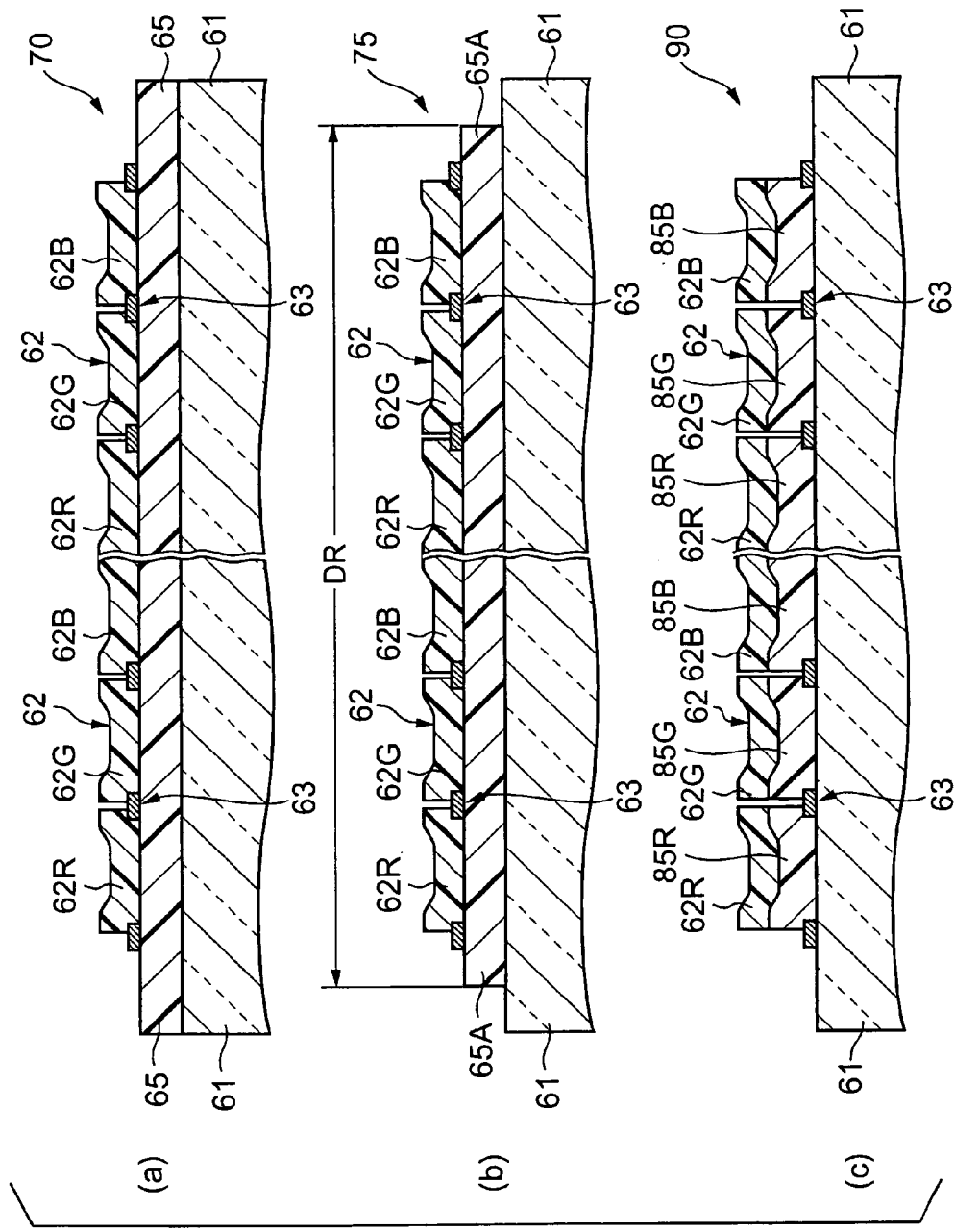
FIG. 7 is a schematic view showing the sectional structure of another embodiment of the optical element according to the present invention.

FIG. 7(a) is a schematic diagram showing another embodiment of the basic sectional structure of the optical element according to the present invention. An optical element 70, which is an optical element in the sixth embodiment, is different from the optical element in the third embodiment in that a first birefringence layer 65 is provided on one side of a glass substrate 61 as the light transparent substrate and a color filter 62 and a light shielding layer (black matrix) 63 are provided on the first birefringence layer 65. The optical element 70 has the same technical effect as the optical element 30 in the third embodiment.

FIG. 7(b) is a schematic diagram showing still another embodiment of the basic sectional structure of the optical element according to the present invention. An optical element 75, which is an optical element in the seventh embodiment, is different from the optical element in the fourth embodiment in that a first birefringence layer 65 is provided on one side of a glass substrate 61 as the light transparent substrate and a color filter 62 and a light shielding layer (black matrix) 63 are provided on the first birefringence layer 65. As with FIG. 5 and FIG. 6(b), the region corresponding to the display region in the liquid crystal panel for display is indicated by a reference character DR. The optical element 75 has the same technical effect as the optical element in the fourth embodiment.

FIG. 7(c) is a schematic diagram showing a further embodiment of the basic sectional structure of the optical element according to the present invention. An optical element 90, which is an optical element in the eighth embodiment, is different from the optical element in the fifth embodiment in that first birefringence layers 85R, 85G, and 85B having a predetermined thickness are provided on one side of a glass substrate 61 as the light transparent substrate and micro-color filters 62R, 62G, and 62B are provided on the first birefringence layers 85R, 85G, and 85B. The optical element 90 has the same technical effect as the optical element in the fifth embodiment.

In the optical elements 70, 75, and 90 in the sixth to eighth embodiments shown in FIGS. 7(a) to 7(c), a resin substrate or a resin film may be used instead of the glass substrate 61. In this case, preferably, an inorganic material film such as a silicon oxide film is provided on the resin substrate or the resin film, and first birefringence layers 65, 65A, 85R, 85G, 85B are provided thereon.

(g) Ninth Embodiment of Optical Element

Figure 8:
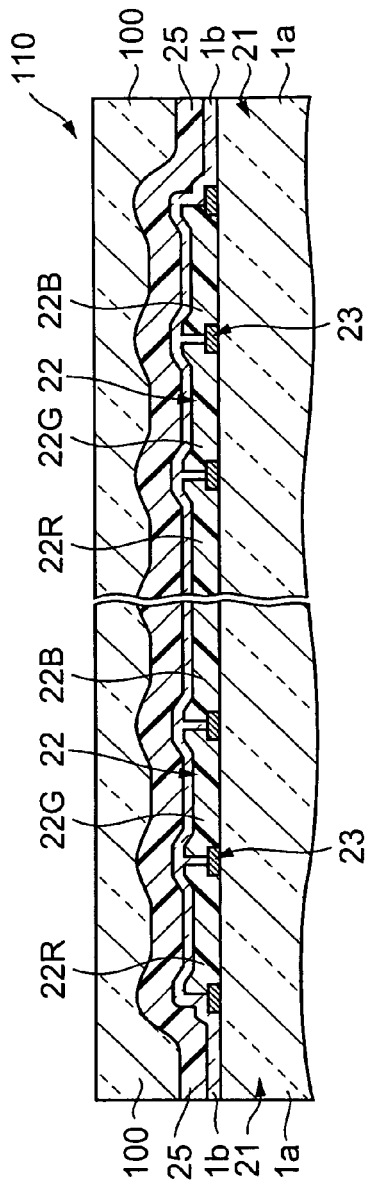
FIG. 8 is a schematic view showing the sectional structure of still another embodiment of the optical element according to the present invention.
Figure 9:
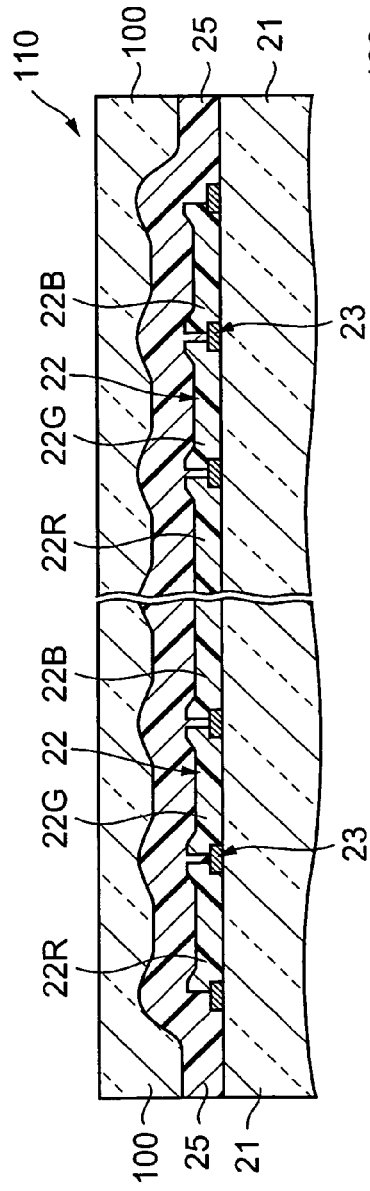
FIG. 9 is a schematic view showing the sectional structure of a further embodiment of the optical element according to the present invention.

FIGS. 8 and 9 are schematic diagrams showing another embodiments of the basic sectional structure of the optical element according to the present invention. An optical element 110 is different from the optical element in the third embodiment in that a first birefringence layer 25 is covered with a protective layer 100.

The protective layer 100 is a layer for improving flatness, chemical resistance, heat resistance, ITO (indium tin oxide) resistance and the like. This protective layer may be formed of various photocurable resins or heat-curable resins, or two-component curable resins, for example, acrylic resins, epoxy resins, and polyimide resins. The protective layer may be formed by spin coating, printing, photolithography or the like depending upon the material. The thickness of the protective layer is preferably about 0.3 to 5.0 µm, more preferably about 0.5 to 3.0 µm.

The optical element 110 has the same technical effect as the optical element in the third embodiment, and, by virtue of the provision of the protective layer, has an additional technical effect that the reliability of the birefringence characteristics is improved. The protective layer 100 may also be provided in the optical element in each of the above first embodiment, the second embodiment, and the fourth to eighth embodiments and may further provided in optical elements in respective embodiments which will be described later.

(h) Tenth Embodiment of Optical Element

Figure 10:
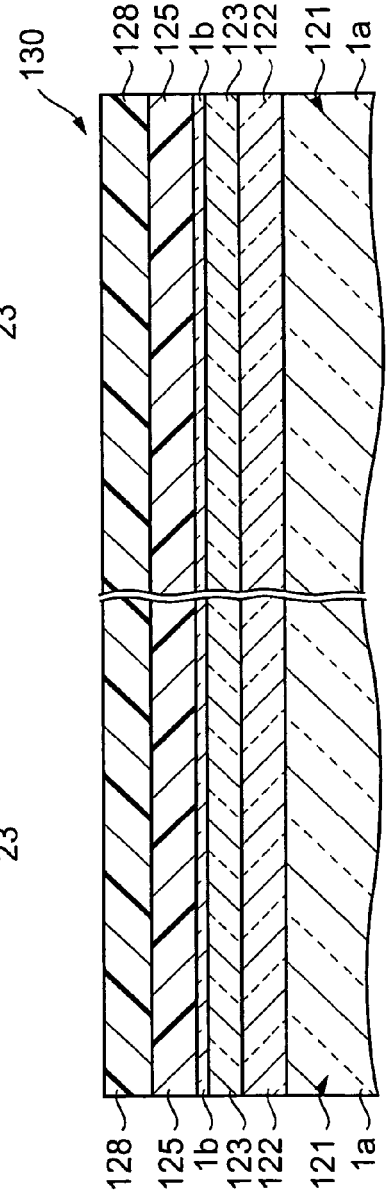
FIG. 10 is a schematic view showing the sectional structure of a still further embodiment of the optical element according to the present invention.
Figure 11:
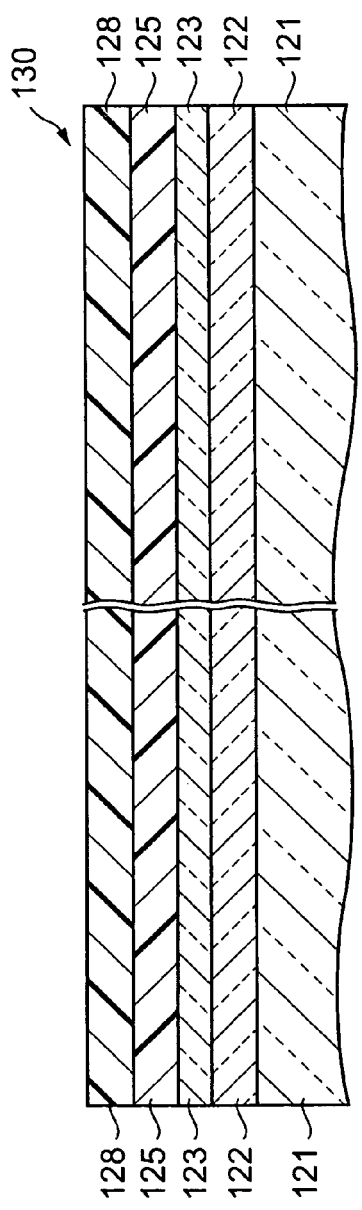
FIG. 11 is a schematic view showing the sectional structure of another embodiment of the optical element according to the present invention.

FIGS. 10 and 11 are schematic diagrams showing another embodiment of the basic sectional structure of the optical element according to the present invention. In the optical element 130 in the embodiment shown in FIG. 10, a linear polarizing element 122 and a quarter-wavelength plate 123 are stacked in that order on one side of a light transparent substrate 121a. A silicon oxide film 1b, a first birefringence layer 125, and a second birefringence layer 128 are stacked in that order on the quarter-wavelength plate 123. The light transparent substrate 121a, the linear polarizing element 122, the quarter-wavelength plate 123, and the silicon-oxide film 1b constitute the light transparent substrate 121. Further, in the optical element 130 in the embodiment shown in FIG. 11, the first birefringence layer 125 and the second birefringence layer 128 are stacked in that order on the quarter-wavelength plate 123.

In the substrate for liquid crystal alignment including the optical element 130 shown in FIG. 10, the linear polarizing element 122, the quarter-wavelength plate 123, the silicon oxide film 1b, the first birefringence layer 125, and the second birefringence layer 128 are disposed so as to face outward to constitute the liquid crystal panel for display. This substrate for liquid crystal alignment may be used, for example, as the substrate on the back side of the liquid crystal panel for display in a transmission liquid crystal display device.

The linear polarizing element 122 functions as a polarizer in the liquid crystal panel for display. The quarter-wavelength plate 123 is an optical element for converting circularly polarized light to linearly polarized light. The silicon oxide film 1b and the first birefringence layer 125 are constituted in the same manner as the silicon oxide film 1b and the first birefringence layer 5, respectively, in the optical element in the second embodiment. The silicon oxide film 1b suppresses the influence of the optical element 130 on the optical characteristics. For this reason, the silicon oxide film 1b is preferably a $\lambda/2$ film. Further, the first birefringence layer 125 is a birefringence layer constructed in the same manner as in the first birefringence layer in the optical element in the first embodiment and converts elliptically polarized light to circularly polarized light.

The second birefringence layer 128 is a birefringence layer for taking out predetermined circularly polarized light from natural light and is formed of, for example, a cholesteric liquid crystal in which the molecular arrangement has been fixed by crosslinking. In providing the second birefringence layer 128, the use of a chiral nematic liquid crystal obtained by adding a chiral agent to a nematic liquid crystal is preferred. In this case, a polymerizable chiral agent is preferably used as the chiral agent. The second birefringence layer 128 is different from the first birefringence layer 125 in birefringence characteristics.

When a substrate for liquid crystal alignment including the optical element 130 is prepared and is then used for the preparation of a liquid crystal panel for display, light utilization efficiency can be enhanced even in the case of low backlight luminance and, as a result, bright image display can be realized for the following reason.

That is, in order to enhance utilization efficiency of light emitted from the backlight, preferably, the quantity of circularly polarized light incident on the quarter-wavelength plate 123 is increased. To this end, preferably, predetermined circularly polarized light (either left-hand circularly polarized light or right-hand circularly polarized light) is taken out from the above emitted light through the second birefringence layer 128. In this case, the other circularly polarized light is not incident on the second birefringence layer 128 and is reflected. For example, when a mirror is disposed on the rear of the backlight, upon reflection of the other circularly polarized light from the second birefringence layer 128 by the mirror, the phase is reversed to the above one circularly polarized light. Therefore, a major part of light emitted from the backlight can be incident as the above one circularly polarized light on the quarter-wavelength plate 123.

However, emitted light having a large angle of incidence on the second birefringence layer 128 is disadvantageously converted by the second birefringence layer 128 to elliptically polarized light. This elliptically polarized light contains both left-hand circularly polarized light and right-hand circularly polarized light. In this case, the circularly polarized light corresponding to the above other circularly polarized light is not converted by the quarter-wavelength plate 123 to linearly polarized light and disadvantageously becomes elliptically polarized light or is disadvantageously absorbed in the linearly polarizing element 122. When the first birefringence layer 125 is provided between the second birefringence layer 128 and the quarter-wavelength plate 123, the light converted to the elliptically polarized light by the second birefringence layer 128 can be converted to circularly polarized light. As a result, the quantity of circularly polarized light incident on the quarter-wavelength plate 123 is increased. Therefore, light utilization efficiency can be enhanced even in the case of low backlight luminance and, as a result, bright image display can be realized.

When a substrate for liquid crystal alignment including the optical element 130 is prepared and is then used for the preparation of a liquid crystal panel for display, the production cost of the first birefringence layer 125 can easily be lowered. Further, since the birefringence characteristics of the first birefringence layer 125 are less susceptible to heat, a liquid crystal display device having a high level of display characteristics and usable in various applications can easily be provided at low cost.

When the order to stacking of elements from the linearly polarizing element 122 to the second birefringence layer 128 is made opposite to that shown in the drawing, the linearly polarizing element 122, the quarter-wavelength plate 123, the silicon oxide film 1b, the first birefringence layer 125, and the second birefringence layer 128 can be disposed on the inner side of the liquid crystal panel for display.

In the optical element shown in FIG. 10, when the silicon oxide film 1b, the first birefringence layer 125, the quarter-wavelength plate 123, and the linearly polarizing element 122 are stacked in that order on the light transparent substrate 121a, an optical element utilizable in the substrate for liquid crystal alignment used as the substrate on the display surface side of the liquid crystal panel for display in a reflection-type liquid crystal display device can be provided. In this case, when the substrate 121 is formed of glass or silicon oxide, the provision of the silicon oxide film 1b can be omitted. Similarly, an optical element utilizable in the substrate for liquid crystal alignment used as the substrate on display surface side of the liquid crystal panel for display in the reflection-type liquid crystal display device can also be formed by forming the first birefringence layer 125 on one side of the light transparent substrate 121a directly or through the silicon oxide film 1b and stacking the quarter-wavelength plate 123 and the linearly polarizing element 122 in that order on the other side of the light transparent substrate 121a.

In the optical element in the embodiment shown in FIG. 11, when the first birefringence layer 125, the quarter-wavelength plate 123, and the linearly polarizing element 122 are stacked in that order on the substrate 121, an optical element utilizable in the substrate for liquid crystal alignment used as the substrate on the display surface side of the liquid crystal panel for display in a reflection-type liquid crystal display device can be provided. Similarly, an optical element utilizable in the substrate for liquid crystal alignment used as the substrate on display surface side of the liquid crystal panel for display in the reflection-type liquid crystal display device can also be formed by forming the first birefringence layer 125 on one side of the substrate 121 and stacking the quarter-wavelength plate 123 and the linearly polarizing element 122 in that order on the other side of the substrate 121.

In the reflection-type liquid crystal display device including the optical element as a part of the substrate for liquid crystal alignment, since the polarized state of light incident on the reflector can be made close to true circularly polarized light, high-contrast display can easily be realized.

(i) Eleventh Embodiment of Optical Element

Figure 12:
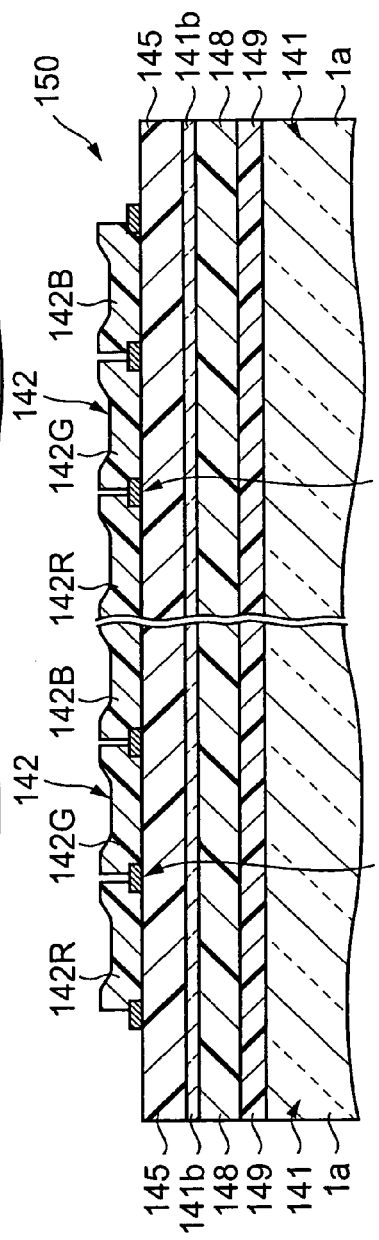
FIG. 12 is a schematic view showing the sectional structure of still another embodiment of the optical element according to the present invention.

FIG. 12 is a schematic diagram showing another embodiment of the basic sectional structure of the optical element according to the present invention. In an optical element 150, a horizontally aligning film 149, a second birefringence layer 148, a silicon oxide film 141b, and a first birefringence layer 145 are stacked in that order on one side of a light transparent substrate 141a, and a color filter 142 and a light shielding layer (black matrix) 143 are provided on the first birefringence layer 145. The light transparent substrate 141a, the horizontally aligning film 149, the second birefringence layer 148, and the silicon oxide film 141b constitute the light transparent substrate 141.

Figure 13:
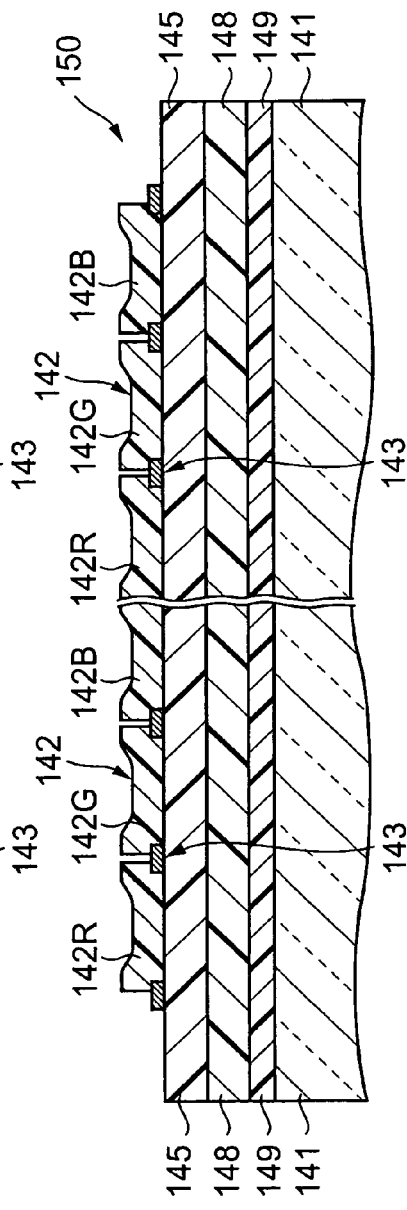
FIG. 13 is a schematic view showing the sectional structure of a further embodiment of the optical element according to the present invention.

As shown in FIG. 13, the provision of the silicon oxide film 141b may be omitted. In the substrate for liquid crystal alignment using the optical element 150, the horizontally aligning film 149, the second birefringence layer 148, and the first birefringence layer 145 are disposed so as to face inward to constitute the liquid crystal panel for display. Further, the substrate for liquid crystal alignment is used as the substrate on the display surface side of the liquid crystal panel for display.

The light transparent substrate 141a and the silicon oxide film 141b are constructed in the same manner as in the light transparent substrate 1 or the silicon oxide film 1b in the optical element in the third embodiment. The horizontally aligning film 149 can align the liquid crystal horizontally and may be formed, for example, by subjecting the surface of a film formed of a resin material to rubbing or light alignment treatment. The second birefringence layer 148 is formed of, for example, a polymer in which a polymerizable liquid crystal has been fixed in a homogeneously aligned state. The second birefringence layer 148 functions as a birefringence layer which is optically uniaxial and has the optical axis within the plane (the so-called "+A plate"). The second birefringence layer 148 is different from the first birefringence layer 145 in birefringence characteristics.

The color filter 142 and the light shielding layer 143 are constructed in the same manner as in the color filter 62 and the light shielding layer 63 in the optical element 70 in the sixth embodiment shown in FIG. 7(a).

The horizontally aligning film 149 can align liquid crystal molecules horizontally and may be formed, for example, by subjecting the surface of a film formed of a resin material to rubbing or light alignment treatment. The second birefringence layer 148 is formed of, for example, a polymer in which a polymerizable liquid crystal has been fixed in a homogeneously aligned state. The second birefringence layer 148 functions as a birefringence layer which is optically uniaxial and has the optical axis within the plane (the so-called "+A plate"). The second birefringence layer 148 is different from the first birefringence layer 145 in birefringence characteristics. The silicon oxide film suppresses the influence of the optical element on the optical characteristics. For this reason, the silicon oxide film 81b is preferably a λ/2 film.

In the substrate for liquid crystal alignment using this optical element 150, the horizontally aligning film 149, the second birefringence layer 148, the silicon oxide film 141b, and the first birefringence layer 145 are disposed so as to face inward to constitute the liquid crystal panel for display. This substrate for liquid crystal alignment is used as the substrate on the display surface side in the liquid crystal panel for display.

The substrate for liquid crystal alignment including the optical element 150 includes the first birefringence layer 145 and the second birefringence layer 148. Therefore, visual angle characteristics in the direction of an azimuth of 45 degrees or 135 degrees to the delay phase axis of an analyzer can be improved.

Further, when a liquid crystal panel for display is prepared using the substrate for liquid crystal alignment including the optical element 150, the production cost is low and, in addition, a birefringent material having birefringence characteristics which is less susceptible to heat can be realized.

+A plate of a stretched resin film may also be used as the second birefringence layer 148. In this case, the provision of the horizontally aligning film 149 is omitted. The +A plate of a stretched resin film is applied to the light transparent substrate 141a with the aid of an adhesive.

A method may also be adopted in which the color filter 142 and the light shielding layer 143 are provided on the second birefringence layer 148, the silicon oxide film 141b is provided so as to cover the color filter 142 and the light shielding layer 143, and the first birefringence layer 145 is provided thereon. Further, a method may also be adopted in which the color filter 142, the light shielding layer 143, the silicon oxide film 141b, and the first birefringence layer 145 are provided on one side of the light transparent substrate 141a, and the second birefringence layer 148 is provided on the other side of the substrate 141.

Figure 14:
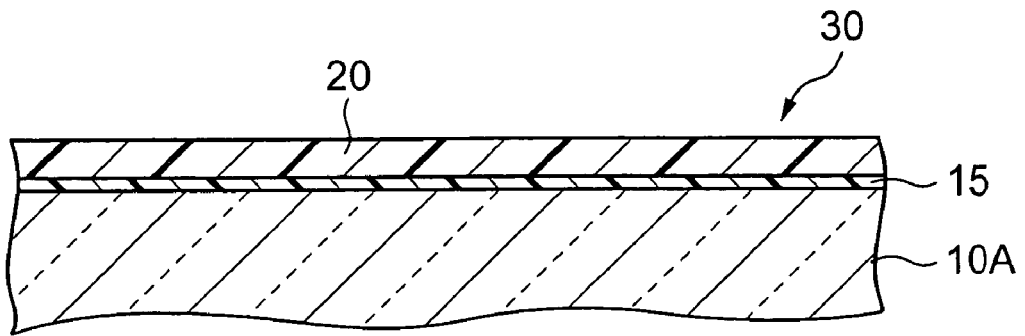
FIG. 14 is a diagram showing an example of the basic sectional structure of an optical element in the second aspect of the present invention.

2. Optical Element According to Second Aspect of Invention (a) First embodiment of optical element FIG. 14 is a schematic diagram showing an embodiment of the basic sectional structure of the optical element according to the present invention. An optical element 30 comprises a light transparent substrate 10A, a vertically aligning film 15 provided on the substrate 10A, and a first birefringence layer 20 provided on the vertically aligning film 15.

The substrate and the first birefringence layer may be the same as those used in the optical element according to the first aspect of the present invention.

The vertically aligning film 15 functions to cause homeotropic alignment of a polymerizable liquid crystal in the step of forming the first birefringence layer 20. This vertically aligning film 15 is formed of a surfactant having a long-chain alkyl group. The term "long-chain alkyl group" as used herein refers to an alkyl group having 3 to 20 carbon atoms. The surfactant may be the same as that used in the optical element according to the first aspect of the present invention.

When the water repellency or the oil repellency of the vertically aligning film 15 is on a high level, the homeotropic alignment of the polymerizable liquid crystal can easily be made in forming the first birefringence layer 20. Further, even when the thickness of the first birefringence layer 20 is increased, the polymerizable liquid crystal can be aligned in a homeotropic form. Therefore, the degree of freedom of selection of the thickness of the first birefringence layer 20 can be enhanced, and the retardation of the optical element 30 can be easily controlled in various ways.

The vertically aligning film 15 may be formed, for example, by dissolving a desired surfactant in an organic solvent such as isopropyl alcohol to prepare a coating liquid, coating the coating liquid onto desired sites by spin coating or the like to form a coating, and then drying (curing) the coating. The thickness of the vertically aligning film 15 is properly selected in the range of about 0.01 to 1 μm.

The first birefringence layer 20 provided on the vertically aligning film 15 has a structure that a polymerizable liquid crystal comprising rodlike molecules has been three-dimensionally crosslinked while holding the homeotropic alignment.

Figure 15:
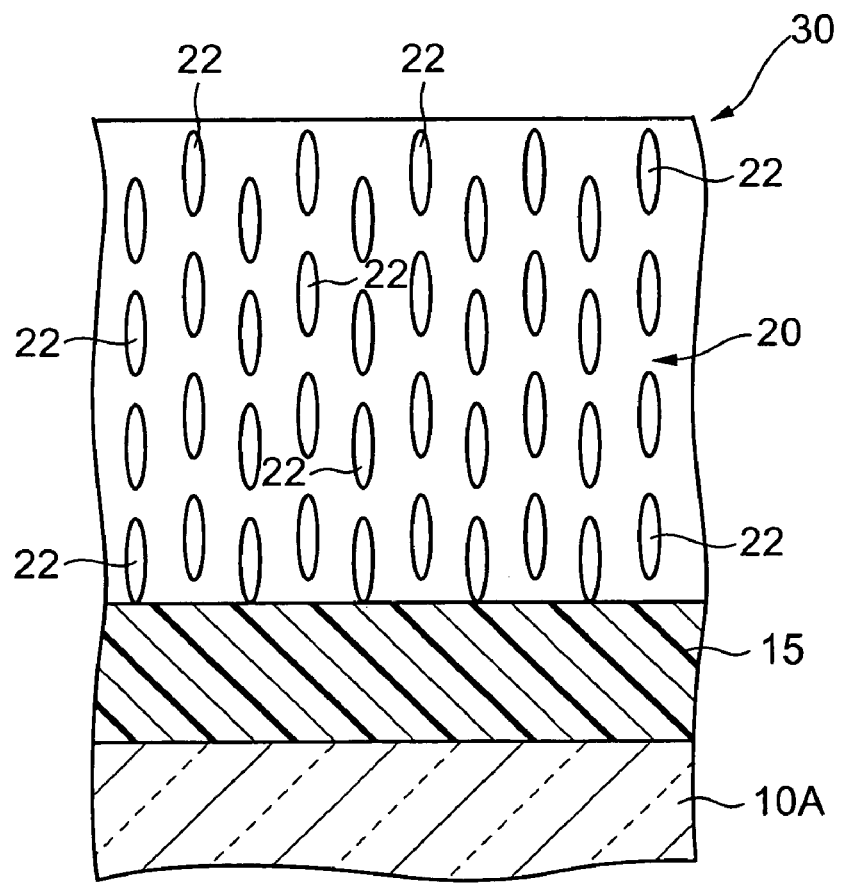
FIG. 15 is a typical cross-sectional view showing the structure of a birefringence layer constituting the optical element shown in FIG. 14.

FIG. 15 is a schematic cross-sectional view showing the structure of the first birefringence layer 20. The first birefringence layer 20 has a structure that a polymerizable liquid crystal comprising rodlike molecules has been three-dimensionally crosslinked while holding the homeotropic alignment. In the drawing, numeral 22 designates rodlike polymerizable liquid crystal molecules as the structural unit. In FIG. 15, for convenience, a bonding hand in the polymerizable liquid crystal molecules 22 is not shown.

In the optical element 30, since the vertically aligning film 15 and the first birefringence layer 20 can easily be formed, the production cost is low. Further, since the first birefringence layer 20 has a three-dimensionally crosslinked structure, the birefringence characteristics are less susceptible to heat.

(b) Second Embodiment of Optical Element

Figure 16:
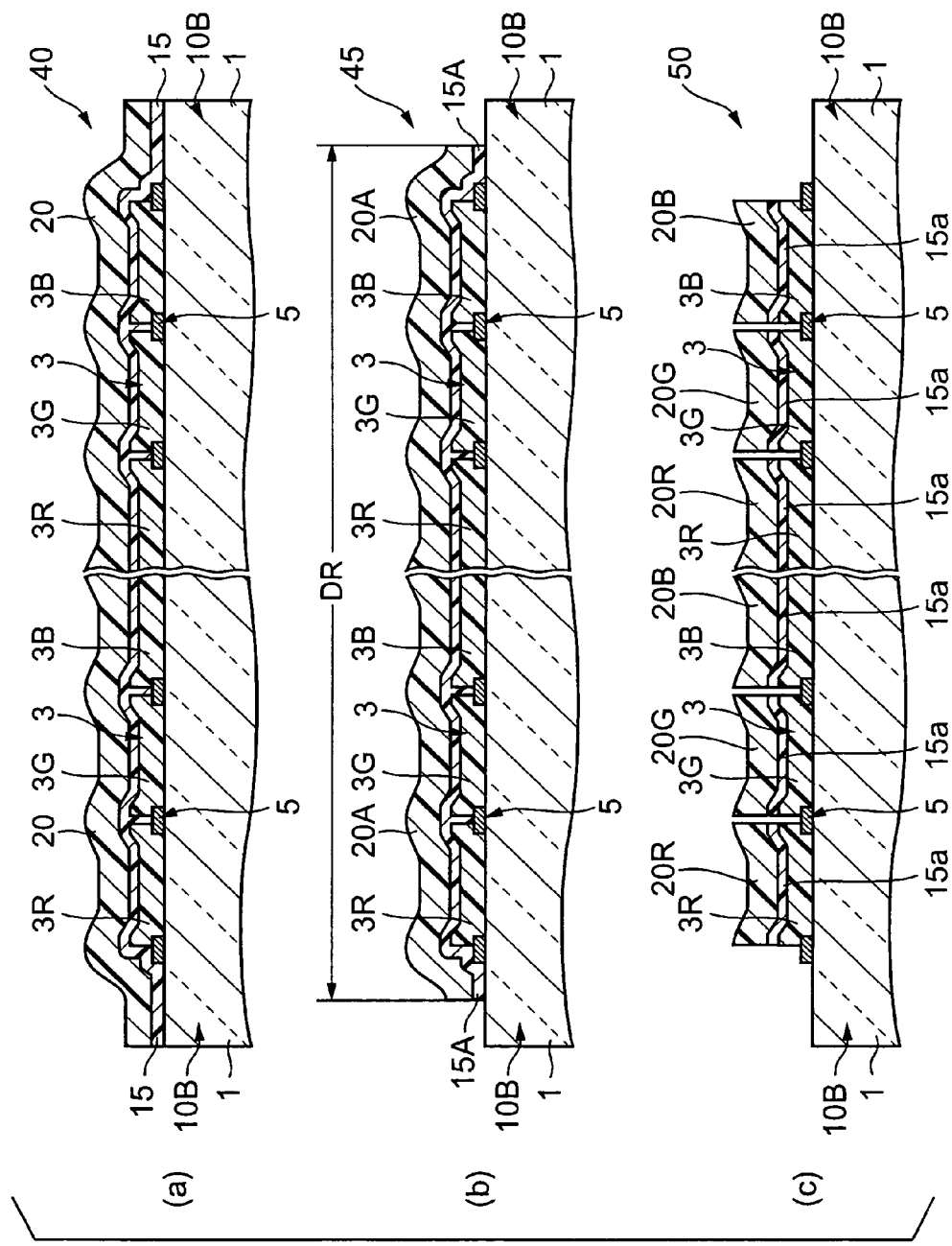
FIG. 16 is a schematic diagram showing the sectional structure of another embodiment of the optical element in the second aspect of the present invention.

FIG. 16 is a schematic diagram showing another embodiment of the basic sectional structure of the optical element according to the present invention. The optical element 40 includes a vertically aligning film 15 provided on a light transparent substrate 10B. A first birefringence layer 20 is provided on the vertically aligning film 15. The optical element 40 is characterized by the construction of the substrate 10B. The construction of the vertically aligning film 15 and the first birefringence layer 20 is the same as that in the optical element in the first embodiment.

The substrate 10B shown in the drawing comprises a light transparent substrate 1 and a light absorption-type color filter 3 (hereinafter referred simply as "color filter 3") and a light shielding layer (black matrix) 5.

The light transparent substrate 1 may be a plate or sheet formed of, for example, a transparent inorganic material such as glass. Alternatively, a plate, sheet, or film formed of a transparent resin may be used as the light transparent substrate 1. The light transparent substrate 1 is preferably optically isotropic. In addition to the color filter 3 and the light shielding film 5, a desired layer may be provided on the light transparent substrate 1. The color filter and the light shielding layer may be the same as those used in the optical element in the first embodiment.

In the optical element 40, a vertically aligning film 15 is provided so as to cover the color filter 3 and the light shielding layer 5. A first birefringence layer 20 is provided on the vertically aligning film 15. The first birefringence layer 20 has size and shape which overlap, on plane vision, with the light transparent substrate 1. Therefore, the first birefringence layer 20 is larger than the display region in the liquid crystal panel for display.

When the optical element 40 having the above construction is applied to a member for constituting the substrate for liquid crystal alignment, by virtue of relatively high heat resistance of the first birefringence layer 20, a liquid crystal panel for display comprising the first birefringence layer 20 in a liquid crystal cell can be provided. Therefore, the first birefringence layer 20 is less likely to be damaged during the production process of the liquid crystal display device. The first birefringence layer 20 can be utilized as the so-called "+C plate."

When the optical element 40 is used as a member for constituting the substrate for liquid crystal alignment, the first birefringence layer 20 can be produced at low cost and a birefringent material having birefringence characteristics which are less susceptible to heat can be realized.

(c) Third Embodiment of Optical Element

FIG. 16(b) is a schematic diagram showing another embodiment of the basic sectional structure of the optical element according to the present invention. An optical element 45 is different from the optical element 40 in the second embodiment in that the vertically aligning film and the first birefringence layer are provided only in region DR corresponding to the display region in the liquid crystal panel for display.

When the optical element 45 is used as a member for constituting the substrate for liquid crystal alignment, the same technical effect as attained by the case where the optical element 40 in the second embodiment is used as the member for constituting the substrate for liquid crystal alignment can be attained.

(d) Fourth Embodiment of Optical Element

FIG. 16(c) is a schematic diagram showing another embodiment of the basic sectional structure of the optical element according to the present invention. An optical element 50 is different from the optical element 40 in the second embodiment in that the vertically aligning film 15a is provided only on the micro-color filters 3R, 3G, 3B and the first birefringence layers 20R, 20G, and 20B having a predetermined thickness are provided on the vertically aligning films 15a. The first birefringence layer 20R is provided through the vertically aligning film 15a on the micro-color filter 3R, the first birefringence layer 20G is provided through the vertically aligning film 15a on the micro-color filter 3G, and the first birefringence layer 20B is provided through the vertically aligning film 15a on the micro-color filter 3B.

In disposing the vertically aligning film 15a in a predetermined pattern, for example, photolithography can be utilized. Likewise, in the formation of the first birefringence layers 20R, 20G, 20B at predetermined sites, for example, photolithography can be utilized.

When the optical element 50 is used as a member for constituting the substrate for liquid crystal alignment, the same technical effect as attained by the case where the optical element 40 in the second embodiment is used as the member for constituting the substrate for liquid crystal alignment can be attained. Further, as compared with the case where the optical element 40 in the second embodiment is used as a member for constituting the substrate for liquid crystal alignment, a liquid crystal display device having better display characteristics can easily be provided.

(e) Fifth Embodiment of Optical Element

FIG. 17(a) is a schematic diagram showing a further embodiment of the basic sectional structure of the optical element according to the present invention. An optical element 60 includes a vertically aligning film 15 provided on a light transparent substrate 10C. A first birefringence layer 20 is provided on the vertically aligning film 15. This optical element 60 is characterized by the construction of the substrate 10C. The construction of the vertically aligning film 15 and the first birefringence layer 20 is the same as that of the optical element 30 in the first embodiment.

The substrate 10C shown in the drawing comprises a horizontally aligning film 6 and a second birefringence layer 7 stacked in that order on one side of a light transparent substrate 1. The construction of the light transparent substrate 1 is the same construction as the construction of the light transparent substrate 1 in the optical element 40 in the second embodiment shown in FIG. 16(a). The horizontally aligning film 6 can align the liquid crystal molecules horizontally and may be formed, for example, by subjecting the surface of a film formed of a resin material to rubbing or light alignment treatment. The second birefringence layer 7 is formed of, for example, a polymer in which a polymerizable liquid crystal has been fixed in a homogeneously aligned state. The second birefringence layer 7 functions as a birefringence layer which is optically uniaxial and has the optical axis within the plane (the so-called "+A plate"). The second birefringence layer 7 is different from the first birefringence layer 20 in birefringence characteristics.

The substrate for liquid crystal alignment including the optical element 60 includes the first birefringence layer 20 and the second birefringence layer 7. Therefore, visual angle characteristics in the direction of an azimuth of 45 degrees or 135 degrees to the delay phase axis of an analyzer can be improved.

Further, when a liquid crystal panel for display is prepared using the substrate for liquid crystal alignment including the optical element 60, the first birefringence layer 20 can be produced at low cost. Further, the birefringence characteristics of the first birefringence layer 20 are less susceptible to heat. Therefore, a liquid crystal display device having a high level of display characteristics and usable in various applications can be produced at low cost.

+A plate of a stretched resin film may also be used as the second birefringence layer 7. In this case, the provision of the horizontally aligning film 6 is omitted. The +A plate of a stretched resin film is applied to the light transparent substrate 1 with the aid of an adhesive.

A method may also be adopted in which the color filter and the light shielding layer are provided on the second birefringence layer 7 and the vertically aligning film 15 is provided so as to cover the color filter and the light shielding layer. Further, a method may also be adopted in which the second birefringence layer 7 is provided on one side of the light transparent substrate 1, and the color filter, the light shielding layer, the vertically aligning film 15, and the first birefringence layer 20 are formed on the other side of the light transparent substrate 1.

(f) Sixth Embodiment of Optical Element

FIG. 17(b) is a schematic diagram showing a further embodiment of the basic sectional structure of the optical element according to the present invention. An optical element 70 includes a vertically aligning film 15 provided on a light transparent substrate 10D. A first birefringence layer 20 is provided on the vertically aligning film 15. This optical element 70 is characterized by the construction of the substrate 10D. The construction of the vertically aligning film 15 and the first birefringence layer 20 is the same as that of the optical element 30 in the first embodiment.

The substrate 10D shown in the drawing comprises a linearly polarizing element 8 and a quarter-wavelength plate 9 are stacked in that order on one side of the light transparent substrate 1. The construction of the light transparent substrate 1 is the same construction as the construction of the light transparent substrate 1 in the optical element 40 in the second embodiment shown in FIG. 16(a). The linearly polarizing element 8 functions as a polarizer in the liquid crystal panel for display, and the quarter-wavelength plate 9 is an optical element for converting circularly polarized light to linearly polarized light.

In the substrate for liquid crystal alignment including this optical element 70, the quantity of light incident on the linearly polarizing element 8 which functions as a polarizer can be increased by providing a second birefringence layer, for taking out specific circularly polarized light from natural light, on the first birefringence layer 20. Therefore, when a liquid crystal panel for display is prepared using the substrate for liquid crystal alignment including the optical element 70, the light utilization efficiency can be enhanced. The reason for this is the same as described in the optical element in the first embodiment.

When liquid crystal panel for display is prepared using the substrate for liquid crystal alignment including the optical element 70, the first birefringence layer 20 can be produced at low cost. Further, since the birefringence characteristics of the first birefringence layer 20 are less susceptible to heat, a liquid crystal display device having a high level of light utilization efficiency and usable in various applications can be provided at low cost.

(g) Seventh Embodiment of Optical Element

FIG. 18 is a schematic diagram showing another embodiment of the basic sectional structure of the optical element according to the present invention. An optical element 80 can be used as a member for constituting, for example, the substrate for liquid crystal alignment and is different from the optical element 40 in the second embodiment in that the first birefringence layer 20 is covered with a protective layer 75.

The optical element 80 in this embodiment has the same technical effect as the optical element 40 in the second embodiment and further has the protective layer 75. Therefore, the optical element 80 has an additional technical effect that reliability on birefringence characteristics is improved.

The protective layer 100 may be the same as that used in the optical element in the first embodiment. Further, the protective layer 100 may be provided in each of the optical elements 45, 50, 60, and 70 in the third to sixth embodiments described above and may further be provided in each of optical elements in respective embodiments which will be described later.

(h) Eighth to Tenth Embodiments of Optical Element

Figure 19:
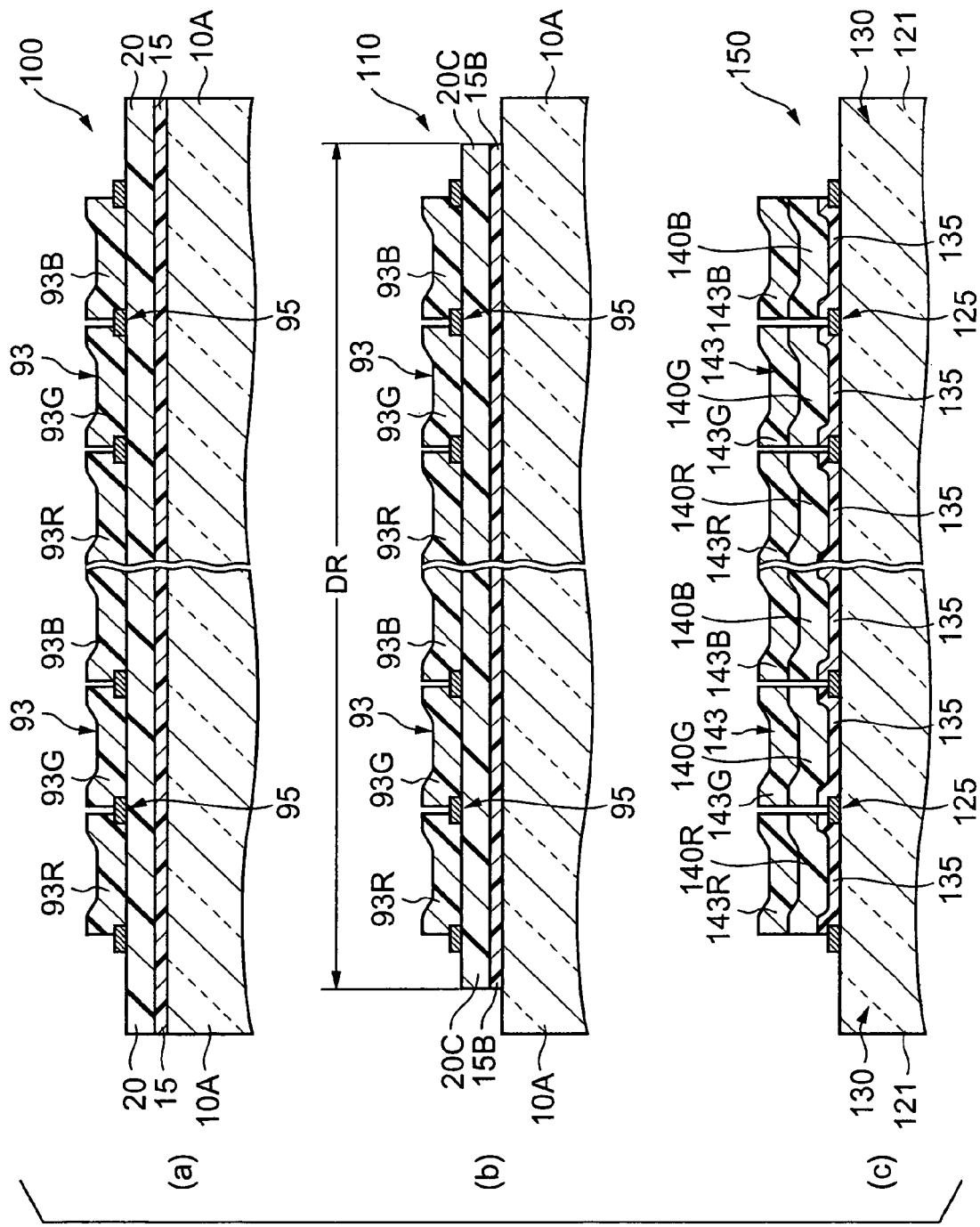
FIG. 19 is a schematic view showing the sectional structure of a still further embodiment of the optical element in the second aspect of the present invention.

FIG. 19(a) is a schematic diagram showing another embodiment of the basic sectional structure of the optical element according to the present invention. An optical element 100 in the eighth embodiment is different from the optical element 30 in the first embodiment in that the color filter and the light shielding layer (black matrix) are provided on the first birefringence layer 20. The optical element 100 in this embodiment has the same technical effect as the optical element 40 in the second embodiment shown in FIG. 16(a).

FIG. 19(b) is a schematic diagram showing still another embodiment of the basic sectional structure of the optical element according to the present invention. An optical element 110 in the ninth embodiment is different from the optical element 100 in the eighth embodiment shown in FIG. 19(a) in that the vertically aligning film and the first birefringence layer are provided only in region DR corresponding to the display region in the liquid crystal panel for display.

FIG. 19(c) is a schematic diagram showing a further embodiment of the basic sectional structure of the optical element according to the present invention. An optical element 150 in the tenth embodiment can be used, for example, as a member for constituting the substrate for liquid crystal alignment. The optical element 150 includes a number of vertically aligning films 135 provided on one side of a light transparent substrate 130. First birefringence layers 140R, 140G, and 140B are provided on the respective vertically aligning films 135. Further, a red micro-color filter 143R is provided on each first birefringence layer 140R, a green micro-color filter 143G is provided on each first birefringence layer 140G, and a blue micro-color filter 143B is provided on each first birefringence layer 140B. These micro-color filters 143R, 143G, and 143B constitute a color filter 140.

The substrate 130 comprises a light transparent substrate 121 and a light shielding film (black matrix) 125 provided on one surface of the light transparent substrate 121. The construction of the light transparent substrate 121 is the same as that of the light transparent substrate 1 in the optical element 50 in the fourth embodiment shown in FIG. 16(c). The construction of the light shielding film 125 is the same as that of the light shielding film 5 in the optical element 50 in the fourth embodiment.

The vertically aligning film 135 is disposed so that, when a liquid crystal panel for display is prepared using the optical element 150 in this embodiment, the vertically aligning film 135 corresponds, in one-by-one relationship, to pixels defined, on plane vision by the light shielding film 125. The construction of each vertically aligning film 135 is the same as the construction of the vertically aligning film 15a in the optical element 50 in the fourth embodiment. Further, the construction of the first birefringence layers 140R, 140G, 140B is the same as that of the first birefringence layers 20R, 20G, or 20B in the optical element 50 in the fourth embodiment. The optical element 150 in this embodiment has the same technical effect as the optical element 50 in the fourth embodiment.

(i) Eleventh Embodiment of Optical Element

FIG. 20 is a schematic diagram showing another embodiment of the basic sectional structure of the optical element according to the present invention. The optical element 160 is different from the optical element 60 in the fifth embodiment shown (in FIG. 17(a)) in that a color filter 93 and a light shielding layer 95 are provided on the first birefringence layer 20.

(j) Twelfth Embodiment of Optical Element

FIG. 21 is a schematic diagram showing another embodiment of the basic sectional structure of the optical element according to the present invention. The optical element 180 is different from the optical element 70 in the sixth embodiment shown in FIG. 17(b) in that a second birefringence layer 170 is provided on the first birefringence layer 20.

The second birefringence layer 170 is a birefringence layer for taking out predetermined circularly polarized light from natural light and is formed of, for example, a cholesteric liquid crystal in which the molecular arrangement has been fixed by crosslinking. In providing the second birefringence layer 170, the use of a chiral nematic liquid crystal obtained by adding a chiral agent to a nematic liquid crystal is preferred. In this case, a polymerizable chiral agent is preferably used as the chiral agent. The second birefringence layer 170 is different from the first birefringence layer 20 in birefringence characteristics.

In the substrate for liquid crystal alignment including the optical element 180 in this embodiment, the linearly polarizing element 8, the quarter-wavelength plate 9, the vertically aligning film 15, the first birefringence layer 20, and the second birefringence layer 170 are disposed so as to face outward to constitute the liquid crystal panel for display. The substrate for liquid crystal alignment is used as the substrate on the back side of the liquid crystal panel for display in a transmission liquid crystal display device.

When a substrate for liquid crystal alignment including the optical element 180 in this embodiment is prepared and is then used for the preparation of a liquid crystal panel for display, the production cost of the first birefringence layer 20 can be lowered. Further, since the birefringence characteristics of the first birefringence layer 20 are less susceptible to heat, a liquid crystal display device having a high level of display characteristics and usable in various applications can be provided at low cost.

When the order to stacking of elements from the linearly polarizing element 8 to the second birefringence layer 170 are made opposite to that shown in the drawing, the linearly polarizing element 8, the quarter-wavelength plate 9, the vertically aligning film 15, the first birefringence layer 20, and the second birefringence layer 170 can be disposed on the inner side of the liquid crystal panel for display.

When the vertically aligning film 15, the first birefringence layer 20, the quarter-wavelength plate 9, and the linearly polarizing element 8 are stacked in that order on the light transparent substrate 1, an optical element utilizable in the substrate for liquid crystal alignment used as the substrate on the display surface side of the liquid crystal panel for display in a reflection-type liquid crystal display device can be provided. Likewise, an optical element utilizable in the substrate for liquid crystal alignment used as the substrate on display surface side of the liquid crystal panel for display in the reflection-type liquid crystal display device can also be formed by stacking the vertically aligning film 15 and the first birefringence layer 20 on one side of the light transparent substrate 1 in that order and stacking the quarter-wavelength plate 9 and the linearly polarizing element 8 in that order on the other side of the light transparent substrate 1. In the reflection-type liquid crystal display device including the optical element as a part of the substrate for liquid crystal alignment, since the polarized state of light incident on the reflector can be made close to true circularly polarized light, high-contrast display can easily be realized.

Production Process of Optical Element

1. Production Process of Optical Element in First Aspect of Invention

The production process of the optical element according to the present invention is a production process of the optical element in the first aspect of the present invention and includes a provision step, an alignment step, and a crosslinking step. Each step will be described.

(1) Provision Step

In the provision step, a light transparent substrate is provided. The substrate has been described in connection with the description of the optical element according to the first aspect of the present invention, and, thus, the description thereof will be omitted.

(2) Alignment Step

In the alignment step, a coating of a coating composition comprising a polymerizable liquid crystal comprising rodlike molecules and a coupling agent and/or a surfactant, which can align the polymerizable liquid crystal in a homeotropic form, is formed, and the polymerizable liquid crystal in the coating is aligned in a homeotropic form.

In preparing the coating composition, a polyfunctional polymerizable liquid crystal, the coupling agent, the surfactant, and an organic solvent are used as indispensable components. A monofunctional polymerizable liquid crystal, a photopolymerization initiator, a sensitizer and the like are used as optional components. Only one monofunctional polymerizable liquid crystal may be used. Alternatively, two or more monofunctional polymerizable liquid crystals may be used in combination. Likewise, only one photopolymerization initiator and only one sensitizer may be used, or alternatively, two or more photopolymerization initiators may be used in combination and two or more sensitizers may be used in combination. The polymerizable liquid crystal, the coupling agent, and the surfactant have been described in connection with the description of the first embodiment of the optical element according to the present invention, and, thus, the description thereof will be omitted.

The organic solvent may be any one so far as it can dissolve the polymerizable liquid crystal, and the type of the organic solvent can be properly selected. Photopolymerization initiators as the optional component include, for example, benzyl (or bibenzoyl), benzoin isobutyl ether, benzoin isopropyl ether, benzophenone, benzoyl benzoate, methyl benzoylbenzoate, 4-benzoyl-4'-methyldiphenyl sulfide, benzyl methyl ketal, dimethylaminomethyl benzoate, 2-n-buthoxyethyl-4-dimethylaminobenzoate, isoamyl p-dimethylaminobenzoate, 3,3'-dimethyl-4-methoxybenzophenone, methylbenzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. The sensitizer may be properly added so far as the object of the present invention is not sacrificed.

The concentration of the polymerizable liquid crystal in the coating composition varies depending, for example, upon coating methods, thickness of coating to be formed, and type of the organic solvent. Preferably, however, the concentration of the polymerizable liquid crystal is in the range of about 10 to 50% by weight. The concentration of the coupling agent is preferably about 0.001 to 10% by weight, more preferably about 0.01 to 1% by weight, based on the total amount of the polymerizable liquid crystal. The concentration of the surfactant may be properly selected in the range of about 1/100 to 1/1 of the solid content of the coupling agent.

When the photopolymerization initiator is used, the concentration of the photopolymerization initiator in the coating composition may be properly selected in such a range that does not significantly sacrifice the alignment of the polymerizable liquid crystal. For example, the concentration of the photopolymerization initiator is selected in the range of about 0.01 to 10% by weight. The concentration of the photopolymerization initiator is preferably selected in the range of about 0.1 to 7% by weight, more preferably in the range of about 0.5 to 5% by weight. When the sensitizer is used, the concentration of the sensitizer in the coating composition may be properly selected in such a range that does not significantly sacrifice the alignment of the polymerizable liquid crystal, for example, may be selected in the range of about 0.01 to 1% by weight.

The coating of the coating composition may be formed by coating the coating composition onto the substrate by spin coating or various printing methods (for example, die coating, bar coating, slide coating, or roll coating) or the like. When the water repellency or oil repellency of the surface of the substrate is on a high level, or when the water repellency or the oil repellency of the coupling agent or the surfactant added to the coating composition is on a high level, the wettability of the surface (coating face) may be previously enhanced by UV cleaning or plasma treatment to such a degree that the polymerizable liquid crystal can be still aligned in a homeotropic form.

In the homeotropic alignment of the polymerizable liquid crystal in the coating formed as described above, the coating is heated to a temperature range from a temperature at which the polymerizable liquid crystal in the coating is brought to a liquid crystal phase to a temperature below a temperature at which the polymerizable liquid crystal is brought to an isotropic phase (a liquid phase) (this temperature being hereinafter referred to as "first crosslinking temperature"). The phase transition temperature of the polymerizable liquid crystal in the coating is sometimes different from the phase transition temperature of the polymerizable liquid crystal per se, because the coupling agent and the surfactant are contained in the coating. When the polymerizable liquid crystal is brought to a liquid crystal phase, the polymerizable liquid crystal is aligned in a homeotropic form through the action of the coupling agent.

Further, for example, upon drying of the coating in vacuo, even when the coating is subsequently cooled to a temperature below the temperature at which the polymerizable liquid crystal originally exhibits a liquid crystal phase, the polymerizable liquid crystal is brought to a supercooled state and the homeotropic alignment is held.

Drying of the coating in vacuo can cause homeotropic alignment of the polymerizable liquid crystal and, at the same time, can be brought to a supercooled state. Therefore, the polymerizable liquid crystal can be cooled to room temperature while holding the homeotropic alignment.

(3) Crosslinking Step

In the crosslinking step, the polymerizable liquid crystal is three-dimensionally crosslinked while holding the homeotropic alignment of the polymerizable liquid crystal in the coating. In this case, in order to prevent disturbance of the homeotropic alignment of the polymerizable liquid crystal, preferably, the coating is exposed to light with wavelength to which the polymerizable liquid crystal is sensitive while heating the coating in an inert gas atmosphere to the first crosslinking temperature. Alternatively, a method is preferably adopted, which comprises exposing the coating in an air atmosphere to light with wavelength to which the polymerizable liquid crystal is sensitive while heating the coating to the first crosslinking temperature to allow a crosslinking reaction to partially proceed, then cooling the coating in the air atmosphere to a temperature at which the polymerizable liquid crystal is brought to a crystal phase, and, in this state, exposing the coating to light with the above wavelength to which the polymerizable liquid crystal is sensitive to substantially complete the crosslinking reaction. The "temperature at which the polymerizable liquid crystal is brought to a crystal phase" refers to a temperature at which, in the coating before crosslinking, the polymerizable liquid crystal is brought to a crystal phase.

The wavelength to which the polymerizable liquid crystal is sensitive varies depending upon the type of the polymerizable liquid crystal. Therefore, the wavelength of light to be applied is properly selected depending upon the type of the polymerizable liquid crystal contained in the coating. The light to be applied to the coating is not necessary monochromatic light and may be light in a wavelength region containing light with wavelength to which the polymerizable liquid crystal is sensitive.

At a point when steps up to the crosslinking step have been completed, an optical element can be obtained which comprises: a light transparent substrate; and a first birefringence layer provided on the substrate, wherein the first birefringence layer comprises a crosslinked polymer comprising a coupling agent and a surfactant which can align, in a homeotropic form, a polymerizable liquid crystal comprising rodlike molecules; and the crosslinked polymer has a three-dimensionally crosslinked structure in such a state that said polymerizable liquid crystal comprising rodlike molecules holds homeotropic alignment.

2. Production Process of Optical Element According to Second Aspect of Invention The production process of the optical element according to the present invention is a production process of the optical element according to the second aspect of the present invention and, as described above, comprises a provision step, an alignment step, and a crosslinking step.

(1) Provision Step

In the provision step, a member comprising a light transparent substrate and a vertically aligning film formed of a surfactant having a long-chain alkyl group provided on the substrate is provided. The substrate has been described in connection with the description of the optical element in the second embodiment according to the present invention, and, thus, the description thereof will be omitted.

The vertically aligning film provided on the substrate is provided for aligning the polymerizable liquid crystal in a homeotropic form in the aligning step which will be described later. The surfactant for forming the vertically aligning film has been described in connection with the description of the optical element in the second embodiment according to the present invention, and, thus, the description thereof will be omitted.

The vertically aligning film may be formed, for example, by dissolving a desired surfactant in an organic solvent such as isopropyl alcohol to prepare a coating liquid, coating the coating liquid onto desired sites by spin coating or the like to form a coating, and then drying (curing) the coating. When the thickness of the vertically aligning film is excessively small, the homeotropic alignment of the polymerizable liquid crystal is difficult. On the other hand, when the thickness of the vertically aligning film is excessively large, the vertically aligning film is colored to significantly lower the light transmittance of the optical element. The thickness of the vertically aligning film is preferably properly selected in the range of about 0.01 to 1 μm.

(2) Aligning Step

In the aligning step, a coating of a coating composition containing a polymerizable liquid crystal comprising rodlike molecules is formed on the above vertically aligning film, and the polymerizable liquid crystal in the coating is aligned in a homeotropic form. The coating composition has been described in connection with the description of the optical element in the second embodiment according to the present invention, and, thus, the description thereof will be omitted.

When the thickness of the coating is larger, the homeotropic alignment of the polymerizable liquid crystal on the upper surface side of the coating is more difficult. The thickness of the coating may be properly selected depending, e.g., upon alignment regulating force of the vertically aligning film against the polymerizable liquid crystal, and birefringence characteristics required of the optical element to be produced.

(3) Crosslinking Step

In the crosslinking step, the polymerizable liquid crystal is three-dimensionally crosslinked while holding the homeotropic alignment of the polymerizable liquid crystal in the coating. At a point when steps up to the crosslinking step have been completed, an optical element can be obtained which comprises: a light transparent substrate; a vertically aligning film formed of a surfactant having a long-chain alkyl group provided on the substrate; and a first birefringence layer provided on the vertically aligning film, wherein the first birefringence layer has a structure that a polymerizable liquid crystal comprising rodlike molecules has been three-dimensionally crosslinked while holding the homeotropic alignment. The crosslinking step is the same as that in the production process of the optical element in the first embodiment.

3. Production Process of Optical Element According to Third Aspect of Invention (a) First Embodiment of Production Process of Optical Element The production process of the optical element according to the present invention is a production process of an optical element comprising a substrate and a first birefringence layer provided on the substrate and comprises a coating step, an alignment step, and a crosslinking step.

(1) Coating Step

In the coating step, a coating of a coating composition containing at least a polymerizable liquid crystal comprising rodlike molecules each having two or more polymerizable functional groups is formed on the substrate.

The substrate and the coating composition may be the same as those used in the production process of the optical element in the first embodiment.

(2) Alignment Step

In the alignment step, the polymerizable liquid crystal in the coating formed in the coating step is aligned in a homeotropic form. In this case, the coating is heated to a temperature at which the polymerizable liquid crystal is brought to a liquid crystal phase (this temperature being hereinafter referred to as "liquid crystal phase temperature"). The method for heating the coating is not particularly limited, and atmosphere heating, infrared heating and the like may be properly selected. Drying in vacuo can also cause homeotropic alignment of the polymerizable liquid crystal in the coating.

When the vertically aligning film which will be described later is provided on the substrate, or when the coating composition used in the coating step contains a surfactant or a coupling agent which will be described later, the polymerizable liquid crystal can be aligned in a homeotropic form by heating the coating to the liquid crystal phase temperature or by drying in vacuo.

When mere heating of the coating to the liquid crystal phase temperature does not cause homeotropic alignment of the polymerizable liquid crystal, or when the homeotropic alignment of the polymerizable liquid crystal cannot be achieved by mere drying in vacuo, the polymerizable liquid crystal can be aligned in a homeotropic form by applying electric field or magnetic field in a predetermined direction.

(3) Crosslinking Step

In the crosslinking step, the polymerizable liquid crystal is three-dimensionally crosslinked while holding the homeotropic alignment of the polymerizable liquid crystal in the coating to bring the coating to the first birefringence layer.

In order to avoid disturbance of the homeotropic alignment of the polymerizable liquid crystal in the crosslinking step, a crosslinking reaction is preferably allowed to proceed while heating the coating to a temperature which is about 1 to 10° C. below, more preferably about 3 to 6° C. below a temperature at which the polymerizable liquid crystal undergoes phase transition from a liquid crystal phase to an isotropic phase.

From the same point of view, preferably (a) a method is adopted in which the polymerizable liquid crystal is three-dimensionally crosslinked while heating the coating in an inert gas atmosphere such as a nitrogen gas atmosphere to the liquid crystal phase temperature to bring the coating to the first birefringence layer, or (b) a method is adopted in which a first substep of partially crosslinking the polymerizable liquid crystal while heating the coating to the liquid crystal phase temperature is followed by a second substep of cooling the coating to a temperature, at which the polymerizable liquid crystal is brought to a crystal phase, and, in this state, again crosslinking the polymerizable liquid crystal to bring the coating to the first birefringence layer. The "temperature at which the polymerizable liquid crystal is brought to a crystal phase" refers to a temperature at which, in the coating before crosslinking, the polymerizable liquid crystal is brought to a crystal phase.

When the polymerizable liquid crystal is crosslinked in an inert atmosphere as in the method (a), for example, as compared with crosslinking in an air atmosphere, the homeotropic alignment of the polymerizable liquid crystal particularly on the upper surface side of the coating is less likely to be disturbed.

The method (b) may be carried out in an inert gas atmosphere or an air atmosphere. The method (b) in the air atmosphere can simplify production equipment and thus can easily prevent an increase in production cost of the optical element. In the first substep, the crosslinking reaction is partially allowed to proceed to such an extent that, even when the coating is cooled to the "temperature at which the polymerizable liquid crystal is brought to a crystal phase," the homeotropic alignment of the polymerizable liquid crystal is maintained. The reaction time in the first substep varies depending, e.g., upon the type of polymerizable liquid crystal, the thickness of the coating, and crosslinking conditions and thus cannot be specified unconditionally. Preferably, however, as a rough measure, the crosslinking reaction is stopped when the polymerizable liquid crystal has been partially crosslinked to a degree of crosslinking of about 5 to 50.

In any method, the crosslinking reaction of the polymerizable liquid crystal can be allowed to proceed by exposing the coating to light with wavelength to which the polymerizable liquid crystal is sensitive. The wavelength to which the polymerizable liquid crystal is sensitive varies depending upon the type of the polymerizable liquid crystal. Therefore, the wavelength of light to be applied is properly selected depending upon the type of the polymerizable liquid crystal contained in the coating. The light to be applied to the coating is not necessary monochromatic light and may be light in a wavelength region containing light with wavelength to which the polymerizable liquid crystal is sensitive.

Further, for example, upon drying of the coating in vacuo, even when the coating is subsequently cooled to a temperature below the temperature at which the polymerizable liquid crystal originally exhibit a liquid crystal phase, the polymerizable liquid crystal is brought to a supercooled state and the homeotropic alignment is held. Subsequent exposure of the coating to light with wavelength to which the polymerizable liquid crystal is sensitive enables the crosslinking reaction to proceed while holding the homeotropic alignment of the polymerizable liquid crystal. The degree of crosslinking of the first birefringence layer, and the tilt angle of the polymerizable liquid crystal molecules in the first birefringence layer are the same as those in the production process of the optical element according to the first aspect of the present invention.

When the thickness of the coating formed in the coating step is larger, the homeotropic alignment of the polymerizable liquid crystal on the upper surface side of the coating is more difficult. That is, in the finally obtained first birefringence layer, the tilt angle of the polymerizable liquid crystal molecules as the structural unit is less likely to become even in the thickness-wise direction of the optical element. Therefore, when the components of the coating composition used in the coating step is identical, the tilt angle of the polymerizable liquid crystal molecules as the structural unit in the first birefringence layer can be controlled by properly selecting the thickness of the coating formed by the coating composition.

Figure 22:
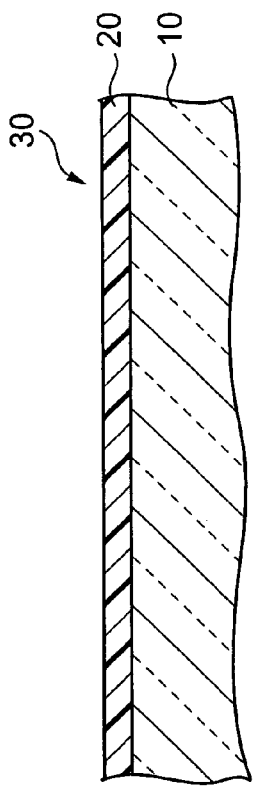
FIG. 22 is a schematic sectional view showing an example of an optical element produced by the production process of an optical element in the third aspect of the present invention.

At a point when steps up to the crosslinking step have been completed, as shown in FIG. 22, an optical element 30 comprising a first birefringence layer 20 provided on a substrate 10 can be provided. The first birefringence layer 20 may be the same as that in the optical element according to the first aspect of the present invention.

The optical element produced by the production process according to the third aspect of the present invention can be provided as an optical element utilizable, for example, as a member for constituting the substrate for liquid crystal alignment, by forming a first birefringence layer on a substrate provided with a light absorption-type color filter (hereinafter referred to simply as "color filter"), or by forming a color filter on the first birefringence layer.

Figure 23:
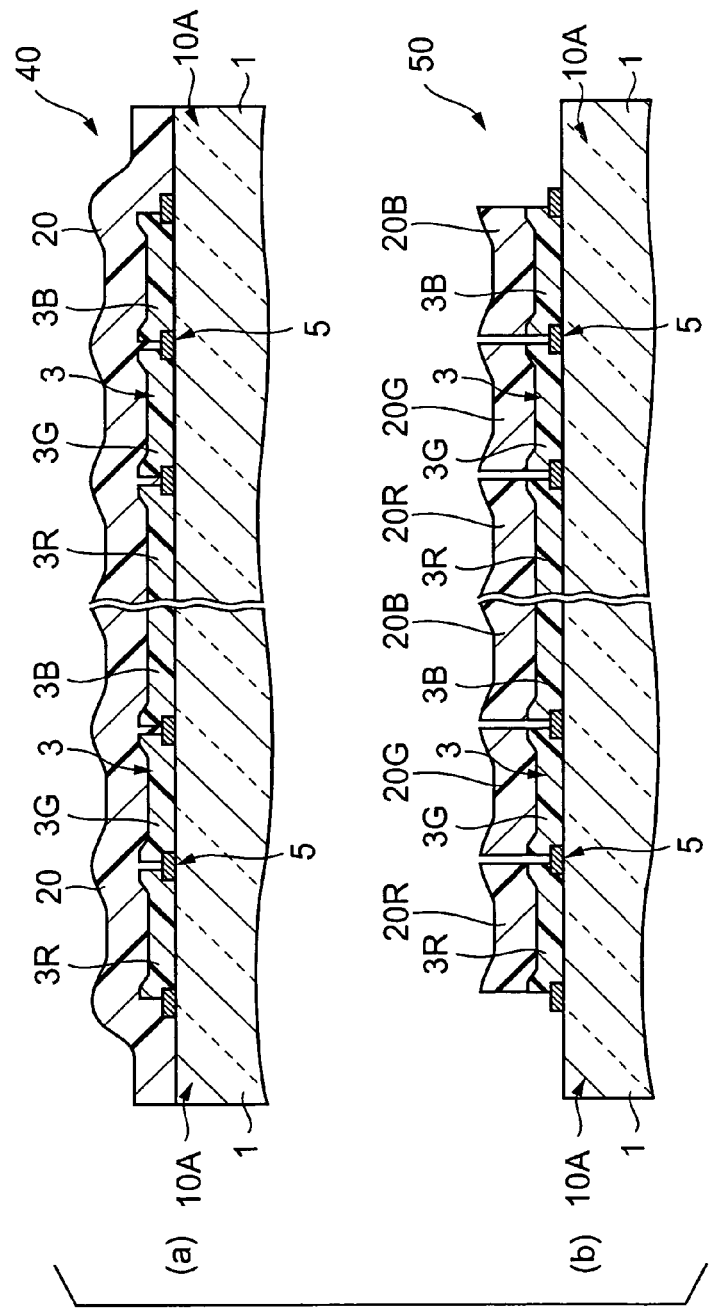
FIG. 23 is a schematic view showing the sectional structure of another embodiment of the optical element produced by the production process of an optical element in the third aspect of the present invention.

FIG. 23(a) is a schematic cross-sectional view showing an embodiment of the optical element in which a first birefringence layer is provided on a substrate provided with a color filter. In a substrate 10A used in an optical element 40, a color filter 3 and a light shielding layer (a black matrix) 5 are provided on one side of a light transparent substrate 1. A first birefringence layer 20 is provided on the substrate 10A so as to cover the color filter 3 and the light shielding layer 5. The light transparent substrate 1 is the same as that described above in connection with the optical element according to the first aspect of the present invention. The color filter and the light shielding layer may be the same as those used in the optical element according to the first aspect of the present invention.

In the optical element 40, on plane vision, the substrate 10A and the first birefringence layer 20 substantially overlap with each other. The first birefringence layer 20 may be provided only in display region in a liquid crystal panel for display prepared using the substrate for liquid crystal alignment using the optical element 40 as the constituent member. Further, a method may also be adopted in which the first birefringence layer 20 is formed on a light transparent substrate 1 and a color filter 3 and a light shielding layer 5 are formed on the first birefringence layer 20.

FIG. 23(b) is a schematic cross-sectional view showing another embodiment of the optical element in which a first birefringence layer is provided in a substrate provided with a color filter. The optical element 50 is different from the optical element 40 in that first birefringence layers 20R, 20G, and 20B having a predetermined thickness are provided on respective micro-color filters 3R, 3G, 3B. The first birefringence layer 20R is provided on the micro-color filter 3R, the first birefringence layer 20G is provided on the micro-color filter 3G, and the first birefringence layer 20B is provided on the micro-color filter 3B. For example, photolithography may be utilized for forming the first birefringence layers 20R, 20G, 20B on respective predetermined sites.

Even when light is incident on the same medium, the refractive index of light varies depending upon wavelength. Therefore, for example, the birefringence Δn of the first birefringence layer 20 shown in FIG. 22 also varies depending upon the wavelength of incident light. Retardation of red light, retardation of green light, and retardation of blue light can be controlled separately from each other by providing first birefringence layers 20R, 20G, and 20B having a predetermined thickness respectively on the red micro-color filter 3R, the green micro-color filter 3G, and the blue micro-color filter 3B. Therefore, according to the optical element 50, as compared with the optical element 40 shown in FIG. 23(a), the polarization state of light can be controlled more accurately.

A method may also be adopted in which a light shielding layer 5 and first birefringence layers 20R, 20G, 20B are provided on the light transparent substrate 1, a micro-color filter 3R is provided on the first birefringence layer 20R, a micro-color filter 3G is provided on the first birefringence layer 20G, and a micro-color filter 3B is provided on the first birefringence layer 20B.

Prior to the formation of the first birefringence layer 20, the surface of the color filter 3 (micro-color filters 3R, 3G, 3B) may be subjected to fluorination treatment. The fluorination treatment has been described above and thus is omitted.

Regarding application examples of the optical element produced in this aspect of the present invention, for example, an optical element utilizable as a member for constituting the substrate for liquid crystal alignment can be produced by forming the first birefringence layer on a substrate having a second birefringence layer having birefringence characteristics different from those of the first birefringence layer, or by forming the second birefringence layer on the first birefringence layer.

FIG. 24(a) is a schematic cross-sectional view showing an embodiment of the optical element comprising a first birefringence layer provided on a substrate provided with a second birefringence layer. A substrate 10B used in the optical element 60 comprises a light transparent substrate 1 and a horizontally aligning film 6 and a second birefringence layer 7 stacked in that order on one side of a light transparent substrate 1. A first birefringence layer 20 is provided on the second birefringence layer 7.

The construction of the light transparent substrate 1 is the same as the construction of the light transparent substrate 1 in the optical element 40 shown in FIG. 23(a). The horizontally aligning film 6 and the second birefringence layer 7 are the same as those described above.

The substrate for liquid crystal alignment including the optical element 60 includes the first birefringence layer 20 and the second birefringence layer 7. Therefore, visual angle characteristics in the direction of an azimuth of 45 degrees or 135 degrees to the delay phase axis of an analyzer can be improved.

+A plate of a stretched resin film may also be used as the second birefringence layer 7. In this case, the provision of the horizontally aligning film 6 is omitted. The +A plate of a stretched resin film is applied to the light transparent substrate 1 with the aid of an adhesive.

The color filter and the light shielding layer may be provided on the first birefringence layer 20. Further, a construction may also be adopted in which the second birefringence layer 7 is provided on one side of the light transparent substrate 1 and the first birefringence layer 20 is formed on the other side of the light transparent substrate 1.

FIG. 24(b) is a schematic cross-sectional view showing an embodiment of the optical element comprising a second birefringence layer provided on a first birefringence layer. A substrate 10C used in an optical element 70 comprises a linearly polarizing element 8 and a quarter-wavelength plate 9 stacked in that order on one side of the light transparent substrate 1. A first birefringence layer 20 is provided on the quarter-wavelength plate 9, and a second birefringence layer 65 is provided on the first birefringence layer 20.

The construction of the light transparent substrate 1 is the same as the construction of the light transparent substrate 1 in the optical element 40 shown in FIG. 23(a). The linearly polarizing element 8 functions as a polarizer in the liquid crystal panel for display, and the quarter-wavelength plate 9 is an optical element for converting circularly polarized light to linearly polarized light. The second birefringence layer 65 is provided for taking out particular circularly polarized light from natural light and is formed of, for example, a cholesteric liquid crystal in which the molecular arrangement has been fixed by crosslinking.

In the substrate for liquid crystal alignment including the optical element 70, since the second birefringence layer 65 is provided on the first birefringence layer 20, the quantity of light incident on the linearly polarizing element 8 which functions as a polarizer can be increased. Therefore, when a liquid crystal panel for display is prepared using the substrate for liquid crystal alignment including the optical element 70, the light utilization efficiency can be enhanced.

(b) Second Embodiment of Production Process of Optical Element

In the production process of the optical element in this embodiment, a substrate having a vertically aligning film, which can align, in a homeotropic form, the polymerizable liquid crystal comprising rodlike molecules, is used, and a coating is formed on the vertically aligning film by the coating step.

The vertically aligning film may be the same as that described above in connection with the optical element according to the present invention. In the production process of an optical element in this embodiment, the optical element is produced by successively conducting a coating step, an aligning step, and a crosslinking step in the same manner as in the production process in the first embodiment, except that the substrate has the above vertically aligning film.

Figures 24, 25:
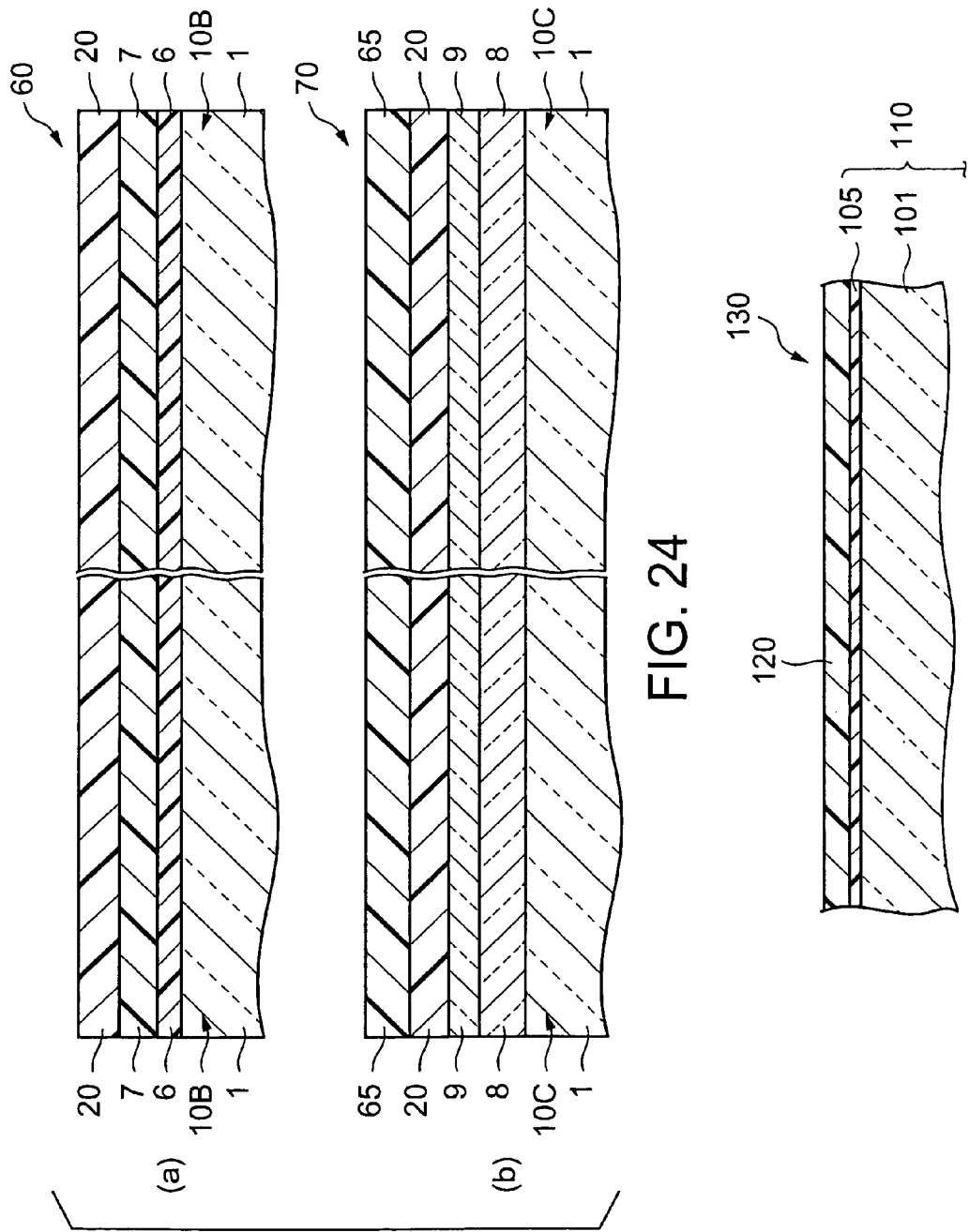
FIG. 24 is a schematic view showing the sectional structure of still another embodiment of the optical element produced by the production process of an optical element in the third aspect of the present invention.
FIG. 25 is a schematic view showing the sectional structure of a further embodiment of the optical element produced by the production process of an optical element in the third aspect of the present invention.

As schematically shown in FIG. 25, in the optical element 130 thus obtained, a light transparent substrate 101 and a vertically aligning film 105 provided on the light transparent substrate 101 constitute a substrate 110. A first birefringence layer 120 is provided on the vertically aligning film 105 in the substrate 110.

Since the first birefringence layer 120 is provided on the vertically aligning film 105, as compared with the production of an optical element by the production process in the first embodiment, the homeotropic alignment of the polymerizable liquid crystal in the aligning step is easier. Further, also in the crosslinking step, the polymerizable liquid crystal as the structural unit can easily hold the homeotropic alignment. As a result, as compared with the production of the optical element by the production process in the first embodiment, the degree of freedom of selection of the thickness of the first birefringence layer 120 can be enhanced, and retardation of the optical element 130 can be properly varied.

This optical element 130 can be used as an element for controlling polarized state of light, for example, a phase difference element or an optical compensation element. Further, since the heat resistance is relatively high, the optical element can also be used in optical equipment used under an environment in which the temperature is likely to become relatively high, such as car interior. Furthermore, since the optical element 130 has relatively high heat resistance, it can be provided in a liquid crystal panel for displays.

(c) Third Embodiment of Production Process of Optical Element

In the production process of the optical element in this embodiment, a polymerizable liquid crystal comprising rodlike molecules and a surfactant, which can cause homeotropic alignment are incorporated in the coating composition used in the coating step. The polymerizable liquid crystal and the surfactant have been described above in connection with the optical element according to the present invention, and, thus, the description thereof will be omitted.

In the production process of the optical element in this embodiment, an optical element is produced by successively conducting a coating step, an aligning step, and a crosslinking step in the same manner as in the production process of the first embodiment or the second embodiment, except that the surfactant is incorporated in the coating composition used in the coating step.

In forming the first birefringence layer, the polymerizable liquid crystal can be easily aligned in a homeotropic form by incorporating the surfactant in the coating composition used in the coating step. Further, even when the thickness of the first birefringence layer is increased, the polymerizable liquid crystal can be aligned in a homeotropic form. Therefore, the degree of freedom of selection of the thickness of the first birefringence layer is enhanced and the retardation of the finally obtained optical element can easily be controlled to various values.

As with the optical element produced by the production process in other embodiments, the optical element produced by the production process in this embodiment can be used, for example, as an element for controlling polarized state of light, for example, a phase difference element or an optical compensation element. Further, since the heat resistance is relatively high, the optical element can also be used in optical equipment used under an environment in which the temperature is likely to become relatively high, such as car interior. Furthermore, since the optical element has relatively high heat resistance, it can be provided in a liquid crystal panel for displays.

Also in the production process in this embodiment, for example, an optical element utilizable as a member for constituting the substrate for liquid crystal alignment can be produced by forming a first birefringence layer on a substrate provided with a color filter, or a substrate provided with a color filter and a vertically aligning film, or by forming a color filter on the first birefringence layer. Likewise, for example, an optical element utilizable as a member for constituting the substrate for liquid crystal alignment can be produced by forming a first birefringence layer on a substrate provided with a second birefringence layer having birefringence characteristics different from those of the first birefringence layer, or by forming the second birefringence layer on the first birefringence layer.

(d) Fourth Embodiment of Production Process of Optical Element

In the production process of the optical element in this embodiment, the coating composition used in the coating step contains a polymerizable liquid crystal comprising rodlike molecules and a coupling agent which can cause homeotropic alignment of the polymerizable liquid crystal comprising rodlike molecules. The coupling agent has been described above in connection with the optical element according to the present invention, and, thus, the description thereof will be omitted.

In the production process of the optical element in this embodiment, an optical element is produced by successively conducting a coating step, an aligning step, and a crosslinking step in the same manner as in the production process of the first embodiment, except that the coupling agent is incorporated in the coating composition used in the coating step.

The substrate layer underlying the first birefringence layer is preferably formed of glass or silicon oxide. The use of a vertically aligning film as the substrate layer underlying the first birefringence layer is not preferred.

In forming the first birefringence layer, the polymerizable liquid crystal can be easily aligned in a homeotropic form by incorporating the coupling agent in the coating composition used in the coating step. Further, even when the thickness of the first birefringence layer is increased, the polymerizable liquid crystal can be aligned in a homeotropic form. Therefore, the degree of freedom of selection of the thickness of the first birefringence layer is enhanced and the retardation of the finally obtained optical element can easily be controlled to various values.

As with the optical element produced by the production process in other embodiments, the optical element produced by the production process in this embodiment can be used, for example, as an element for controlling polarized state of light, for example, a phase difference element or an optical compensation element. Further, since the heat resistance is relatively high, the optical element can also be used in optical equipment used under an environment in which the temperature is likely to become relatively high, such as car interior. Furthermore, since the optical element has relatively high heat resistance, it can be provided in a liquid crystal panel for displays.

Also in the production process in this embodiment, for example, an optical element utilizable as a member for constituting the substrate for liquid crystal alignment can be produced by forming a first birefringence layer on a substrate provided with a color filter, or by forming a color filter on the first birefringence layer. Likewise, for example, an optical element utilizable as a member for constituting the substrate for liquid crystal alignment can be produced by forming a first birefringence layer on a substrate provided with a second birefringence layer having birefringence characteristics different from those of the first birefringence layer, or by forming the second birefringence layer on the first birefringence layer.

Substrate for Liquid Crystal Alignment

Figure 26:
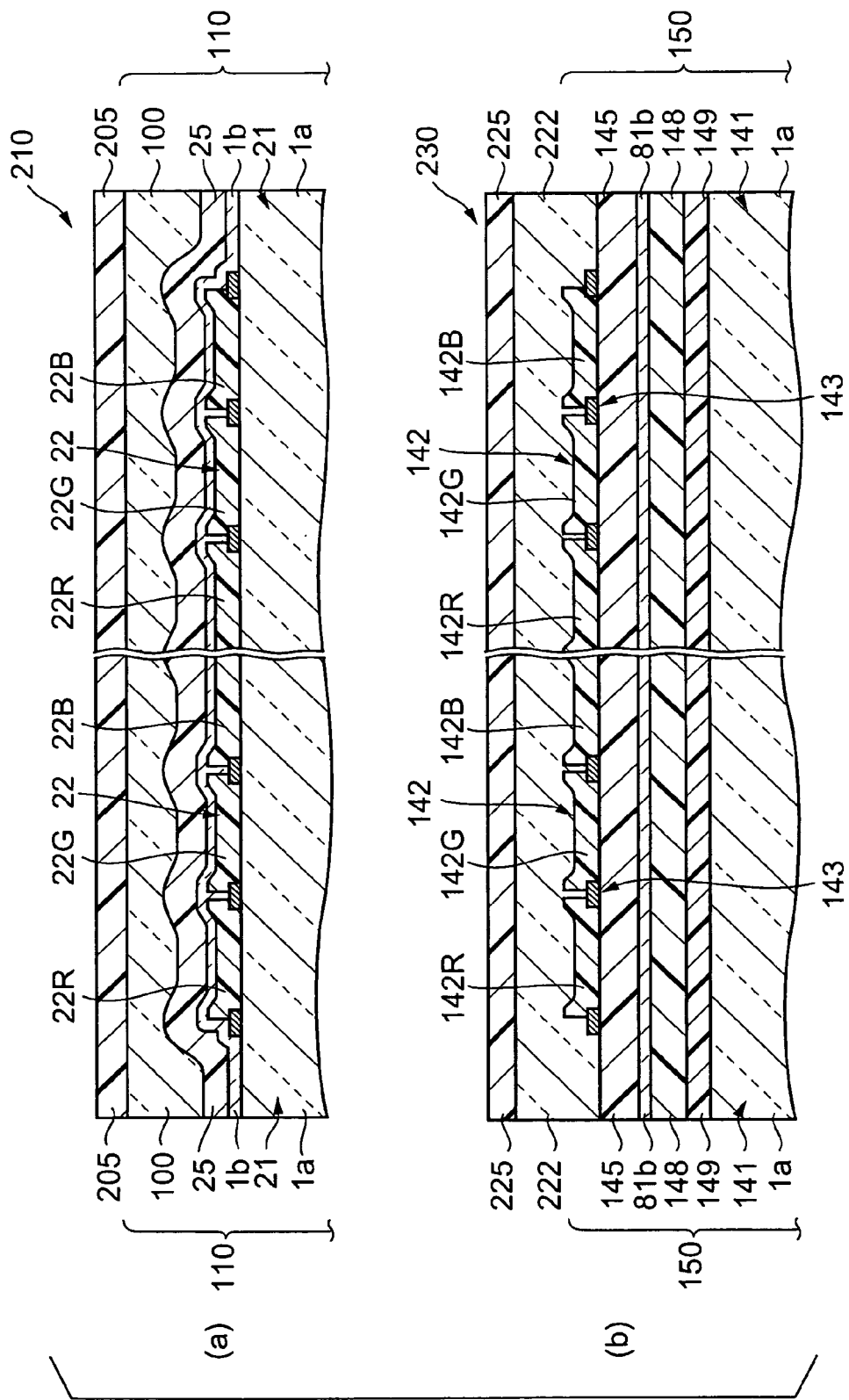
FIG. 26 is a schematic diagram showing an example of the basic sectional structure of the liquid crystal aligning substrate according to the present invention.
Figure 27:
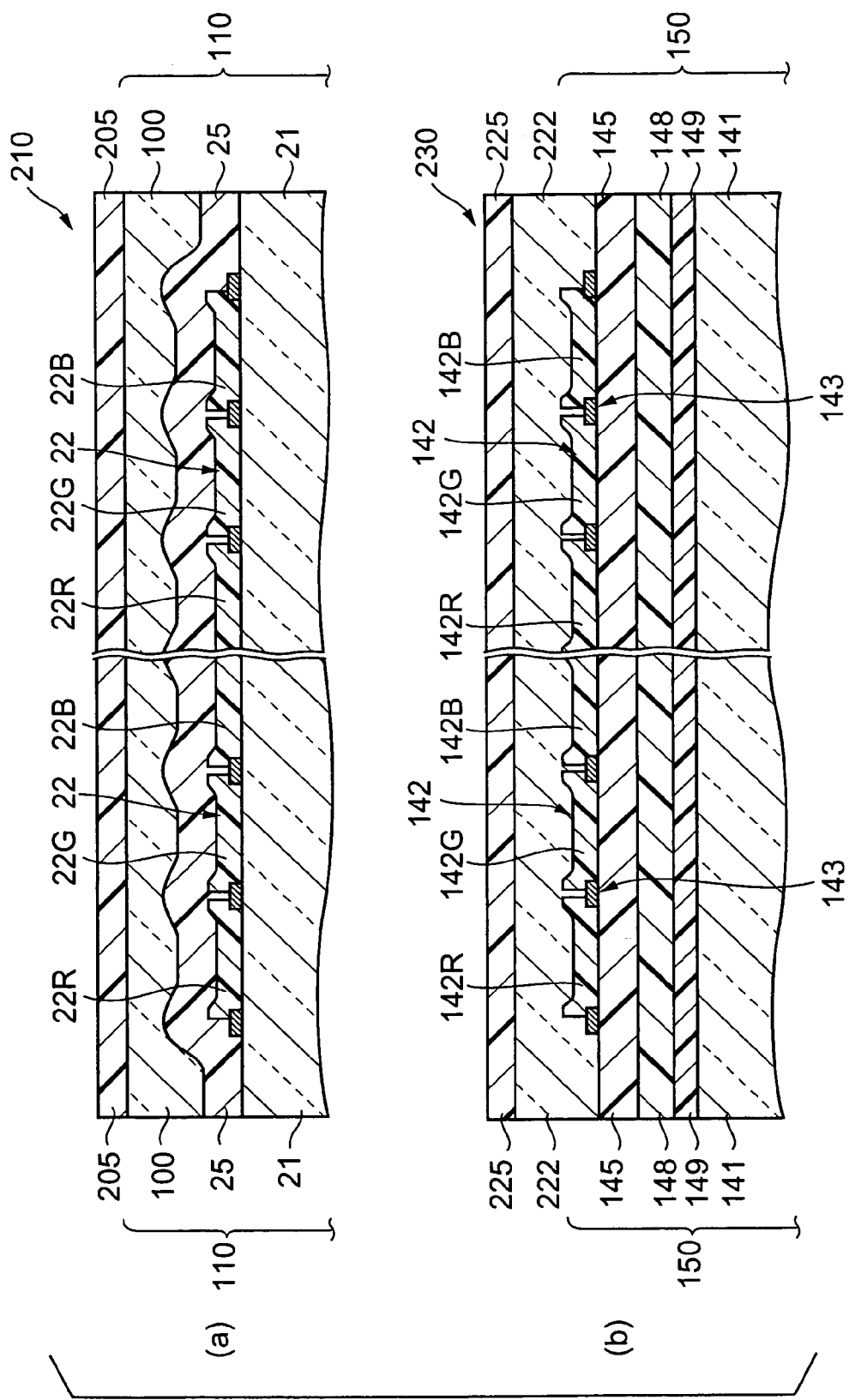
FIG. 27 is a schematic diagram showing an example of the sectional structure of another embodiment of the liquid crystal aligning substrate according to the present invention.

1. Substrate for Liquid Crystal Alignment According to First Aspect of Invention (a) First Embodiment of Substrate for Liquid Crystal Alignment FIG. 26(a) and FIG. 27(a) are schematic diagrams showing an embodiment of the basic sectional structure of substrates for liquid crystal alignment according to the present invention. A substrate 210 for liquid crystal alignment has a structure comprising a horizontally aligning film 205 provided on a protective layer 100 in the optical element 110 in the ninth embodiment shown in FIGS. 8 and 9.

In the substrate 210 for liquid crystal alignment shown in the drawing, the protective layer 100 functions as a flattening film for the horizontally aligning film 205. The horizontally aligning film 205 is provided for horizontally aligning a liquid crystal in the liquid crystal cell when a liquid crystal panel for display has been prepared using a substrate 210 for liquid crystal alignment. The surface (top surface) of the horizontally aligning film 205 has been subjected to, for example, rubbing treatment or photoalignment treatment.

The substrate 210 for liquid crystal alignment having the above structure can be used, for example, as a substrate on the display face side of the liquid crystal panel for display in a liquid crystal display device of an IPS system. Since the substrate 210 for liquid crystal alignment has a first birefringence layer 25, visual angle characteristics in the direction of an azimuth of 45 degrees or 135 degrees to the delay phase axis of an analyzer (not shown) constituting the liquid crystal panel for display can be improved by providing a phase difference plate or a phase difference film, which is optically monoaxial and has an optical axis within the plane, that is, the so-called "+A plate", for example, on the outer surface of the substrate 1 (outer surface in the liquid crystal panel for display).

As already described above, the first birefringence layer 25 can be produced at low cost. The first birefringence layer 25 has relatively high heat resistance. Therefore, a liquid crystal display device having excellent visual angle characteristics and relatively high heat resistance can be produced at low cost by using the substrate 210 for liquid crystal alignment. Further, a liquid crystal display device having a high level of display characteristics and usable in various applications can be produced at low cost.

The provision of the protective film 100 may be omitted. Further, the optical element 35 in the fourth embodiment shown in FIGS. 5 and 6(b), the optical element 50 in the fifth embodiment shown in FIGS. 5 and 6(c), the optical element 70 in the sixth embodiment shown in FIG. 7(a), the optical element 75 in the seventh embodiment shown in FIG. 7(b), or the optical element 90 in the eighth embodiment shown in FIG. 7(c) may be used instead of the optical element 110.

(b) Second Embodiment of Substrate for Liquid Crystal Alignment

FIG. 26(b) and FIG. 27(b) are schematic diagrams showing another embodiment of the basic sectional structure of substrates for liquid crystal alignment according to the present invention. A substrate 230 for liquid crystal alignment has a structure in which a flattening film 222 is provided on the optical element 150 in the tenth embodiment shown in FIGS. 12 and 13 and a horizontally aligning film 225 is further provided on the flattening film 222.

In the substrate 230 for liquid crystal alignment, a flattening film 222 is provided so as to cover the color filter 142 and the light shielding layer 143. This flattening film 222 may be formed, for example, in the same manner as in the protective layer 100 in the substrate 210 for liquid crystal alignment in the first embodiment. Further, the horizontally aligning film 225 in the substrate 230 for liquid crystal alignment may be formed in the same manner as in the horizontally aligning film 205 in the substrate 210 for liquid crystal alignment in the first embodiment.

As with the substrate 210 for liquid crystal alignment in the first embodiment, the substrate 230 for liquid crystal alignment in this embodiment may be used, for example, as a substrate on the display face side of the liquid crystal panel for display in a liquid crystal display device of an IPS system. Since the substrate 230 for liquid crystal alignment has a second birefringence layer 148, visual angle characteristics in the direction of an azimuth of 45 degrees or 135 degrees to the delay phase axis of an analyzer (not shown) constituting the liquid crystal panel for display can be improved without the need to separately provide +A plate on the outer surface of the substrate 230 for liquid crystal alignment. The provision of the flattening film 222 may be omitted.

(c) Third Embodiment of Substrate for Liquid Crystal Alignment

FIGS. 28(a) and 29(a) are schematic diagrams showing another embodiments of the basic sectional structure of the substrate for liquid crystal alignment according to the present invention. A substrate 260 for liquid crystal alignment has a structure comprising: the substrate 121 in the optical element 130 in the tenth embodiment shown in FIGS. 10 and 11; and, provided on the substrate 121, scanning lines, an interlayer insulating film 241, a transparent electrode pattern 243 comprising a large number of pixel electrodes 243a arranged in a matrix form, a signal line 245, a protective film (a passivation film) 247, a switching circuit part, a flattening film 249, and an aligning film 251.

Scanning lines (not shown) are disposed so that each one scanning line corresponds to one line of the large number of pixel electrodes 243a disposed in a matrix form and is extended in the longitudinal direction of the line. Each scanning line may be formed of, for example, a metal such as tantalum (Ta) or titanium (Ti). These scanning lines are covered by the interlayer insulating film 241.

The interlayer insulating film 241 is formed of, for example, an electrically insulating material such as silicon oxide to electrically separate the scanning line from the signal line 245 and, at the same time, to electrically separate the pixel electrode 243a from the scanning line.

Each pixel electrode 243a is formed of, for example, a transparent electrode material such as indium tin oxide (ITO) and is provided so as to correspond to one pixel in the liquid crystal panel for display in one-by-one relationship. The form on plane vision of the individual pixel electrodes 243a may be a polygon, for example, a quadrangle or a hexagon formed by cutting away one corner part of a quadrangle to a rectangular form.

The signal lines 245 are disposed so that one signal line corresponding to one column of the large number of pixel electrodes 243a disposed in a matrix form, and are extended in the longitudinal direction of the column. Each signal line 245 may be formed of, for example, a metal such as tantalum (Ta) or titanium (Ti). These signal lines 245 are covered by the protective film 247.

The protective film 247 is formed of, for example, silicon nitride, to protect a member underlying the protective film 247. The protective film 247 electrically separates the signal line 245 from the pixel electrode 243a.

Each switching circuit part (not shown) is disposed so as to correspond to one pixel electrode 243a in one-by-one relationship to electrically connect the pixel electrode 243a, to which the switching circuit part corresponds, to the scanning line and the signal line 245. Individual switching circuit parts receive the supply of a signal from the respective corresponding scanning lines to control the continuity between the signal line 245 and the pixel electrode 243a. Each switching circuit part may be formed of, for example, one active element. The active element may be, for example, a three-terminal element such as a thin-film transistor or a two-terminal element such as an MIM (metal insulator metal) diode.

The flattening film 249 is provided so as to cover the protective film 247 and the transparent electrode pattern 243 to provide a flat face for forming an aligning film 251. This flattening film 249 may be formed, for example, in the same manner as in the protective layer 100 in the substrate 210 for liquid crystal alignment in the first embodiment.

The aligning film 251 is a horizontally aligning film for horizontally aligning a liquid crystal in a liquid crystal cell or a vertically aligning film for homeotropically aligning the liquid crystal, when a liquid crystal panel for display has been prepared using the substrate 260 for liquid crystal alignment. Whether the aligning film 251 to be used is the horizontally aligning film or the vertically aligning film may be properly determined depending, e.g., upon an operation mode of the liquid crystal panel for display to be prepared using the substrate 260 for liquid crystal alignment.

The substrate 260 for liquid crystal alignment having the above structure may be used, for example, as the substrate on the back side of the liquid crystal panel for display in a transmission liquid crystal display device of an active matrix drive system. Since the first birefringence layer 125 and the second birefringence layer 128 are provided in the substrate 260 for liquid crystal alignment, the use of the substrate 260 for liquid crystal alignment can realize the provision of a transmission liquid crystal display device having high light utilization efficiency. Further, since the substrate 260 for liquid crystal alignment has the first birefringence layer 125, the use of the substrate 260 for liquid crystal alignment can realize the provision of a transmission liquid crystal display device having relatively high heat resistance at low cost and can easily provide a transmission liquid crystal display device having a high level of display characteristics and usable in various applications at low cost. The provision of the flattening film 249 can be omitted.

(d) Fourth Embodiment of Substrate for Liquid Crystal Alignment

Figure 28:
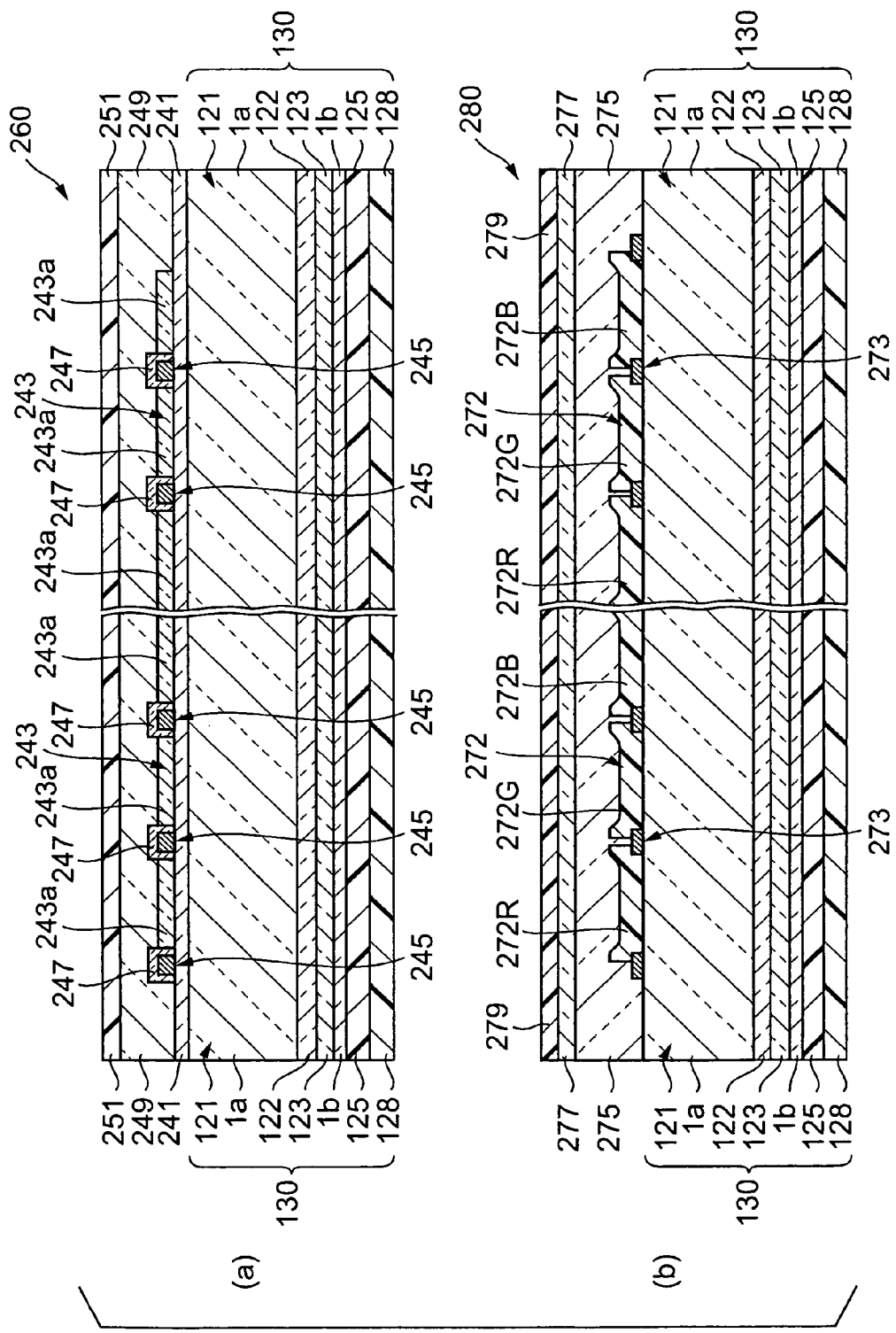
FIG. 28 is a schematic diagram showing an example of the sectional structure of still another embodiment of the liquid crystal aligning substrate according to the present invention.
Figure 29:
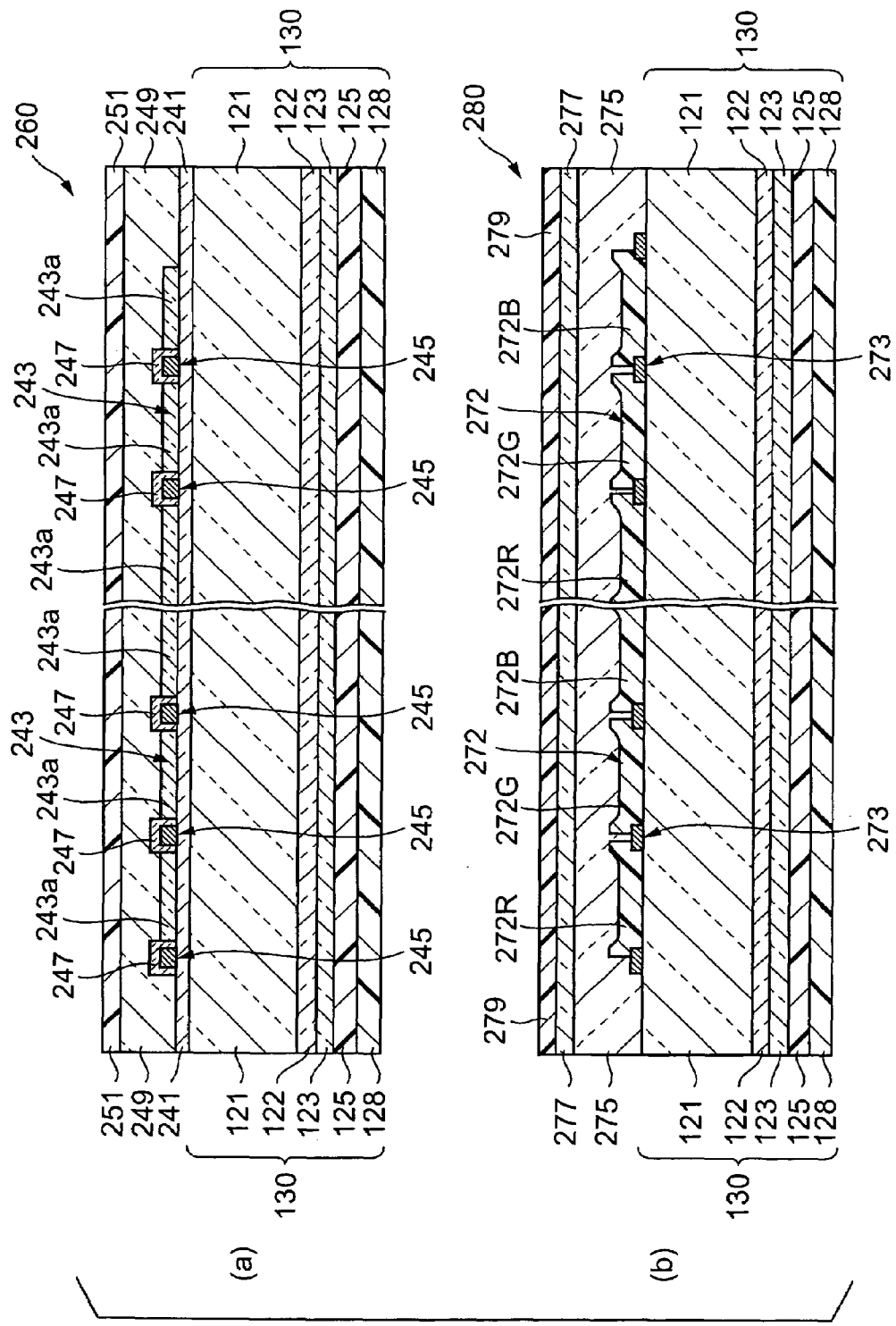
FIG. 29 is a schematic diagram showing an example of the sectional structure of a further embodiment of the liquid crystal aligning substrate according to the present invention.

FIG. 28(*b*) and FIG. 29(*b*) are schematic diagrams showing another embodiments of the basic sectional structure of the substrate for liquid crystal alignment according to the present invention. The substrate 280 for liquid crystal alignment has a structure comprising: a color filter 272 and a light shielding layer (a black matrix) 273 provided on the substrate 121 in the optical element 130 in the tenth embodiment shown in FIGS. 10 and 11; a flattening film 275 provided so as to cover the color filter 272 and the light shielding layer 273; and a transparent electrode pattern 277 and an aligning film 279 stacked in that order on the flattening film 275. All the color filter 272, the light shielding layer 273, the flattening film 275, the transparent electrode pattern 277, and the aligning film 279 are provided on the substrate 121 in its side remote from the linearly polarizing element 122.

The color filter 272 and the light shielding layer 273 may be constructed respectively in the same manner as the color filter 22 and the light shielding layer 23 in the optical element 30 in the third embodiment shown in FIG. 5(*a*).

The flattening film 275 is provided so as to cover the color filter 272 and the light shielding layer 273 to provide a flat face for forming the transparent electrode pattern 277. The flattening film 275 may be formed, for example, in the same manner as in the protective layer 100 in the substrate 210 for liquid crystal alignment in the first embodiment.

In a liquid crystal panel for display using the substrate 280 for liquid crystal alignment, voltage for controlling the alignment of the liquid crystal is applied to the transparent electrode pattern 277. The transparent electrode pattern 277 is formed of, for example, a transparent electrode material such as ITO and is used as an electrode (common electrode) common to all the pixels in the liquid crystal panel for display.

The aligning film 279 is a horizontally aligning film for horizontally aligning a liquid crystal in a liquid crystal cell or a vertically aligning film for homeotropically aligning the liquid crystal, when a liquid crystal panel for display has been prepared using the substrate 280 for liquid crystal alignment. Whether the aligning film 279 to be used is the horizontally aligning film or the vertically aligning film may be properly determined depending, e.g., upon an operation mode of the liquid crystal panel for display to be prepared using the substrate 280 for liquid crystal alignment.

The substrate 280 for liquid crystal alignment having the above structure may be used, for example, as the substrate on the display face side of the liquid crystal panel for display in a reflection liquid crystal display device. Since the first birefringence layer 125 and the second birefringence layer 128 are provided in the substrate 280 for liquid crystal alignment, the use of the substrate 280 for liquid crystal alignment can realize the provision of a reflection liquid crystal display device having high light utilization efficiency. Further, since the substrate 280 for liquid crystal alignment has the first birefringence layer 125, the use of the substrate 280 for liquid crystal alignment can realize the provision of a reflection liquid crystal display device having relatively high heat resistance at low cost and can provide a reflection liquid crystal display device having a high level of display characteristics and usable in various applications at low cost. The provision of the flattening film 249 can be omitted.

2. Substrate for Liquid Crystal Alignment According to Second Aspect of Invention

(a) First Embodiment of Substrate for Liquid Crystal Alignment

Figure 30:
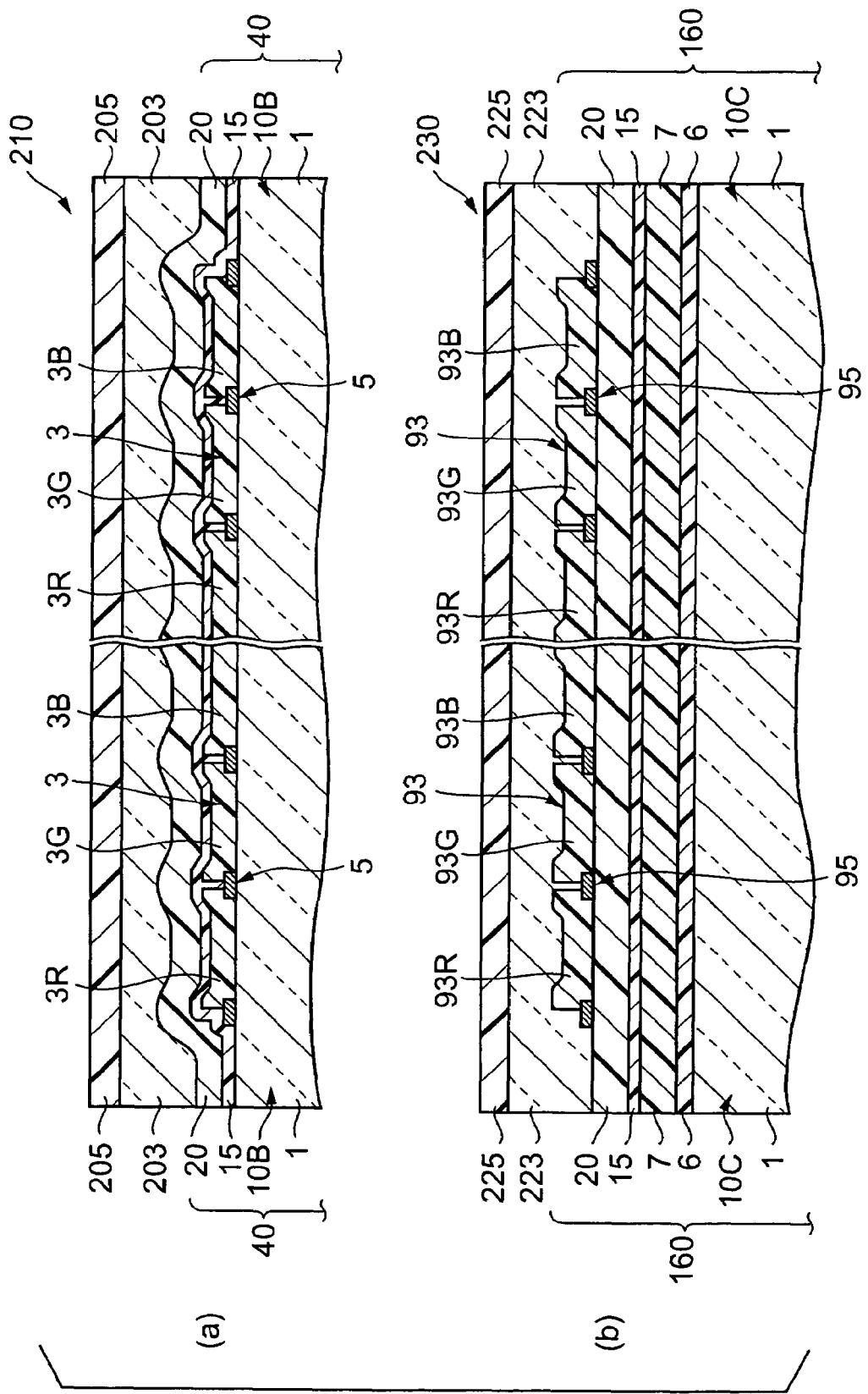
FIG. 30 is a schematic diagram showing an example of the sectional structure of a still further embodiment of the liquid crystal aligning substrate according to the present invention.

FIG. 30(a) is a schematic diagram showing an embodiment of the basic sectional structure of a substrate for liquid crystal alignment according to the present invention. A substrate 210 for liquid crystal alignment has a structure comprising: a flattening film 203 provided on the first birefringence layer 20 in the optical element 40 shown in FIG. 16(a); and a horizontally aligning film 205 provided on the flattening film 203.

The flattening film 203 in the substrate 210 for liquid crystal alignment may be formed, for example, in the same manner as in the protective layer 75 in the optical element 80 in the embodiment shown in FIG. 18. The horizontally aligning film 205 is provided for horizontally aligning a liquid crystal molecule in the liquid crystal cell when a liquid crystal panel for display has been prepared using a substrate 210 for liquid crystal alignment. The horizontally aligning film 205 may be formed, for example, by subjecting the surface (upper surface) of a film formed of, for example, an organic material to rubbing treatment, photoalignment treatment or the like.

The substrate 210 for liquid crystal alignment having the above structure can be used, for example, as a substrate on the display face side of the liquid crystal panel for display in a liquid crystal display device of an IPS system. Since the substrate 210 for liquid crystal alignment has a first birefringence layer 20, visual angle characteristics in the direction of an azimuth of 45 degrees or 135 degrees to the delay phase axis of an analyzer (not shown) constituting the liquid crystal panel for display can be improved by providing +A plate, for example, on the outer surface of the substrate 1 (outer surface in the liquid crystal panel for display).

As already described above, the first birefringence layer 20 can be produced at low cost. The first birefringence layer 20 has relatively high heat resistance. Therefore, a liquid crystal display device having excellent visual angle characteristics and relatively high heat resistance can be produced at low cost by using the substrate 210 for liquid crystal alignment. Further, a liquid crystal display device having a high level of display characteristics and usable in various applications can be produced at low cost.

The provision of the flattening film 203 may be omitted. Further, the optical element 45 shown in FIG. 16(b) or the optical element 50 shown in FIG. 16(c) may be used instead of the optical element 40.

(b) Second Embodiment of Substrate for Liquid Crystal Alignment

FIG. 30(b) is a schematic diagram showing another embodiment of the basic sectional structure of a substrate for liquid crystal alignment according to the present invention. A substrate 230 for liquid crystal alignment has a structure in which a flattening film 223 is provided on the optical element 160 in the embodiment shown in FIG. 20 and a horizontally aligning film 225 is further provided on the flattening film 223.

In the substrate 230 for liquid crystal alignment shown in the drawing, a flattening film 223 is provided so as to cover the color filter 93 and the light shielding layer 95. This flattening film 223 may be formed, for example, in the same manner as in the flattening film 203 in the substrate 210 for liquid crystal alignment in the embodiment shown in FIG. 30(a). Further, the horizontally aligning film 225 in the substrate 230 for liquid crystal alignment may be formed in the same manner as in the horizontally aligning film 205 in the substrate 210 for liquid crystal alignment in the first embodiment.

As with the substrate 210 for liquid crystal alignment in the first embodiment, the substrate 230 for liquid crystal alignment in this embodiment may be used, for example, as a substrate on the display face side of the liquid crystal panel for display in a liquid crystal display device of an IPS system. Since the substrate 230 for liquid crystal alignment has a second birefringence layer 7, visual angle characteristics in the direction of an azimuth of 45 degrees or 135 degrees to the delay phase axis of an analyzer (not shown) constituting the liquid crystal panel for display can be improved without the need to separately provide +A plate on the outer surface of the substrate 230 for liquid crystal alignment.

The provision of the flattening film 223 may be omitted. Further, the optical element 100 in the embodiment shown in FIG. 19(a), the optical element 110 in the embodiment shown in FIG. 19(b), or the optical element 150 in the embodiment shown in FIG. 19(c) may be used instead of the optical element 160.

(c) Third Embodiment of Substrate for Liquid Crystal Alignment

Figure 31:
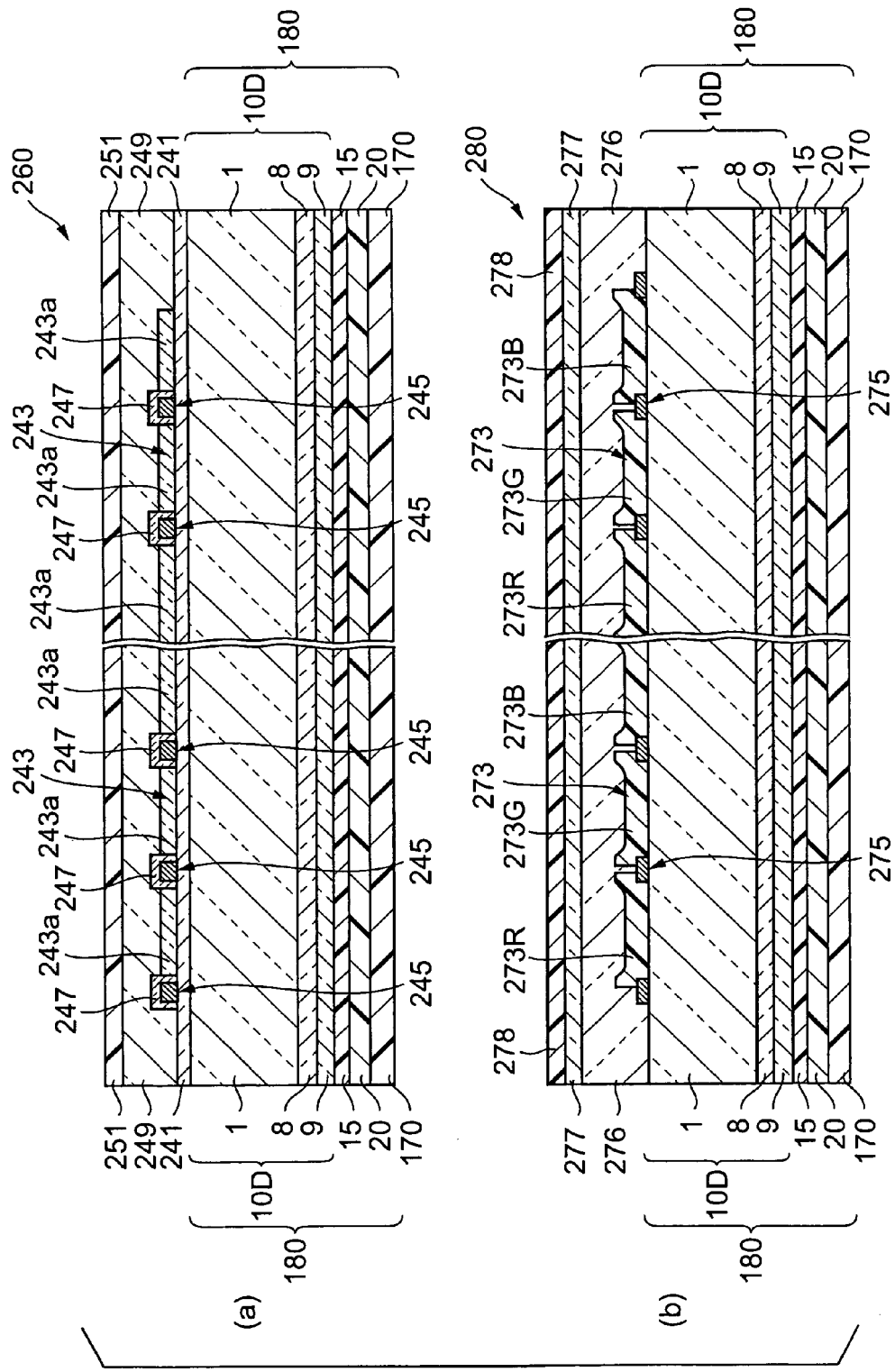
FIG. 31 is a schematic diagram showing an example of the sectional structure of another embodiment of the liquid crystal aligning substrate according to the present invention.

FIG. 31(a) is a schematic diagram showing another embodiment of the basic sectional structure of the substrate for liquid crystal alignment according to the present invention. A substrate 260 for liquid crystal alignment has a structure comprising: the light transparent substrate 1 in the optical element 180 in the embodiment shown in FIG. 21; and, provided on the light transparent substrate 1, scanning lines, an interlayer insulating film 241, a transparent electrode pattern 243 comprising a large number of pixel electrodes 243a arranged in a matrix form, a signal line 245, a protective film (a passivation film) 247, a switching circuit part, a flattening film 249, and an aligning film 251.

Scanning lines (not shown) are disposed so that each one scanning line corresponds to one line of the large number of pixel electrodes 243a disposed in a matrix form and is extended in the longitudinal direction of the line. Each scanning line may be formed of, for example, a metal such as tantalum (Ta) or titanium (Ti). These scanning lines are covered by the interlayer insulating film 241.

The interlayer insulating film 241 is formed of, for example, an electrically insulating material such as silicon oxide to electrically separate the scanning line from the signal line 245 and, at the same time, to electrically separate the pixel electrode 243a from the scanning line.

Each pixel electrode 243a is formed of, for example, a transparent electrode material such as indium tin oxide (ITO) and is provided so as to correspond to one pixel in the liquid crystal panel for display in one-by-one relationship. The form on plane vision of the individual pixel electrodes 243a may be a polygon, for example, a quadrangle or a hexagon formed by cutting away one corner part of a quadrangle to a rectangular form.

The signal lines 245 are disposed so that one signal line corresponding to one column of the large number of pixel electrodes 243a disposed in a matrix form, and are extended in the longitudinal direction of the column. Each signal line 245 may be formed of, for example, a metal such as tantalum (Ta) or titanium (Ti). These signal lines 245 are covered by the protective layer 247.

The protective film 247 is formed of, for example, silicon nitride, to protect a member underlying the protective film 247. The protective film 247 electrically separates the signal line 245 from the pixel electrode 243a.

Each switching circuit part (not shown) is disposed so as to correspond to one pixel electrode 243a in one-by-one relationship to electrically connect the pixel electrode 243a, to which the switching circuit part corresponds, to the scanning line and the signal line 245. Individual switching circuit parts receive the supply of a signal from the respective corresponding scanning lines to control the continuity between the signal line 245 and the pixel electrode 243a. Each switching circuit part may be formed of, for example, one active element. The active element may be, for example, a three-terminal element such as a thin-film transistor or a two-terminal element such as an MIM (metal insulator metal) diode.

The flattening film 249 is provided so as to cover the protective film 247 and the transparent electrode pattern 243 to provide a flat face for forming an aligning film 251. This flattening film 249 may be formed, for example, in the same manner as in the flattening film 203 in the substrate 210 for liquid crystal alignment in the first embodiment shown in FIG. 29(a).

The aligning film 251 is a horizontally aligning film for horizontally aligning a liquid crystal molecule in a liquid crystal cell or a vertically aligning film for homeotropically aligning the liquid crystal molecule, when a liquid crystal panel for display has been prepared using the substrate 260 for liquid crystal alignment. Whether the aligning film 251 to be used is the horizontally aligning film or the vertically aligning film may be properly determined depending, e.g., upon an operation mode of the liquid crystal panel for display to be prepared using the substrate 260 for liquid crystal alignment.

The substrate 260 for liquid crystal alignment having the above structure may be used, for example, as the substrate on the back side of the liquid crystal panel for display in a transmission liquid crystal display device of an active matrix drive system. Since the first birefringence layer 20 and the second birefringence layer 170 are provided in the substrate 260 for liquid crystal alignment, the use of the substrate 260 for liquid crystal alignment can realize the provision of a transmission liquid crystal display device having high light utilization efficiency. Further, since the substrate 260 for liquid crystal alignment has the first birefringence layer 20, the use of the substrate 260 for liquid crystal alignment can realize the provision of a transmission liquid crystal display device having relatively high heat resistance at low cost and can easily provide a transmission liquid crystal display device having a high level of display characteristics and usable in various applications at low cost. The provision of the flattening film 249 can be omitted.

(d) Fourth Embodiment of Substrate for Liquid Crystal Alignment

FIG. 31(b) is a schematic diagram showing another embodiments of the basic sectional structure of the substrate for liquid crystal alignment according to the present invention. The substrate 280 for liquid crystal alignment has a structure comprising: a color filter 273 and a light shielding layer (a black matrix) 275 provided on the light transparent substrate 1 in the optical element 180 in the embodiment shown in FIG. 21; a flattening film 276 provided so as to cover the color filter 273 and the light shielding layer 275; and a transparent electrode pattern 277 and an aligning film 278 stacked in that order on the flattening film 276. All the color filter 273, the light shielding layer 275, the flattening film 276, the transparent electrode pattern 277, and the aligning film 278 are provided on the light transparent substrate 1 in its side remote from the linearly polarizing element 8.

The flattening film 276 is provided so as to cover the color filter 273 and the light shielding layer 275 to provide a flat face for forming the transparent electrode pattern 277. The flattening film 276 may be formed, for example, in the same manner as in the flattening film 203 in the substrate 210 for liquid crystal alignment in the embodiment shown in FIG. 29(a).

In a liquid crystal panel for display using the substrate 280 for liquid crystal alignment, voltage for controlling the alignment of the liquid crystal molecule is applied to the transparent electrode pattern 277. The transparent electrode pattern 277 is formed of, for example, a transparent electrode material such as ITO and is used as an electrode (common electrode) common to all the pixels in the liquid crystal panel for display.

The aligning film 278 is a horizontally aligning film for horizontally aligning a liquid crystal molecule in a liquid crystal cell or a vertically aligning film for homeotropically aligning the liquid crystal molecule, when a liquid crystal panel for display has been prepared using the substrate 280 for liquid crystal alignment. Whether the aligning film 278 to be used is the horizontally aligning film or the vertically aligning film may be properly determined depending, e.g., upon an operation mode of the liquid crystal panel for display to be prepared using the substrate 280 for liquid crystal alignment.

The substrate 280 for liquid crystal alignment having the above structure may be used, for example, as the substrate on the display face side of the liquid crystal panel for display in a reflection liquid crystal display device. Since the first birefringence layer 20 and the second birefringence layer 170 are provided in the substrate 280 for liquid crystal alignment, the use of the substrate 280 for liquid crystal alignment can realize the provision of a reflection liquid crystal display device having high light utilization efficiency. Further, since the substrate 280 for liquid crystal alignment has the first birefringence layer 20, the use of the substrate 280 for liquid crystal alignment can realize the provision of a reflection liquid crystal display device having relatively high heat resistance at low cost and can provide a reflection liquid crystal display device having a high level of display characteristics and usable in various applications at low cost. The provision of the flattening film 276 can be omitted.

Liquid Crystal Display Device

Figure 32:
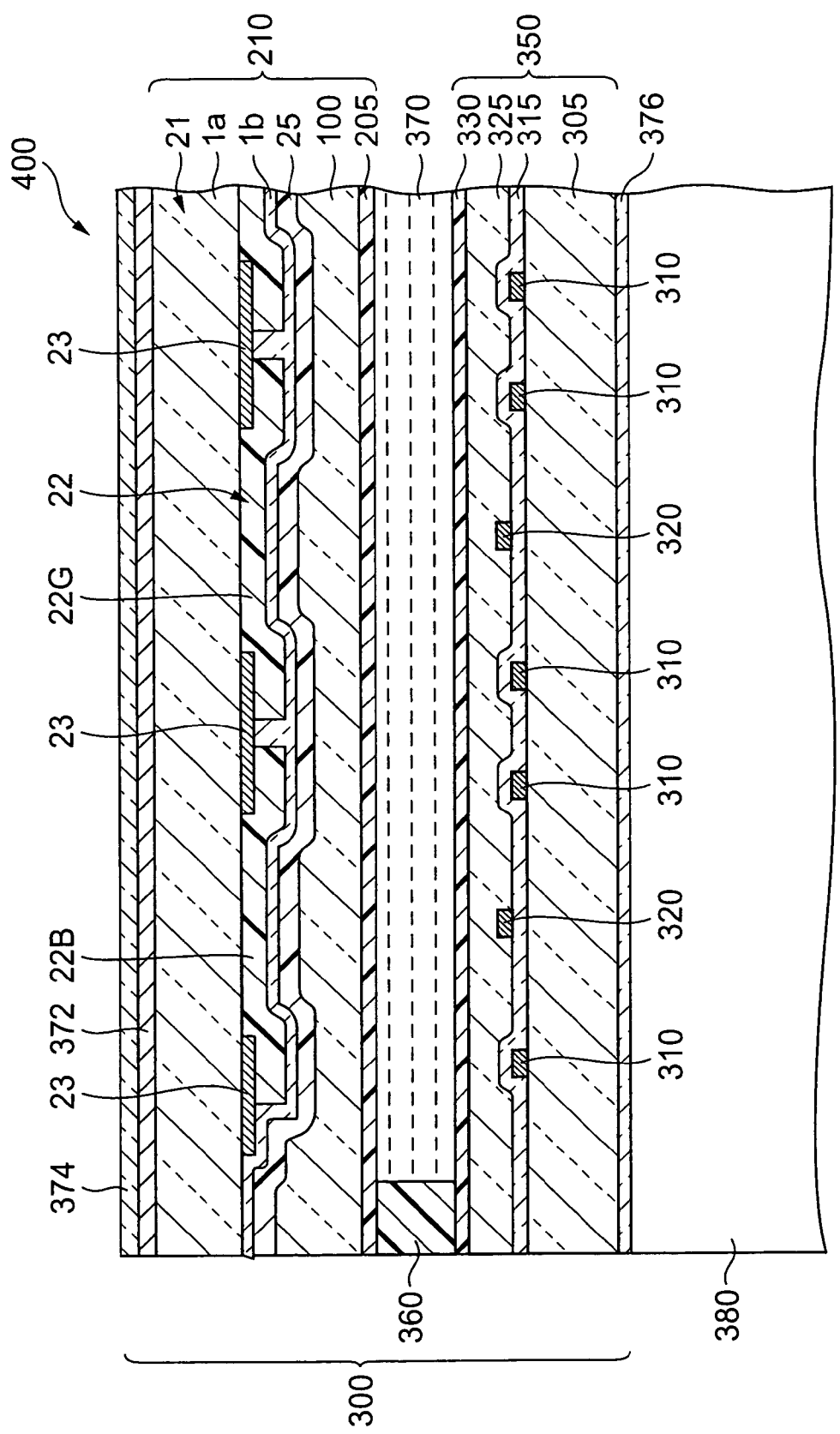
FIG. 32 is a schematic partial sectional view showing an example of the liquid crystal display device according to the present invention.
Figure 33:
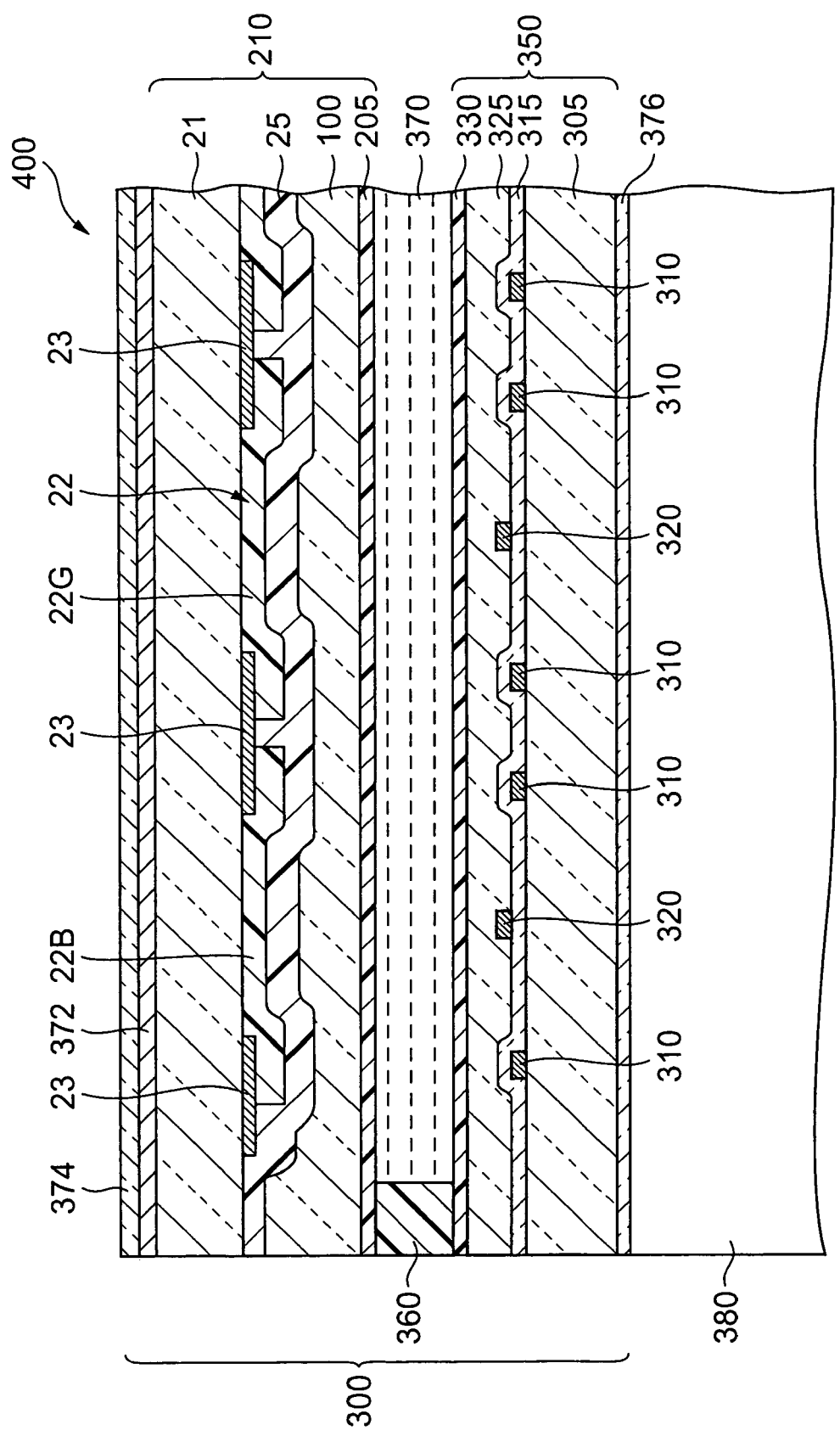
FIG. 33 is a partial cross-sectional view of another embodiment of the liquid crystal display device according to the present invention.

1. Liquid Crystal Display Device According to First Aspect of Invention (a) First Embodiment of Liquid Crystal Display Device FIGS. 32 and 33 are schematic partial cross-sectional views showing one embodiment of the liquid crystal display device according to the present invention. A liquid crystal display device 400 is a transmission liquid crystal display device of IPS system, comprising a liquid crystal panel 300 for display, a backlight part 380 installed behind the liquid crystal panel 300 for display, and an external circuit (not shown).

The liquid crystal panel 300 for display comprises the substrate 210 for liquid crystal alignment in the first embodiment as a display face-side substrate (a first substrate for liquid crystal alignment) and a substrate 350 for liquid crystal alignment as a substrate on back side (a second substrate for liquid crystal alignment).

The liquid crystal aligning substrate 350 includes a light transparent substrate 305. A number of counter electrodes 310 are arranged in a predetermined pattern on one side of the light transparent substrate 305. An interlayer insulating film 315 is provided for covering the counter electrodes 310. Pixel electrodes 320 are provided on the interlayer insulating film 315 so as to correspond to pixels in the liquid crystal panel 300 for display in one-by-one relationship. A protective layer 325 is provided to cover the interlayer insulating film 315 and the pixel electrodes 320. A horizontally aligning film 330 is provided on the protective layer 325.

The counter electrodes 310 are disposed so that two counter electrodes correspond to one pixel column in the liquid crystal panel 300 for display. The two counter electrodes are disposed respectively on both sides of the corresponding pixel column. These counter electrodes 310 may be formed of, for example, a metal such as tantalum (Ta) or titanium (Ti). The pixel electrodes 320 are formed of, for example, a transparent electrode material such as ITO and travel the length of substantially the center part of the corresponding pixel on plane vision. The protective layer 325 may be formed, for example, in the same manner as in the protective layer 100 in the substrate 210 for liquid crystal alignment in the embodiment shown in FIGS. 26(a) and 27(a). The horizontally aligning film 330 may be formed, for example, in the same manner as in the horizontally aligning film 205 in the substrate 210 for liquid crystal alignment in the first embodiment.

Further, in the substrate 350 for liquid crystal alignment, gate wirings (scanning lines), drain wirings, and holding capacitor wirings are provided so as to correspond to respective pixel lines in the liquid crystal panel 300 for display in one-by-one relationship (not shown). Furthermore, switching circuit parts and the like are also provided so as to correspond to respective pixels in one-by-one relationship (not shown). Each switching circuit part is constituted by a plurality of switching elements (for example, a thin-film transistor, an MIM diode or the like).

The substrate 350 for liquid crystal alignment having the above structure and the substrate 210 for liquid crystal alignment are applied to each other with the aid of a sealing material (thermosetting resin) 360 while providing a gap therebetween so that the horizontally aligning film 205 in the substrate 210 for liquid crystal alignment faces the horizontally aligning film 330 in the substrate 350 for liquid crystal alignment. The gap (cell gap) between the substrates 210, 350 for liquid crystal alignment is kept constant, for example, by a spherical spacer or a columnar spacer (not shown), and the gap therebetween is filled with a liquid crystal material to form a liquid crystal layer 370.

A +A plate 372 is applied to the outer surface of the substrate 210 for liquid crystal alignment, and an analyzer 374 is applied thereonto. On the other hand, a polarizer 376 is applied to the outer surface of the substrate 350 for liquid crystal alignment. The analyzer 374 and the polarizer 376 may be disposed in a crossed Nicol relationship or a parallel Nicol relationship. The backlight part 380 is disposed behind the polarizer 376.

In the liquid crystal display device 400 having the above construction, the first birefringence layer 25 is provided on the substrate 210 for liquid crystal alignment, and the phase difference film 372 is applied to the outer surface of the substrate 210 for liquid crystal alignment. Therefore, visual angle characteristics can easily be improved. Further, since the first birefringence layer 25 has relatively high heat resistance, the liquid crystal display device 400 may be of course used as a liquid crystal display device for room interior and may also be used as a liquid crystal display device for an on-vehicle liquid crystal display device exposed to a relatively high-temperature environment. Further, since an increase in production cost of the first birefringence layer 25 can easily be prevented, the liquid crystal display device 400 can be provided at low cost. The substrate 230 for liquid crystal alignment in the embodiment shown in FIGS. 26(b) and 27(b) may also be used instead of the substrate 210 for liquid crystal alignment.

(b) Second Embodiment of Liquid Crystal Display Device

Figure 34:
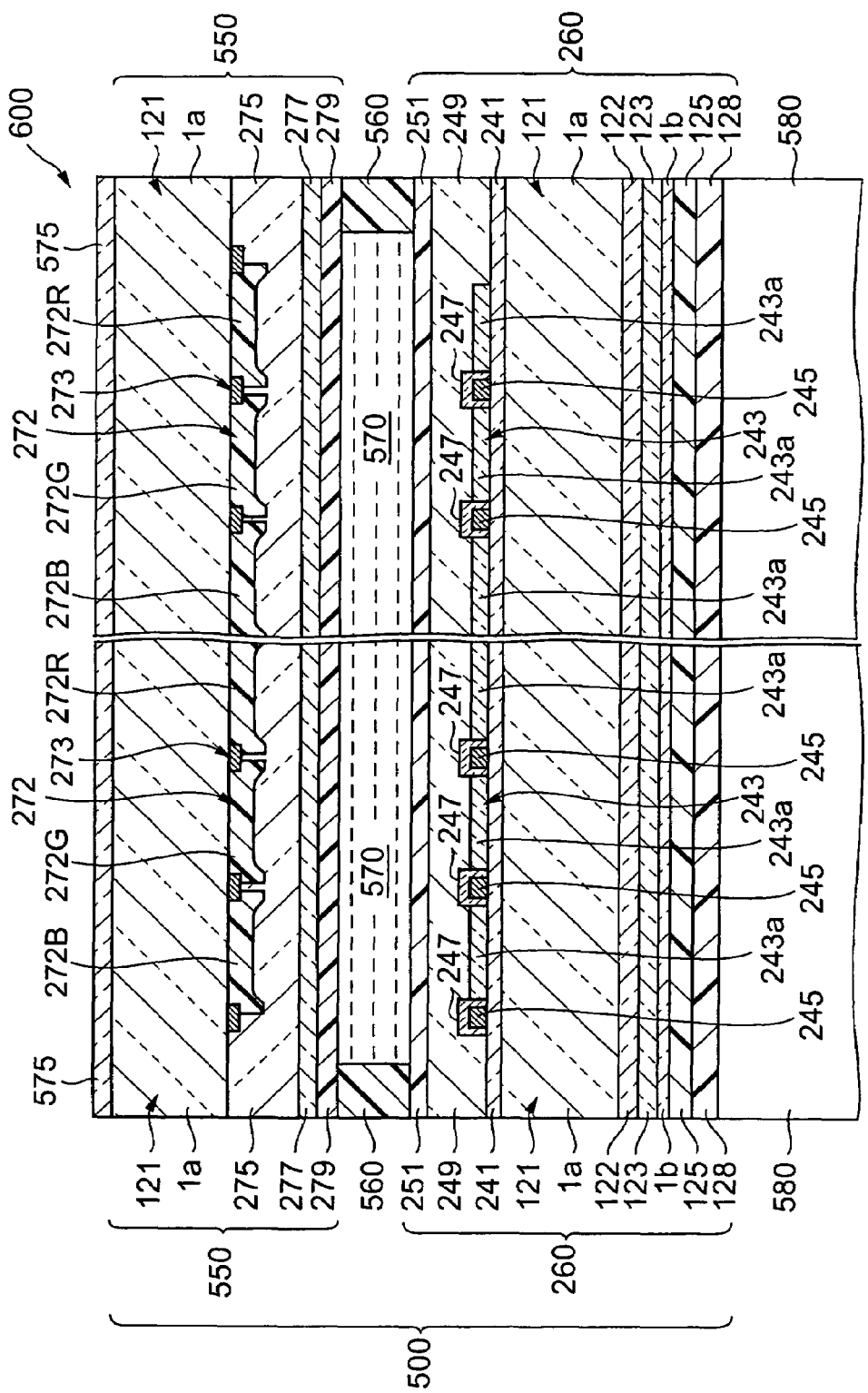
FIG. 34 is a partial cross-sectional view of still another embodiment of the liquid crystal display device according to the present invention.
Figure 35:
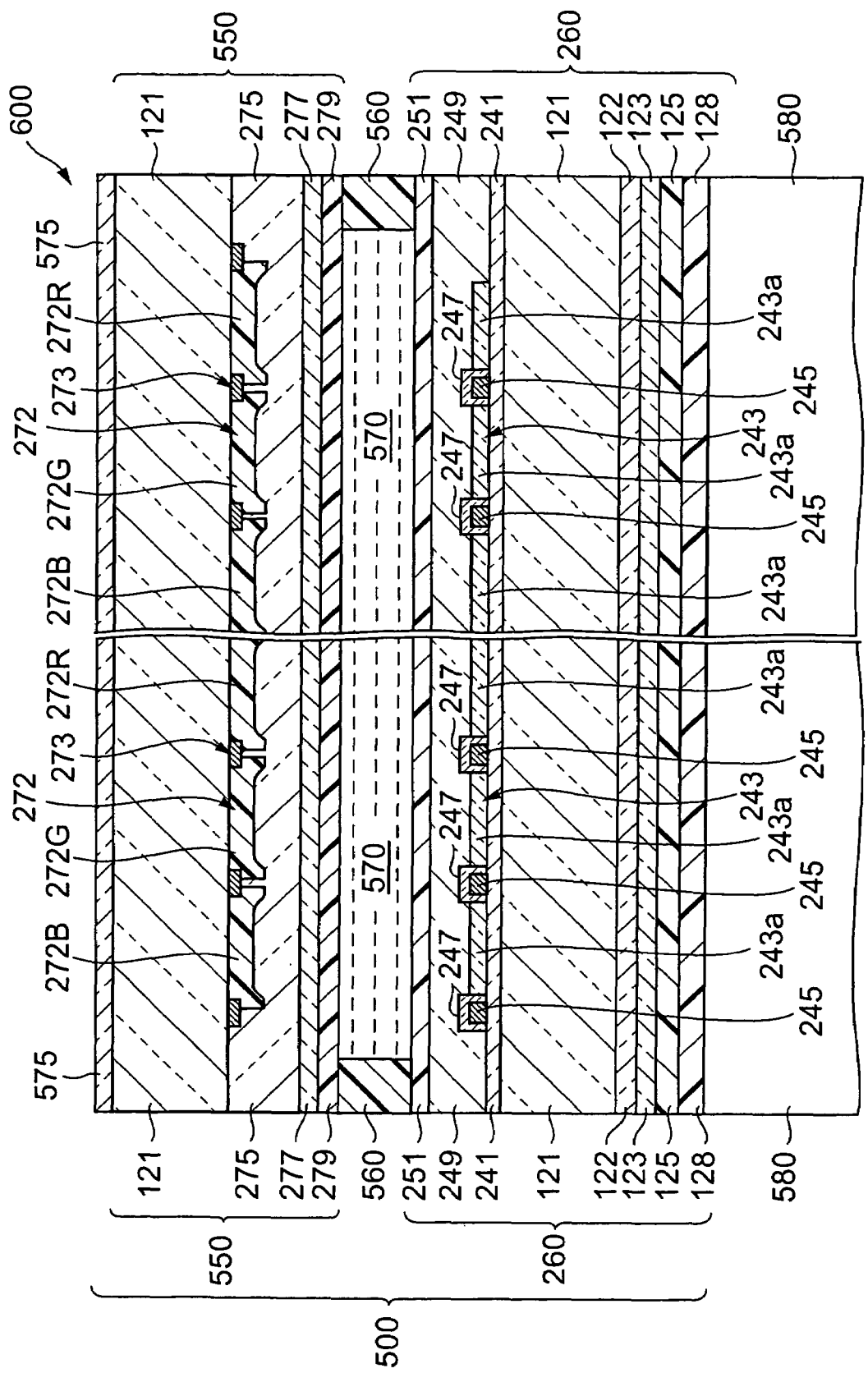
FIG. 35 is a partial cross-sectional view of a further embodiment of the liquid crystal display device according to the present invention.

FIGS. 34 and 35 are schematic partial cross-sectional views showing another embodiment of the liquid crystal display device according to the present invention. A liquid crystal display device 600 is a transmission liquid crystal display device of an active matrix drive system, comprising a liquid crystal panel 500 for display, a backlight part 580 installed behind the liquid crystal-panel 500 for display, and an external circuit (not shown).

The liquid crystal panel 500 for display comprises the substrate 260 for liquid crystal alignment in the embodiment shown in FIGS. 28(a) and 29(a) as a substrate on the back side (a second substrate for liquid crystal alignment) and a substrate 550 for liquid crystal display as a substrate on display face side (a first substrate for liquid crystal alignment). The construction of the substrate 550 for liquid crystal alignment is such that the linearly polarizing element 122, the quarter-wavelength plate 123, the silicon oxide film 1b, the first birefringence layer 125, and the second birefringence layer 128 have been removed from the substrate 280 for liquid crystal alignment in the fourth embodiment shown in FIGS. 28(b) and 29(b).

The substrate 550 for liquid crystal alignment and the substrate 260 for liquid crystal alignment are applied to each other with the aid of a sealing material (a thermosetting resin) 560 while leaving a gap therebetween so that the aligning film 279 in the substrate 550 for liquid crystal alignment faces the aligning film 251 in the substrate 260 for liquid crystal alignment. The aligning film 279 may be any of a horizontally aligning film and a vertically aligning film. However, when the horizontally aligning film is used as the aligning film 279, the horizontally aligning film is also used as the aligning film 251; and, when the vertically aligning film is provided as the aligning film 279, the vertically aligning film is provided as the aligning film 251.

The gap (cell gap) between the substrates 550, 260 for liquid crystal alignment is kept constant, for example, by a spherical spacer or a columnar spacer (not shown), and the gap therebetween is filled with a liquid crystal material to form a liquid crystal layer 570. An analyzer 575 is applied on the outer surface of the substrate 550 for liquid crystal alignment. The analyzer 575 and the linearly polarizing element 122 in the substrate 260 for liquid crystal alignment may be disposed in a crossed Nicol relationship or in a parallel Nicol relationship. The backlight part 580 is disposed behind the substrate 260 for liquid crystal alignment.

In the liquid crystal display device 600 having the above construction, the first birefringence layer 125 and the second birefringence layer 128 are provided in the substrate 260 for liquid crystal alignment. Therefore, the efficiency of utilization of light emitted from the backlight part 580 can easily be enhanced. Further, since the first birefringence layer 125 has relatively high heat resistance, the liquid crystal display device 600 may be of course used as a liquid crystal display device for room interior and may also be used as a liquid crystal display device for an on-vehicle liquid crystal display device exposed to a relatively high-temperature environment. Further, since the production cost of the first birefringence layer 125 is low, the liquid crystal display device 600 can be produced at low cost.

Figure 36:
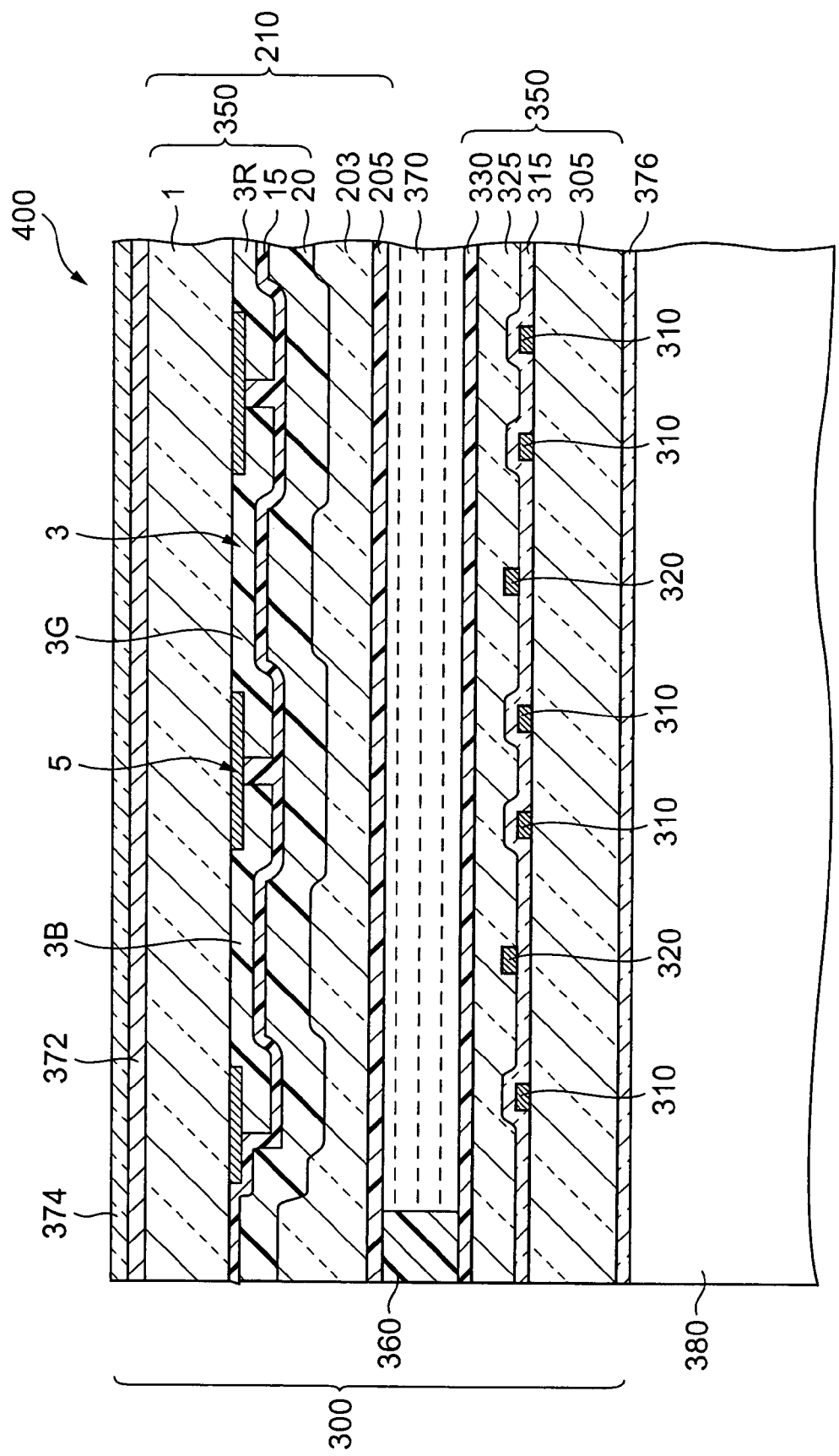
FIG. 36 is a partial cross-sectional view of another embodiment of the liquid crystal display device according to the present invention.

2. Liquid Crystal Display Device According to Second Aspect of Invention (a) First Embodiment of Liquid Crystal Display Device FIG. 36 is a schematic partial cross-sectional view showing one embodiment of the liquid crystal display device according to the present invention. A liquid crystal display device 400 is a transmission liquid crystal display device of IPS system, comprising a liquid crystal panel 300 for display, a backlight part 380 installed behind the liquid crystal panel 300 for display, and an external circuit (not shown).

The liquid crystal panel 300 for display comprises the substrate 210 for liquid crystal alignment in the embodiment shown in FIG. 30(a) as a display face-side substrate (a first substrate for liquid crystal alignment) and a substrate 350 for liquid crystal alignment as a substrate on back side (a second substrate for liquid crystal alignment).

The liquid crystal aligning substrate 350 includes a light transparent substrate 305. A number of counter electrodes 310 are arranged in a predetermined pattern on one side of the light transparent substrate 305. An interlayer insulating film 315 is provided for covering the counter electrodes 310. Pixel electrodes 320 are provided on the interlayer insulating film 315 so as to correspond to pixels in the liquid crystal panel 300 for display in one-by-one relationship. A protective layer 325 is provided to cover the interlayer insulating film 315 and the pixel electrodes 320. A horizontally aligning film 330 is provided on the protective layer 325.

The counter electrodes 310 are disposed so that two counter electrodes correspond to one pixel column in the liquid crystal panel 300 for display. The two counter electrodes are disposed respectively on both sides of the corresponding pixel column. These counter electrodes 310 may be formed of, for example, a metal such as tantalum (Ta) or titanium (Ti). The pixel electrodes 320 are formed of, for example, a transparent electrode material such as ITO and travel the length of substantially the center part of the corresponding pixel on plane vision. The protective layer 325 may be formed, for example, in the same manner as in the flattening film 203 in the substrate 210 for liquid crystal alignment in the first embodiment shown FIG. 30(a). The horizontally aligning film 330 may be formed, for example, in the same manner as in the horizontally aligning film 205 in the substrate 210 for liquid crystal alignment in the first embodiment.

Further, in the substrate 350 for liquid crystal alignment, gate wirings (scanning lines), drain wirings, and holding capacitor wirings are provided so as to correspond to respective pixel lines in the liquid crystal panel 300 for display in one-by-one relationship (not shown). Furthermore, switching circuit parts and the like are also provided so as to correspond to respective pixels in one-by-one relationship (not shown). Each switching circuit part is constituted by a plurality of switching elements (for example, a thin-film transistor, an MIM diode or the like).

The substrate 350 for liquid crystal alignment having the above structure and the substrate 210 for liquid crystal alignment are applied to each other with the aid of a sealing material (thermosetting resin) 360 while providing a gap therebetween so that the horizontally aligning film 205 in the substrate 210 for liquid crystal alignment faces the horizontally aligning film 330 in the substrate 350 for liquid crystal alignment. The gap (cell gap) between the substrates 210, 350 for liquid crystal alignment is kept constant, for example, by a spherical spacer or a columnar spacer (not shown), and the gap therebetween is filled with a liquid crystal material to form a liquid crystal layer 370.

A +A plate 372 is applied to the outer surface of the substrate 210 for liquid crystal alignment, and an analyzer 374 is applied thereonto. On the other hand, a polarizer 376 is applied to the outer surface of the substrate 350 for liquid crystal alignment. The analyzer 374 and the polarizer 376 may be disposed in a crossed Nicol relationship or in a parallel Nicol relationship. The backlight part 380 is disposed behind the polarizer 376.

In the liquid crystal display device 400 having the above construction, the first birefringence layer 20 is provided on the substrate 210 for liquid crystal alignment, and the phase difference film 372 is applied to the outer surface of the substrate 210 for liquid crystal alignment. Therefore, visual angle characteristics can easily be improved. Further, since the first birefringence layer 20 has relatively high heat resistance, the liquid crystal display device 400 may be of course used as a liquid crystal display device for room interior and may also be used as a liquid crystal display device for an on-vehicle liquid crystal display device exposed to a relatively high-temperature environment. Further, since the production cost of the first birefringence layer 20 is low, the liquid crystal display device 400 can be produced at low cost. The substrate 230 for liquid crystal alignment in the embodiment shown in FIG. 30(b) may also be used instead of the substrate 210 for liquid crystal alignment.

(b) Second Embodiment of Liquid Crystal Display Device

Figure 37:
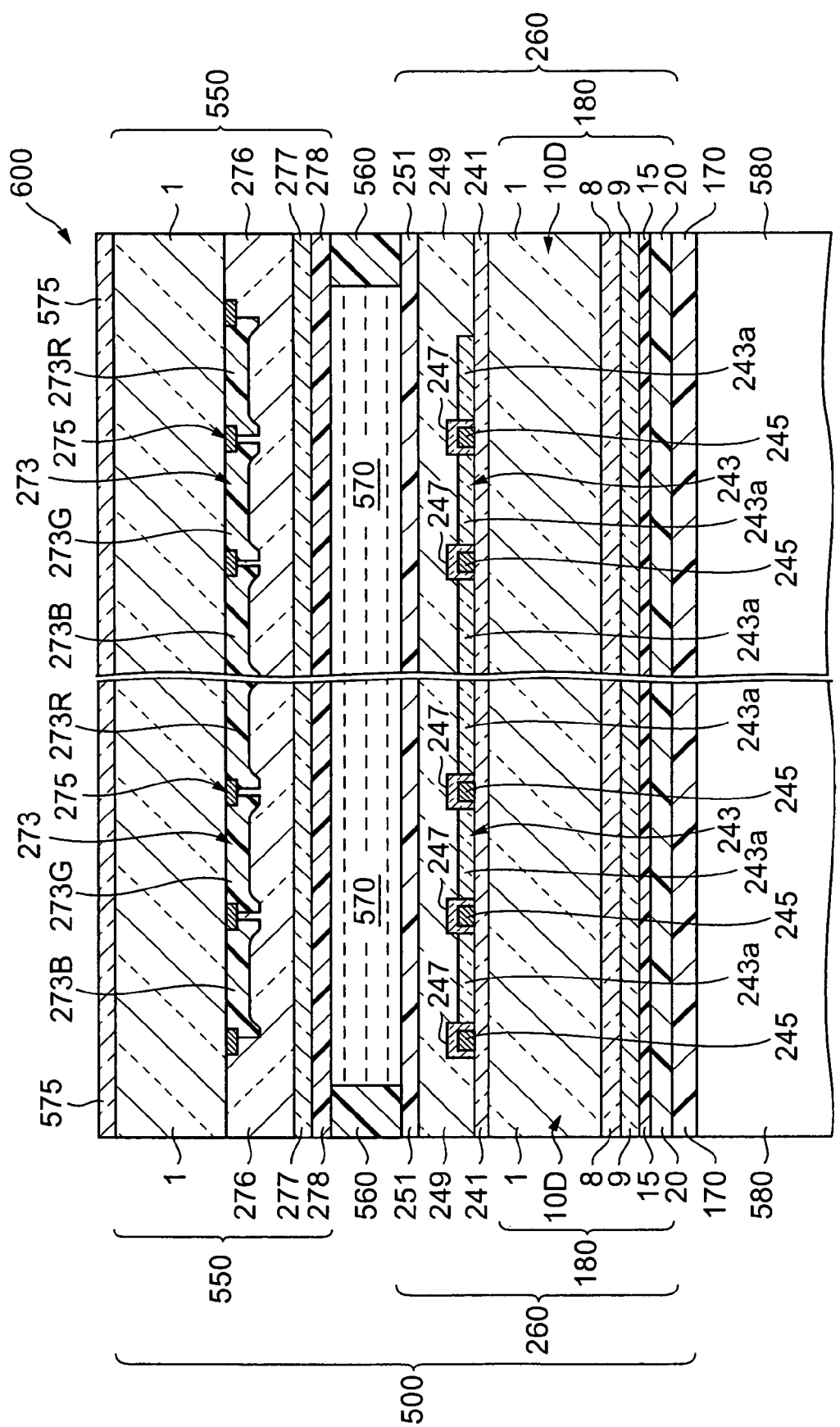
FIG. 37 is a partial cross-sectional view of still another embodiment of the liquid crystal display device according to the present invention.

FIG. 37 is a schematic partial cross-sectional view showing another embodiment of the liquid crystal display device according to the present invention. A liquid crystal display device 600 is a transmission liquid crystal display device of an active matrix drive system, comprising a liquid crystal panel 500 for display, a backlight part 580 installed behind the liquid crystal panel 500 for display, and an external circuit (not shown).

The liquid crystal panel 500 for display comprises the substrate 260 for liquid crystal alignment in the embodiment shown in FIG. 31(a) as a substrate on back side (a second substrate for liquid crystal alignment) and a substrate 550 for liquid crystal display as a substrate on display face side (a first substrate for liquid crystal alignment). The construction of the substrate 550 for liquid crystal alignment is such that the linearly polarizing element 8, the quarter-wavelength plate 9, the vertically aligning film 15, the first birefringence layer 20, and the second birefringence layer 170 have been removed from the substrate 280 for liquid crystal alignment in the embodiment shown in FIG. 31(b).

The substrate 550 for liquid crystal alignment and the substrate 260 for liquid crystal alignment are applied to each other with the aid of a sealing material (a thermosetting resin) 560 while leaving a gap therebetween so that the aligning film 278 in the substrate 550 for liquid crystal alignment faces the aligning film 251 in the substrate 260 for liquid crystal alignment. The aligning film 278 may be any of a horizontally aligning film and a vertically aligning film. However, when the horizontally aligning film is used as the aligning film 278, the horizontally aligning film is also used as the aligning film 251; and, when the vertically aligning film is provided as the aligning film 278, the vertically aligning film is provided as the aligning film 251.

The gap (cell gap) between the substrates 550, 260 for liquid crystal alignment is kept constant, for example, by a spherical spacer or a columnar spacer (not shown), and the gap therebetween is filled with a liquid crystal material to form a liquid crystal layer 570. An analyzer 575 is applied on the outer surface of the substrate 550 for liquid crystal alignment. The analyzer 575 and the linearly polarizing element 8 in the substrate 260 for liquid crystal alignment may be disposed in a crossed Nicol relationship or in a parallel Nicol relationship. The backlight part 580 is disposed behind the substrate 260 for liquid crystal alignment.

In the liquid crystal display device 600 having the above construction, the first birefringence layer 20 and the second birefringence layer 170 are provided in the substrate 260 for liquid crystal alignment. Therefore, the efficiency of utilization of light emitted from the backlight part 580 can easily be enhanced. Further, since the first birefringence layer 20 has relatively high heat resistance, the liquid crystal display device 600 may be of course used as a liquid crystal display device for room interior and may also be used as a liquid crystal display device for an on-vehicle liquid crystal display device exposed to a relatively high-temperature environment. Further, since the production cost of the first birefringence layer 20 is low, the liquid crystal display device 600 can be produced at low cost.

EXAMPLES

Example 1 (Optical Element According to First Aspect of Invention)

1. Step of Provision

A 0.7 mm-thick alkali-free glass substrate (NA 35 manufactured by NH TECHNO GLASS CORP.) was provided as a light transparent substrate.

2. Step of Alignment

TSL 8233 (tradename) as silicone manufactured by Toshiba Silicone Co., Ltd., TSL 8114 (tradename) as silicone manufactured by Toshiba Silicone Co., Ltd., and 0.005 N hydrochloric acid were first mixed together at a ratio of 10:3: 4.7 (by mass), and the silicone was hydrolyzed to prepare a silane coupling agent.

Next, 25 parts by weight of a polyfunctional polymerizable liquid crystal represented by formula (IV) and 1 part by weight of a photopolymerization initiator were dissolved in 74 parts by weight of 3-methoxybutyl acetate to prepare a polymerizable liquid crystal solution. This polymerizable liquid crystal solution and a solution prepared by diluting the silane coupling agent with isopropyl alcohol to a concentration of 10% by weight were mixed together at a ratio of 99.25:0.75 (by mass). Further, a predetermined amount of octadecyldimethyl (3-trimethoxysilylpropyl)ammonium chloride was added to this mixed solution to prepare a coating composition for first birefringence layer formation. In this case, Irg 907 (tradename) manufactured by Ciba Specialty Chemicals, K.K. was used as a photopolymerization initiator. The amount of octadecyldimethyl (3-trimethoxysilylpropyl) ammonium chloride added was 1/10 in terms of mass ratio based on the total amount of the above TSL 8233 and TSL 8114.

Next, the coating composition for first birefringence layer formation was spin coated to form a coating onto the glass substrate, and the coating was heated to 80° C. The state of the coating was changed from a milky state to a transparent state with the elapse of heating time, indicating that the phase of the polymerizable liquid crystal in the coating was transited from a crystal phase to a liquid crystal phase upon heating.

3. Step of Crosslinking

While heating the coating subjected to phase transition of the polymerizable liquid crystal to 80° C., ultraviolet light was applied to the coating in a nitrogen gas atmosphere to three-dimensionally crosslink the polymerizable liquid crystal in the coating. At that time, the ultraviolet light was applied with an ultraviolet light irradiation apparatus provided with an ultrahigh pressure mercury lamp as a light source under conditions of irradiation intensity 30 mW/cm$^2$ and irradiation time 1 min.

At a point of time when steps up to the crosslinking step have been completed, a first birefringence layer, in which the polymerizable liquid crystal represented by formula (IV) had a three-dimensionally crosslinked structure and the above silane coupling agent was contained as the coupling agent, was formed to prepare a contemplated optical element. The thickness of the first birefringence layer in this optical element was measured with a tracer type difference-in-level meter and was found to be about 1.8 µm.

4. Evaluation

Retardation in the thickness-wise direction of the optical element was measured with RETS (manufactured by Otsuka Denshi K.K.) and was found to be substantially 0 (zero) nm (strictly, 3 nm). The thickness-wise direction in the case where the optical element was disposed horizontally was used as a reference, and the optical element was flapped in any direction from this direction. As a result, the retardation was increased. These facts indicate that, in the first birefringence layer, the polymerizable liquid crystal was homeotropically aligned.

Further, even after heating of the optical element to 200° C., the first birefringence layer maintained a transparent state without causing phase transition. From this fact, the first birefringence layer is judged to have a structure that the polymerizable liquid crystal has been three-dimensionally crosslinked.

Example 2 (Optical Element According to First Aspect of Invention)

In the same manner as in Example 1, the step of provision, the step of alignment, and the step of crosslinking were successively carried out to prepare an optical element comprising a 2.5 µm-thick first birefringence layer, except that, in preparing a coating composition for first birefringence layer formation, DRYPON 600E (tradename; a surfactant manufactured by Nicca Chemical Co., Ltd.) was used instead of octadecyldimethyl (3-trimethoxysilylpropyl)ammonium chloride and the mass ratio of DRYPON 600E to the total amount of TSL 8233 and TSL 8114 used as the starting material of the silane coupling agent was 1/20.

Retardation in the thickness-wise direction of the optical element was measured in the same manner as in Example 1 and was found to be substantially 0 (zero) nm (strictly, 1 nm). The thickness-wise direction in the case where the optical element was disposed horizontally was used as a reference, and the optical element was flapped in any direction from this direction. As a result, the retardation was increased. These facts indicate that, in the first birefringence layer, the polymerizable liquid crystal was homeotropically aligned.

Further, even after heating of the optical element to 200° C., the first birefringence layer maintained a transparent state without causing phase transition. From this fact, the first birefringence layer is judged to have a structure that the polymerizable liquid crystal has been three-dimensionally crosslinked.

Example 3 (Optical Element According to First Aspect of Invention)

1. Step of Provision and Step of Alignment

A 0.7 mm-thick alkali-free glass substrate (NA 35 manufactured by NH TECHNO GLASS CORP.) was first provided as a light transparent substrate. TSL 8233 (tradename) as silicone manufactured by Toshiba Silicone Co., Ltd. and TSL 8114 (tradename) as silicone manufactured by Toshiba Silicone Co., Ltd. were mixed together at a ratio of 10:3 (by mass), and the mixture was hydrolyzed to prepare a silane coupling agent.

25 parts by weight of a polyfunctional polymerizable liquid crystal represented by formula (IV) and 1 part by weight of a photopolymerization initiator were dissolved in 74 parts by weight of 3-methoxybutyl acetate to prepare a polymerizable liquid crystal solution. This polymerizable liquid crystal solution and a solution prepared by diluting the silane coupling agent with isopropyl alcohol to a concentration of 10% by weight were mixed together at a ratio of 99.25:0.75 (by mass) to prepare a coating composition for first birefringence layer formation. In this case, Irg 907 (tradename) manufactured by Ciba Specialty Chemicals, K.K. was used as a photopolymerization initiator.

Next, the coating composition for first birefringence layer formation was spin coated to form a coating onto the glass substrate, and the coating was heated to 80° C. The state of the coating was changed from a milky state to a transparent state with the elapse of heating time, indicating that the phase of the polymerizable liquid crystal in the coating was transited from a crystal phase to a liquid crystal phase upon heating.

2. Step of Crosslinking

While heating the coating subjected to phase transition of the polymerizable liquid crystal to 80° C., ultraviolet light was applied to the coating in a nitrogen gas atmosphere to three-dimensionally crosslink the polymerizable liquid crystal in the coating. At that time, the ultraviolet light was applied with an ultraviolet light irradiation apparatus provided with an ultrahigh pressure mercury lamp as a light source under conditions of irradiation intensity 30 mW/cm$^2$ and irradiation time 1 min.

At a point of time when steps up to the crosslinking step have been completed, a first birefringence layer, in which the polymerizable liquid crystal represented by formula (IV) had a three-dimensionally crosslinked structure and the above silane coupling agent was contained as the coupling agent, was formed to prepare a contemplated optical element. The thickness of the first birefringence layer in this optical element was measured with a tracer type difference-in-level meter and was found to be about 1.8 μm.

3. Evaluation

Figure 38:
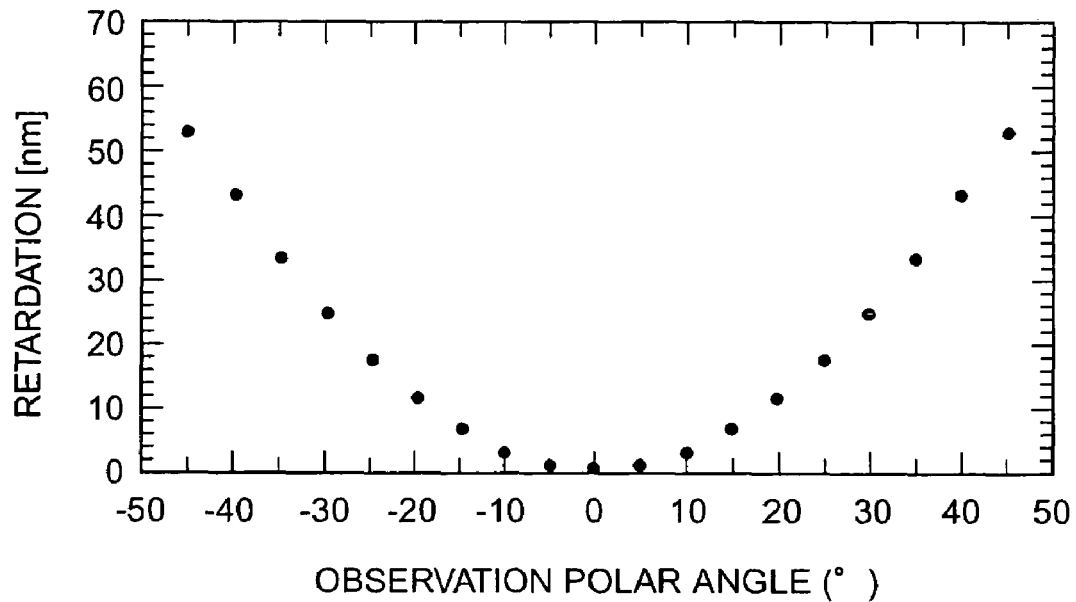
FIG. 38 is a graph showing the results of measurement of retardation of the optical element produced in Example 3.

Retardation in the thickness-wise direction of the optical element was measured in the same manner as in Example 1 and was found to be substantially 0 (zero) nm. The thickness-wise direction in the case where the optical element was disposed horizontally was used as a reference, and the optical element was flapped in any direction from this direction. As a result, retardation appeared. The results of measurement of retardation at that time are shown in FIG. 38. As shown in the drawing, regarding the retardation upon flapping of the optical element, the value in the case where the optical element was flapped in a certain direction at an inclination angle (flapping angle) of 0 (zero) degree in horizontal disposition of the optical element was substantially the same as the value in the case where the optical element was flapped in a direction opposite to the "certain direction."

These facts indicate that, in the first birefringence layer, the polymerizable liquid crystal was homeotropically aligned.

Further, even after heating of the optical element to 200° C., the birefringence characteristics of the first birefringence layer substantially remained unchanged. From this fact, the first birefringence layer is judged to have a structure that the polymerizable liquid crystal as structural unit has been three-dimensionally crosslinked.

Example 4 (Optical Element According to First Aspect of Invention)

In the same manner as in Example 3, the step of provision, the step of alignment, and the step of crosslinking were successively carried out to prepare an optical element comprising a first birefringence layer, except that, in preparing a silane coupling agent, LS 5258 (tradename) as silicone manufactured by The Shin-Etsu Chemical Co., Ltd. and TSL 8114 (tradename) as silicone manufactured by Toshiba Silicone Co., Ltd. were mixed together at a ratio of 10:3 (by mass) and that, after spin coating of the coating composition for first birefringence layer formation onto a glass substrate to form a coating, the coating was vacuum dried under an atmosphere pressure of 0.4 Torr (about 0.533×102 Pa) to homeotropically align the polymerizable liquid crystal in the coating.

Figure 39:
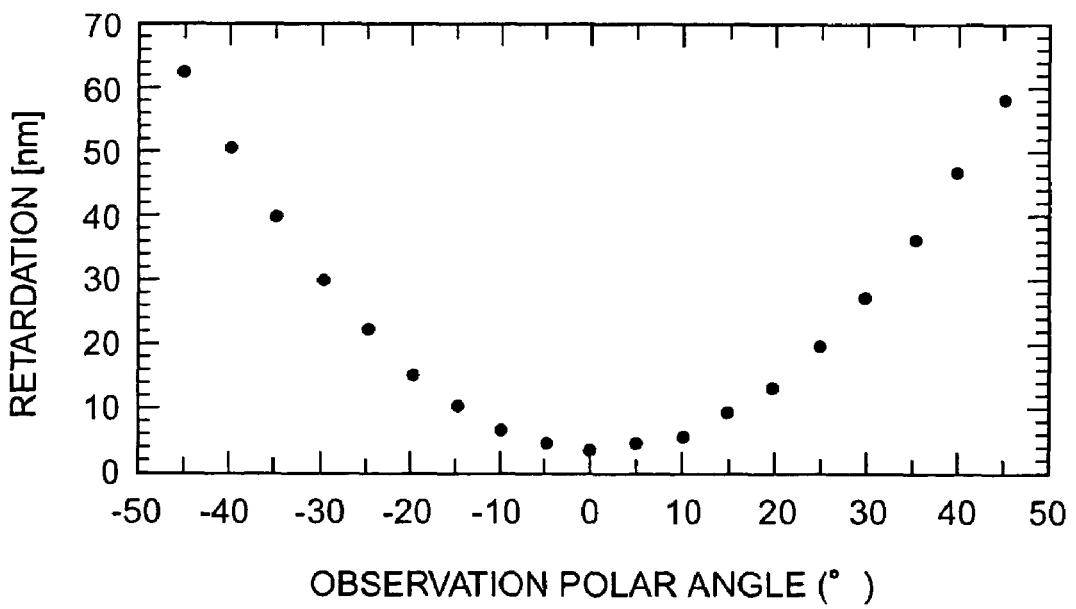
FIG. 39 is a graph showing the results of measurement of retardation of the optical element produced in Example 4.

Retardation in the thickness-wise direction of the optical element was measured in the same manner as in Example 1 and was found to be substantially 0 (zero) nm. The thickness-wise direction in the case where the optical element was disposed horizontally was used as a reference, and the optical element was flapped in any direction from this direction. As a result, retardation appeared. The results of measurement of retardation at that time are shown in FIG. 39. As shown in the drawing, regarding the retardation upon flapping of the optical element, the value in the case where the optical element was flapped in a certain direction at an inclination angle (flapping angle) of 0 (zero) degree in horizontal disposition of the optical element was substantially the same as the value in the case where the optical element was flapped in a direction opposite to the "certain direction."

These facts indicate that, in the first birefringence layer, the polymerizable liquid crystal was homeotropically aligned. Therefore, it is judged that the polymerizable liquid crystal which had been homeotropically aligned by vacuum drying remained its homeotropic aligning state even when the coating was then cooled to room temperature. Vacuum drying of the coating enables the aligned state of the polymerizable liquid crystal to be kept in a supercooled state.

Further, even after heating of the optical element to 200° C., the birefringence characteristics of the first birefringence layer substantially remained unchanged. From this fact, the first birefringence layer is judged to have a structure that the polymerizable liquid crystal as structural unit has been three-dimensionally crosslinked.

Example 5 (Optical Element According to First Aspect of Invention)

In the same manner as in Example 4, the step of provision, the step of alignment, and the step of crosslinking were successively carried out to prepare an optical element comprising a first birefringence layer, except that a triacetylcellulose film having a 40 nm-thick silicon oxide film on its one side was used as the light transparent substrate. In this optical element, a first birefringence layer has been formed on a silicon oxide film.

Retardation in the thickness-wise direction of the optical element was measured in the same manner as in Example 3 and was found to be substantially 0 (zero) nm. The thickness-wise direction in the case where the optical element was disposed horizontally was used as a reference, and the optical element was flapped in any direction from this direction. As a result, the retardation appeared. These facts indicate that, in the first birefringence layer, the polymerizable liquid crystal was homeotropically aligned.

Further, even after heating of the optical element to 100° C., the birefringence characteristics of the first birefringence layer substantially remained unchanged. From this fact, the first birefringence layer is judged to have a structure that the polymerizable liquid crystal as structural unit has been three-dimensionally crosslinked.

Example 6 (Optical Element According to First Aspect of Invention)

1. Step of Provision

Octadecyldimethyl (3-trimethoxysilylpropyl)ammonium chloride was first dissolved in isopropyl alcohol to give a concentration of 1% by weight to prepare a coating liquid for homeotroic aligning film formation. Next, a 0.7 mm-thick alkali-free glass substrate (NA35 manufactured by NH TECHNO GLASS CORP.) was provided. The coating liquid was coated on one side of this glass substrate to form a coating which was dried at 150° C. for 10 min. Thus, a 0.1 μm-thick vertically aligning film formed of octadecyldimethyl (3-trimethoxysilylpropyl)ammonium chloride was formed on one side of the glass substrate to prepare a contemplated substrate for an optical element. The vertically aligning film could homeotropically align a polymerizable liquid crystal comprising rodlike molecules.

2. Step of Alignment 25 parts by weight of a polymerizable liquid crystal represented by formula (IV), 1 part by weight of a photopolymerization initiator, and 2 parts by weight of a surfactant were first dissolved in 72 parts by weight of chlorobenzene to prepare a coating composition for first birefringence layer formation. In this case, Irg 907 (tradename) manufactured by Ciba Specialty Chemicals, K.K. was used as a photopolymerization initiator, and octadecyidimethyl (3-trimethoxysilylpropyl)ammonium chloride was used as the surfactant. Octadecyidimethyl (3-trimethoxysilylpropyl)ammonium chloride is a surfactant which can homeotropically align a polymerizable liquid crystal comprising rodlike molecules.

Next, the coating composition for first birefringence layer formation was spin coated to form a coating onto the vertically aligning film in the substrate provided in the step of provision, and the coating was heated at 120° C. for 3 min. The state of the coating was changed from a milky state to a transparent state with the elapse of heating time, indicating that the phase of the polymerizable liquid crystal in the coating was transited from a crystal phase to a liquid crystal phase upon heating.

3. Step of Crosslinking

While heating the coating subjected to phase transition of the polymerizable liquid crystal to 120° C., ultraviolet light was applied to the coating in a nitrogen gas atmosphere to three-dimensionally crosslink the polymerizable liquid crystal in the coating. At that time, the ultraviolet light was applied with an ultraviolet light irradiation apparatus provided with an ultrahigh pressure mercury lamp under conditions of irradiation intensity 30 mW/cm$^2$ and irradiation time 1 min.

At a point of time when steps up to the crosslinking step have been completed, a first birefringence layer, in which the polymerizable liquid crystal represented by formula (IV) had a three-dimensionally crosslinked structure and the above surfactant was contained as the surfactant, was formed to prepare a contemplated optical element. The thickness of the first birefringence layer in this optical element was measured with a tracer type difference-in-level meter and was found to be about 1.5 μm.

4. Evaluation

Retardation in the thickness-wise direction of the optical element was measured with KOBRA-21 manufactured by Oji Scientific Instruments at a measurement wavelength of 550 nm and was found to be substantially 0 (zero) nm (strictly, 2 nm). The thickness-wise direction in the case where the optical element was disposed horizontally was used as a reference, and the optical element was flapped in any direction from this direction. As a result, the retardation was increased. These facts indicate that, in the first birefringence layer, the polymerizable liquid crystal as structural unit was homeotropically aligned.

Further, even after heating of the optical element to 200° C., the first birefringence layer maintained a transparent state without causing phase transition. From this fact, the first birefringence layer is judged to have a structure that the polymerizable liquid crystal has been three-dimensionally crosslinked.

Example 7 (Optical Element According to First Aspect of Invention)

1. Step of Provision

A contemplated substrate for an optical element was prepared in the same manner as in the step of provision in Example 6, except that, in preparing a coating liquid for vertically aligning film formation, JALS-2021-R2 (tradename; a polyimide material manufactured by JSR Corporation) was used instead of octadecyidimethyl (3-trimethoxysilylpropyl)ammonium chloride and that the coating formed by the coating liquid was dried at 180° C. for 60 min. The vertically aligning film in the substrate can homeotropically align a polymerizable liquid crystal comprising rodlike molecules, and the film thickness was 0.07 μm.

2. Step of Alignment

In the same manner as in the step of alignment in Example 1, a coating of the coating composition for first birefringence layer formation was formed on the vertically aligning film in the substrate provided in the step of provision and, further, the phase of the polymerizable liquid crystal in the coating was transited from crystal phase to liquid crystal phase, except that, in preparing a coating composition for first birefringence layer formation, the amount of octadecyldimethyl(3-trimethoxysilylpropyl)ammonium chloride was changed to 0.01 part by weight and 72.99 parts by weight of diethylene glycol monomethyl ether was used instead of chlorobenzene.

3. Step of Crosslinking

While heating the coating subjected to phase transition of the polymerizable liquid crystal at 120° C., ultraviolet light was applied to the coating in the same manner as in ultraviolet irradiation in the step of crosslinking in Example 6 to three-dimensionally crosslink the polymerizable liquid crystal in the coating. At a point of time when steps up to the crosslinking step have been completed, a first birefringence layer, in which the polymerizable liquid crystal represented by formula (IV) had a three-dimensionally crosslinked structure and the above surfactant was contained as the surfactant, was formed to prepare a contemplated optical element. The thickness of the first birefringence layer in this optical element was measured with a tracer type difference-in-level meter and was found to be about 0.5 μm.

4. Evaluation

Retardation in the thickness-wise direction of the optical element was measured in the same manner as in Example 6 and was found to be substantially 0 (zero) nm (strictly, 3 nm). The thickness-wise direction in the case where the optical element was disposed horizontally was used as a reference, and the optical element was flapped in any direction from this direction. As a result, the retardation was increased. These facts indicate that, in the first birefringence layer, the polymerizable liquid crystal was homeotropically aligned.

Further, even after heating of the optical element to 200° C., the first birefringence layer maintained a transparent state without causing phase transition. From this fact, the first birefringence layer is judged to have a structure that the polymerizable liquid crystal has been three-dimensionally crosslinked.

Example 8 (Optical Element According to First Aspect of Invention)

1. Step of Provision and Step of Alignment

A contemplated substrate for an optical element was provided in the same manner as in the step of provision in Example 6. Further, in the same manner as in the step of alignment in Example 6, a coating of the coating composition for first birefringence layer formation was formed on the vertically aligning film in the substrate provided in the step of provision, and, further, the phase of the polymerizable liquid crystal in the coating was transited from crystal phase to liquid crystal phase in the same manner as in the step of alignment in Example 6.

2. Step of Crosslinking

At the outset, while heating the coating subjected to phase transition of the polymerizable liquid crystal at 120° C., ultraviolet light was applied to the coating in an air atmosphere with the same ultraviolet irradiation apparatus as used in the step of crosslinking in Example 6. At that time, the ultraviolet light was applied under conditions of irradiation intensity 30 mW/cm$^2$ and irradiation time 2 sec. This allowed a part of a crosslinking reaction of the polymerizable liquid crystal in the coating to proceed.

Next, the temperature of the substrate was once returned to room temperature, and the coating was again exposed to ultraviolet light in an air atmosphere with the above ultraviolet irradiation apparatus under conditions of irradiation intensity 30 mW/cm$^2$ and irradiation time one min. In this case, any phase transition of the polymerizable liquid crystal in the coating was not observed even when the temperature of the substrate was returned to room temperature.

Thus, ultraviolet light irradiation in two divided stages allowed the polymerizable liquid crystal in the coating to be three-dimensionally crosslinked while maintaining the state of homeotropic alignment even in an air atmosphere, whereby a first birefringence layer having a structure, in which the polymerizable liquid crystal represented by formula (IV) was three-dimensionally crosslinked and which contained the above surfactant as the surfactant, was formed to prepare a contemplated optical element. The thickness of the first birefringence layer in this optical element was measured with a tracer type difference-in-level meter and was found to be about 2.0 μm.

3. Evaluation

Retardation in the thickness-wise direction of the optical element was measured in the same manner as in Example 6 and was found to be substantially 0 (zero) nm (strictly, 3 nm). The thickness-wise direction in the case where the optical element was disposed horizontally was used as a reference, and the optical element was flapped in any direction from this direction. As a result, the retardation was increased. These facts indicate that, in the first birefringence layer, the polymerizable liquid crystal was homeotropically aligned.

Further, even after heating of the optical element to 200° C., the first birefringence layer maintained a transparent state without causing phase transition. From this fact, the first birefringence layer is judged to have a structure that the polymerizable liquid crystal has been three-dimensionally crosslinked.

Example 9 (Optical Element According to First Aspect of Invention)

1. Step of Provision

A contemplated substrate for an optical element was prepared in the same manner as in the step of provision in Example 6, except that, in preparing a coating liquid for vertically aligning film formation, DRYPON 600E (tradename; a surfactant manufactured by Nicca Chemical Co., Ltd.) was used instead of octadecyldimethyl (3-trimethoxysilylpropyl)ammonium chloride. The vertically aligning film in the substrate can homeotropically align a polymerizable liquid crystal comprising rodlike molecules, and the film thickness was 0.1 μm.

2. Step of Alignment

In the same manner as in the step of alignment in Example 6, a coating of a coating composition for first birefringence layer formation on the vertically aligning film in the substrate provided in the step of provision was formed, and, in addition, the phase of the polymerizable liquid crystal in the coating was transited from crystal phase to liquid crystal phase, except that, in preparing a coating composition for first birefringence layer formation, 2 parts by weight of DRYPON 600E was used instead of octadecyldimethyl (3-trimethoxysilylpropyl)ammonium chloride and 72 parts by weight fo cyclohexanone was used instead of 72 parts by weight of chlorobenzene.

3. Step of Crosslinking While heating the coating subjected to phase transition of the polymerizable liquid crystal at 120° C., ultraviolet light was applied to the coating in the same manner as in ultraviolet irradiation in the step of crosslinking in Example 6 to three-dimensionally crosslink the polymerizable liquid crystal in the coating. At a point of time when steps up to the crosslinking step have been completed, a first birefringence layer, in which the polymerizable liquid crystal represented by formula (IV) had a three-dimensionally crosslinked structure and the above surfactant was contained as the surfactant, was formed to prepare a contemplated optical element. The thickness of the first birefringence layer in this optical element was measured with a tracer type difference-in-level meter and was found to be about 0.6 μm.

4. Evaluation

Retardation in the thickness-wise direction of the optical element was measured in the same manner as in Example 6 and was found to be substantially 0 (zero) nm (strictly, 1 nm). The thickness-wise direction in the case where the optical element was disposed horizontally was used as a reference, and the optical element was flapped in any direction from this direction. As a result, the retardation was increased. These facts indicate that, in the first birefringence layer, the polymerizable liquid crystal was homeotropically aligned.

Further, even after heating of the optical element to 200° C., the first birefringence layer maintained a transparent state without causing phase transition. From this fact, the first birefringence layer is judged to have a structure that the polymerizable liquid crystal has been three-dimensionally crosslinked.

Example 10 (Optical Element According to First Aspect of Invention)

1. Step of Provision and Step of Alignment

The same alkali-free glass substrate as the glass substrate used in Example 6 was provided and was cleaned by UV irradiation. Any vertically aligning film was not formed on the glass substrate. Further, in the preparation of the coating composition for first birefringence layer formation, the amount of the surfactant (octadecyldimethyl (3-trimethoxysilylpropyl)ammonium chloride) used was 0.005 part by weight and the amount of chlorobenzene used was 73.995 parts by weight. The step of provision and the step of alignment were carried out in the same manner as in Example 6, except for the above points, to form a coating of the coating composition for first birefringence layer formation on one side of the substrate (glass substrate) provided in the step of provision, and, further the phase of the polymerizable liquid crystal in the coating was transited from crystal phase to liquid crystal phase.

2. Step of Crosslinking

At the outset, while heating the coating subjected to phase transition of the polymerizable liquid crystal at 120° C., ultraviolet light was applied to the coating in an air atmosphere with the same ultraviolet irradiation apparatus as used in the step of crosslinking in Example 6. At that time, the ultraviolet light was applied under conditions of irradiation intensity 30 mW/cm$^2$ and irradiation time 2 min. This resulted in three-dimensional crosslinking of the polymerizable liquid crystal in the coating.

At a point of time when steps up to the crosslinking step have been completed, a first birefringence layer, in which the polymerizable liquid crystal represented by formula (IV) had a three-dimensionally crosslinked structure and the above surfactant was contained as the surfactant, was formed to prepare a contemplated optical element. The thickness of the first birefringence layer in this optical element was measured with a tracer type difference-in-level meter and was found to be about 0.3 μm.

3. Evaluation

Retardation in the thickness-wise direction of the optical element was measured in the same manner as in Example 6 and was found to be substantially 0 (zero) nm. The thickness-wise direction in the case where the optical element was disposed horizontally was used as a reference, and the optical element was flapped in any direction from this direction. As a result, the retardation was increased. These facts indicate that, in the first birefringence layer, the polymerizable liquid crystal was homeotropically aligned.

Further, even after heating of the optical element to 200° C., the first birefringence layer maintained a transparent state without causing phase transition. From this fact, the first birefringence layer is judged to have a structure that the polymerizable liquid crystal has been three-dimensionally crosslinked.

Comparative Example 1

An optical element was prepared in the same manner as in Example 6, except that any vertically aligning film was not provided on the substrate provided in the step of provision and any surfactant was not contained in the coating composition prepared in the step of alignment.

Retardation in the thickness-wise direction of the optical element was measured in the same manner as in Example 6 and was found to be 2 nm. The thickness-wise direction in the case where the optical element was disposed horizontally was used as a reference, and the optical element-was flapped in any direction from this direction. In this case, the retardation was not increased. These facts indicate that, in the layer formed using the polymerizable liquid crystal, the polymerizable liquid crystal was not homeotropically aligned.

Example 11 (Optical Element According to Second Aspect of Invention)

1. Step of Provision

Octadecyldimethyl (3-trimethoxysilylpropyl)ammonium chloride was first dissolved in isopropyl alcohol to give a concentration of 1% by weight to prepare a coating liquid for homeotroic aligning film formation. Next, a 0.7 mm-thick alkali-free glass substrate (NA35 manufactured by NH TECHNO GLASS CORP) was provided as a light transparent substrate. The coating liquid was coated on one side of this glass substrate to form a coating which was dried at 150° C. for 10 min. Thus, a 0.1 μm-thick vertically aligning film formed of octadecyidimethyl (3-trimethoxysilylpropyl)ammonium chloride was formed on one side of the glass substrate to prepare a member comprising a light transparent substrate (glass substrate) and a vertically aligning film provided on this substrate. The vertically aligning film could homeotropically align a polymerizable liquid crystal comprising rodlike molecules.

2. Step of Alignment 25 parts by weight of a polymerizable liquid crystal represented by formula (IV) and 1 part by weight of a photopolymerization initiator were first dissolved in 74 parts by weight of chlorobenzene to prepare a coating composition for first birefringence layer formation. In this case, Irg 907 (tradename) manufactured by Ciba Specialty Chemicals, K.K. was used as a photopolymerization initiator.

Next, the coating composition for first birefringence layer formation was spin coated on the vertically aligning film formed in the step of provision to form a coating which was then heated at 120° C. for 3 min. The state of the coating was changed from a milky state to a transparent state with the elapse of heating time, indicating that the phase of the polymerizable liquid crystal in the coating was transited from a crystal phase to a liquid crystal phase upon heating.

3. Step of Crosslinking

While heating the coating subjected to phase transition of the polymerizable liquid crystal to 120° C., ultraviolet light was applied to the coating in a nitrogen gas atmosphere to three-dimensionally crosslink the polymerizable liquid crystal in the coating. At that time, the ultraviolet light was applied with an ultraviolet light irradiation apparatus provided with an ultrahigh pressure mercury lamp as a light source under conditions of irradiation intensity 30 mW/cm$^2$ and irradiation time 1 min.

At a point of time when steps up to the crosslinking step have been completed, a first birefringence layer, in which the polymerizable liquid crystal represented by formula (IV) had a three-dimensionally crosslinked polymer, was formed to prepare a contemplated optical element. The thickness of the first birefringence layer in this optical element was measured with a tracer type difference-in-level meter and was found to be about 1.5 μm.

4. Evaluation

Retardation in the thickness-wise direction of the optical element was measured in the same manner as in Example 1 and was found to be substantially 0 (zero) nm. The thickness-wise direction in the case where the optical element was disposed horizontally was used as a reference, and the optical element was flapped in any direction from this direction. As a result, the retardation appeared. These facts indicate that, in the first birefringence layer, the polymerizable liquid crystal was homeotropically aligned.

Further, even after heating of the optical element to 200° C., birefringence characteristics of the first birefringence layer substantially remained unchanged. From this fact, the first birefringence layer is judged to have a structure that the polymerizable liquid crystal has been three-dimensionally crosslinked.

Example 12 (Optical Element According to Second Aspect of Invention)

1. Step of Provision

In the same manner as in the step of provision in Example 10, a member comprising a light transparent substrate (glass substrate) and a vertically aligning film formed on this substrate was prepared, except that, in forming the vertically aligning film, NK GUARD NDN-7E (tradename; a surfactant manufactured by Nicca Chemical Co., Ltd.) was used instead of octadecyidimethyl (3-trimethoxysilylpropyl)ammonium chloride and that the surfactant was coated directly onto the glass substrate. The vertically aligning film could homeotropically align a polymerizable liquid crystal comprising rodlike molecules and had a film thickness of 0.1 μm.

2. Step of Alignment and Step of Crosslinking

The step of alignment was carried out in the same manner as in the step of alignment in Example 10, except that the above member was used as a constituent member of the optical element. Further, the step of crosslinking was carried out in the same manner as in the step of crosslinking in Example 10. Thus, a first birefringence layer comprising a polymer produced by three-dimensional crosslinking of the polymerizable liquid crystal represented by formula (IV) was formed on the vertically aligning film. The thickness of the first birefringence layer was measured with a tracer-type level-difference meter and was found to be about 1.0 μm. Thus, at a point of time when steps up to the crosslinking step have been completed, a contemplated optical element was obtained.

3. Evaluation

Retardation in the thickness-wise direction of the optical element was measured in the same manner as in Example 10 and was found to be substantially 0 (zero) nm (strictly, 4 nm). The thickness-wise direction in the case where the optical element was disposed horizontally was used as a reference, and the optical element was flapped in any direction from this direction. As a result, the retardation appeared. These facts indicate that, in the first birefringence layer, the polymerizable liquid crystal was homeotropically aligned.

Further, even after heating of the optical element to 200° C., birefringence characteristics of the first birefringence layer substantially remained unchanged. From this fact, the first birefringence layer is judged to have a structure that the polymerizable liquid crystal has been three-dimensionally crosslinked.

Example 13 (Optical Element According to Second Aspect of Invention)

1. Step of Provision

In the same manner as in the step of provision in Example 10, a member comprising a light transparent substrate (glass substrate) and a vertically aligning film formed on this substrate was prepared, except that, in preparing a coating liquid for vertically aligning film formation, a mixture of NK GUARD NDN-7E (tradename; a surfactant manufactured by Nicca Chemical Co., Ltd.) with Adeka Mine 4DAC-85 (tradename; a surfactant manufactured by Asahi Denka Kogyo Ltd.) at a ratio of 1:1 (mass ratio) was used instead of octadecyldimethyl (3-trimethoxysilylpropyl)ammonium chloride. The vertically aligning film could homeotropically align a polymerizable liquid crystal comprising rodlike molecules and had a film thickness of 0.2 μm.

2. Step of Alignment and Step of Crosslinking

The step of alignment was carried out in the same manner as in the step of alignment in Example 10, except that the above member was used as a constituent member of the optical element. Further, the step of crosslinking was carried out in the same manner as in the step of crosslinking in Example 10. Thus, a first birefringence layer comprising a polymer produced by three-dimensional crosslinking of the polymerizable liquid crystal represented by formula (IV) was formed on the vertically aligning film. The thickness of the first birefringence layer was measured with a tracer-type level-difference meter and was found to be about 3.0 μm. Thus, at a point of time when steps up to the crosslinking step have been completed, a contemplated optical element was obtained.

3. Evaluation

Retardation in the thickness-wise direction of the optical element was measured with the measuring apparatus in Example 10 at a measuring wavelength of 589 nm and was found to be 10 nm. The thickness-wise direction in the case where the optical element was disposed horizontally was used as a reference, and the optical element was flapped in any direction from this direction. As a result, larger retardation appeared. These facts indicate that, in the first birefringence layer, the tilt angle of the polymerizable liquid crystal molecules as the structural unit is not substantially even in the thickness-wise direction of the first birefringence layer.

The vertically aligning film can homeotropically align the polymerizable liquid crystal. Since, however, the thickness of the first birefringence layer is large, it is estimated that the alignment restraining force of the vertically aligning film is weak in a part near the top surface of the first birefringence layer and the tilt angle of the polymerizable liquid crystal molecules as the structural unit is relatively irregular.

Even after heating of the optical element to 200° C., birefringence characteristics of the first birefringence layer substantially remained unchanged. From this fact, the first birefringence layer is judged to have a structure that the polymerizable liquid crystal has been three-dimensionally crosslinked.

Example 14 (Optical Element According to Second Aspect of Invention)

1. Step of Provision and Step of Alignment

A member comprising a light transparent substrate (glass substrate) and a vertically aligning film provided on the substrate was prepared in the same manner as in the step of provision in Example 10. Further, in the same manner as in the step of alignment in Example 10, a coating of the coating composition for first birefringence layer formation was formed on the vertically aligning film, and, further, the phase of the polymerizable liquid crystal in the coating was transited from crystal phase to liquid crystal phase. The coating thickness after the step of crosslinking was about 2.0 μm.

2. Step of Crosslinking

At the outset, while heating the coating subjected to phase transition of the polymerizable liquid crystal at 120° C., ultraviolet light was applied to the coating in an air atmosphere with the same ultraviolet irradiation apparatus as used in the step of crosslinking in Example 10. At that time, the ultraviolet light was applied under conditions of irradiation intensity 30 mW/cm² and irradiation time 2 sec. This allowed a part of a crosslinking reaction of the polymerizable liquid crystal in the coating to proceed.

Next, the temperature of the glass substrate having a coating was once returned to room temperature, and the coating was again exposed to ultraviolet light in an air atmosphere with the above ultraviolet irradiation apparatus under conditions of irradiation intensity 30 mW/cm² and irradiation time one min. In this case, any phase transition of the polymerizable liquid crystal in the coating was not observed even when the temperature of the glass substrate was returned to room temperature.

Thus, ultraviolet light irradiation in two divided stages allowed the polymerizable liquid crystal in the coating to be three-dimensionally crosslinked while maintaining the state of homeotropic alignment even in an air atmosphere, whereby a first birefringence layer comprising a polymer, in which the polymerizable liquid crystal represented by formula (IV) was three-dimensionally crosslinked, was formed to prepare a contemplated optical element. The thickness of the first birefringence layer in this optical element was measured with a tracer type difference-in-level meter and was found to be about 2.0 μm.

3. Evaluation

Retardation in the thickness-wise direction of the optical element was measured in the same manner as in Example 10 and was found to be substantially 0 (zero) nm (strictly, 5 nm). The thickness-wise direction in the case where the optical element was disposed horizontally was used as a reference, and the optical element was flapped in any direction from this direction. As a result, the retardation appeared. These facts indicate that, in the first birefringence layer, the polymerizable liquid crystal was homeotropically aligned.

Even after heating of the optical element to 200° C., the birefringence characteristics of the first birefringence layer substantially remained unchanged. From this fact, the first birefringence layer is judged to have a structure that the polymerizable liquid crystal has been three-dimensionally crosslinked.

Comparative Example 2

In the same manner as in Example 1, the step of provision, the step of alignment, and the step of crosslinking were carried out to prepare an optical element, except that a surfactant not having a long-chain alkyl group (COA manufactured by Asahi Denka Kogyo Ltd.) was used instead of octadecyidimethyl (3-trimethoxysilylpropyl)ammonium chloride used in the step of provision in Example 10.

Retardation in the thickness-wise direction of the optical element was measured in the same manner as in Example 1 and was found to be 5 nm. The thickness-wise direction in the case where the optical element was disposed horizontally was used as a reference, and the optical element was flapped in any direction from this direction. In this case, the retardation was hardly increased. These facts indicate that, in the layer formed using the polymerizable liquid crystal, the polymerizable liquid crystal was not homeotropically aligned.

Example 15 (Production of Optical Element by Production Process According to Third Aspect of Invention)

1. Step of Provision

Octadecyldimethyl (3-trimethoxysilylpropyl)ammonium chloride was first dissolved in isopropyl alcohol to give a concentration of 1% by weight to prepare a coating liquid for homeotroic aligning film formation. Next, a 0.7 mm-thick alkali-free glass substrate (NA35 manufactured by NH TECHNO GLASS CORP.) was provided. The coating liquid was coated on one side of this glass substrate to form a coating which was dried at 150° C. for 10 min. Thus, a 0.1 μm-thick vertically aligning film formed of octadecyidimethyl (3-trimethoxysilylpropyl)ammonium chloride was formed on one side of the glass substrate to prepare a contemplated substrate for an optical element. The vertically aligning film could homeotropically align a polymerizable liquid crystal comprising rodlike molecules.

2. Step of Alignment 25 parts by weight of a polymerizable liquid crystal represented by formula (IV), 1 part by weight of a photopolymerization initiator, and 2 parts by weight of a surfactant were first dissolved in 72 parts by weight of chlorobenzene to prepare a coating composition for first birefringence layer formation. In this case, Irg 907 (tradename) manufactured by Ciba Specialty Chemicals, K.K. was used as a photopolymerization initiator, and octadecyldimethyl (3-trimethoxysilylpropyl)ammonium chloride was used as the surfactant. Octadecyidimethyl (3-trimethoxysilylpropyl)ammonium chloride is a surfactant which can homeotropically align a rodlike polymerizable liquid crystal.

Next, the coating composition for first birefringence layer formation was spin coated to form a coating onto the vertically aligning film in the substrate provided in the step of provision, and the coating was heated at 127° C. for 3 min. The state of the coating was changed from a milky state to a transparent state with the elapse of heating time, indicating that the phase of the polymerizable liquid crystal in the coating was transited from a crystal phase to a liquid crystal phase upon heating. The temperature at which the phase of the polymerizable liquid crystal in the coating was transited from liquid crystal phase to isotropic phase was 128° C.

3. Step of Crosslinking

At the outset, while heating the coating subjected to phase transition of the polymerizable liquid crystal at 127° C., ultraviolet light was applied to the coating in an air atmosphere with an ultraviolet irradiation apparatus provided with an ultrahigh pressure mercury lamp. At that time, the ultraviolet light was applied under conditions of irradiation intensity 30 mW/cm² and irradiation time 2 sec. This allowed a part of a crosslinking reaction of the polymerizable liquid crystal in the coating to proceed.

Next, the temperature of the substrate was once returned to room temperature, and the coating was again exposed to ultraviolet light in an air atmosphere with the above ultraviolet irradiation apparatus under conditions of irradiation intensity 30 mW/cm² and irradiation time one min. In this case, any phase transition of the polymerizable liquid crystal in the coating was not observed even when the temperature of the substrate was returned to room temperature.

Thus, ultraviolet light irradiation in two divided stages allowed the polymerizable liquid crystal in the coating to be three-dimensionally crosslinked while maintaining the state of homeotropic alignment even in an air atmosphere, whereby a first birefringence layer was formed to prepare a contemplated optical element. The thickness of the first birefringence layer in this optical element was measured with a tracer type difference-in-level meter and was found to be about 1.5 μm.

4. Evaluation

Retardation in the thickness-wise direction of the optical element was measured in the same manner as in Example 1 and was found to be substantially 0 (zero) nm. The thickness-wise direction in the case where the optical element was disposed horizontally was used as a reference, and the optical element was flapped in any direction from this direction. As a result, the retardation appeared. These facts indicate that, in the first birefringence layer, the polymerizable liquid crystal was homeotropically aligned.

Further, even after heating of the optical element to 200° C., the birefringence characteristics of the first birefringence layer substantially remained unchanged. From this fact, the first birefringence layer is judged to have a structure that the polymerizable liquid crystal has been three-dimensionally crosslinked.

Example 16 (Production of Optical Element by Production Process According to Third Aspect of Invention)

An optical element was prepared in the same manner as in Example 15, except that the heating temperature of the coating in the step of alignment and the step of crosslinking was 123° C. The birefringence characteristics of the optical element were measured in the same manner as in Example 15. As a result, the results of measurement were substantially the same as those of measurement in Example 15. Further, even after heating of the optical element to 200° C., the birefringence characteristics of the first birefringence layer substantially remained unchanged. From this fact, the first birefringence layer is judged to have a structure that the polymerizable liquid crystal has been three-dimensionally crosslinked.

Example 17 (Production of Optical Element by Production Process According to Third Aspect of Invention)

An optical element was prepared in the same manner as in Example 15, except that the heating temperature of the coating in the step of alignment and the step of crosslinking was 118° C. The birefringence characteristics of the optical element were measured in the same manner as in Example 15. As a result, the results of measurement were substantially the same as those of measurement in Example 15. Further, even after heating of the optical element to 200° C., the birefringence characteristics of the first birefringence layer substantially remained unchanged. From this fact, the first birefringence layer is judged to have a structure that the polymerizable liquid crystal has been three-dimensionally crosslinked.

Comparative Example 3

An optical element was prepared in the same manner as in Example 15, except that the heating temperature of the coating in the step of alignment and the step of crosslinking was 128° C. (a temperature at which the phase of the polymerizable liquid crystal is transited from liquid crystal phase to isotropic phase). As a result, any retardation was not observed.

Comparative Example 4

An optical element was prepared in the same manner as in Example 15, except that the heating temperature of the coating in the step of alignment and the step of crosslinking was 117° C. As a result, the layer corresponding to the first birefringence layer was clouded.

The invention claimed is:

1. An optical element comprising:
   a light transparent substrate;
   a first birefringence layer provided on the substrate, said first birefringence layer comprising a surfactant and a crosslinked polymer formed from a polymerizable liquid crystal having rodlike molecules and an alkyl fluoride group-containing silane coupling agent, wherein the alkyl fluoride group-containing silane coupling agent and the surfactant both homeotropically align the polymerizable liquid crystal having rodlike molecules to form said crosslinked polymer in a state of homeotropic alignment; and
   a light absorption-type color filter;
   wherein said crosslinked polymer has a three-dimensionally crosslinked structure whereby said polymerizable liquid crystal having rodlike molecules holds the state of homeotropic alignment; and
   wherein said first birefringence layer is provided on the substrate so as to cover the light absorption-type color filter, or said light absorption-type color filter is provided on the first birefringence layer.

2. The optical element according to claim 1, wherein said surfactant has one of an alkyl chain and a long-chain alkyl side chain.

3. The optical element according to claim 2, wherein at least a part of said one of said alkyl chain and said long-chain alkyl side chain has been substituted by fluorine.

4. The optical element according to claim 1, wherein said surfactant has a side chain containing a fluorine atom.

5. The optical element according to claim 1, wherein said substrate is a glass substrate.

6. The optical element according to claim 1, wherein said substrate has a silicon oxide film and said first birefringence layer is provided on said silicon oxide film.

7. The optical element according to claim 1, wherein a tilt angle of said polymerizable liquid crystal molecule as a structural unit in said first birefringence layer is substantially even in the thickness-wise direction of said first birefringence layer.

8. The optical element according to claim 1, wherein the surface of the light absorption-type color filter has been subjected to fluorination treatment, and said first birefringence layer is provided on the substrate so as to cover the light absorption-type color filter.

9. The optical element according to claim 1, which further comprises a second birefringence layer having birefringence characteristics different from said first birefringence layer.

10. The optical element according to claim 9, wherein said second birefringence layer is formed of a cholesteric liquid crystal having a molecular alignment fixed by crosslinking.

11. The optical element according to claim 9, wherein said second birefringence layer is optically uniaxial and the optical axis is in plane.

12. A process for producing the optical element according to claim 1, said process comprising:
- a provision step of providing a light transparent substrate and a light absorption-type color filter;
- an alkyl fluoride group-containing silane coupling agent and a surfactant, onto said substrate to form a coating, where the alkyl fluoride group-containing silane coupling agent and the surfactant can both homeotropically align the polymerizable liquid crystal comprising rodlike molecules, and homeotropically aligning the polymerizable liquid crystal comprising rodlike molecules in the coating; and
- a crosslinking step of three-dimensionally crosslinking said polymerizable liquid crystal comprising rodlike molecules in the coating in such a state that the homeotropic alignment is held.

13. The process according to claim 12, wherein, in said crosslinking step, three-dimensional crosslinking is carried out while holding the temperature of the coating at a temperature 1 to 10° C. below a temperature at which said polymerizable liquid crystal causes phase transition from a liquid crystal phase to an isotropic phase.

14. The process according to claim 12, wherein said crosslinking step is carried out in an inert gas atmosphere.

15. The process according to claim 12, wherein said crosslinking step comprises:
- a first substep of partially crosslinking said polymerizable liquid crystal while holding the temperature of the coating at such a temperature that the polymerizable liquid crystal is brought to a liquid crystal phase; and
- a second substep of bringing the temperature of the coating to a temperature at which the polymerizable liquid crystal is brought to a crystal phase to again crosslink said polymerizable liquid crystal to form said first birefringence layer.

16. The process according to claim 15, wherein said crosslinking step is carried out in an inert gas atmosphere.

17. The process according to claim12, wherein a vertically aligning film is provided on said light absorption-type color filter.

18. The process according to claim 12, wherein said substrate has a second birefringence layer having birefringence characteristics different from said first birefringence layer.

19. The process according to claim 18, wherein a vertically aligning film is provided on said second birefringence layer.

20. The method according to claim 12, wherein said substrate has a glass substrate or a silicon oxide film.

21. A substrate for liquid crystal alignment, comprising at least:
- a light transparent substrate;
- an aligning film provided on one side of said light transparent substrate;
- a first birefringence layer provided between said light transparent substrate and said aligning film, or on said light transparent substrate in its surface remote from said aligning film, said first birefringence layer comprising a surfactant and a crosslinked polymer formed from a polymerizable liquid crystal having rodlike molecules and an alkyl fluoride group-containing silane coupling agent, wherein the alkyl fluoride group-containing silane coupling agent and the surfactant both homeotropically align the polymerizable liquid crystal having rodlike molecules to form said crosslinked polymer in a state of homeotropic alignment, wherein said crosslinked polymer has a three-dimensionally crosslinked structure whereby said polymerizable liquid crystal having rodlike molecules holds the state of homeotropic alignment; and
- a light absorption-type color filter;
- wherein said first birefringence layer is provided on said light transparent substrate so as to cover said light absorption-type color filter, or said light absorption-type color filter is provided on said first birefringence layer.

22. The substrate for liquid crystal alignment according to claim 21, wherein said first birefringence layer is provided on one side of said light transparent substrate, said light absorption-type color filter is provided on said first birefringence layer, and said aligning film is provided to cover said light absorption-type color filter.

23. The substrate for liquid crystal alignment according to claim 21, wherein said light absorption-type color filter is provided on one side of said light transparent substrate, said first birefringence layer is provided on said light absorption-type color filter, and the aligning film is provided to cover said first birefringence layer.

24. The substrate for liquid crystal alignment according to claim 21, wherein said light absorption-type color filter is provided on one side of said light transparent substrate, said first birefringence layer is provided through a silicon oxide film on said light absorption-type color filter, and said aligning film is provided to cover said first birefringence layer.

25. A liquid crystal display device comprising a liquid crystal panel for display comprising:
- a first substrate for liquid crystal alignment located on its display surface side; and
- a second substrate for liquid crystal alignment located on its backside;
- wherein at least one of said first substrate for liquid crystal alignment and said second substrate for liquid crystal alignment comprise said substrate for liquid crystal alignment according to claim 21.

* * * * *

UNITED STATES PATENT AND TRADEMARK OFFICE
CERTIFICATE OF CORRECTION

PATENT NO.       : 7,622,166 B2   Page 1 of 1
APPLICATION NO. : 10/997064
DATED            : November 24, 2009
INVENTOR(S)      : Ishizaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 656 days.

Signed and Sealed this

Fourteenth Day of December, 2010

David J. Kappos
*Director of the United States Patent and Trademark Office*